United States Patent
van Peer

(10) Patent No.: US 12,129,332 B2
(45) Date of Patent: Oct. 29, 2024

(54) SELF-SUPPORTING PHOTOCHROMIC POLYURETHANE FILM, METHOD OF MANUFACTURING THE FILM, ARTICLE COMPRISING SAID FILM

(71) Applicant: Nanogate SE, Göttelborn (DE)

(72) Inventor: Cornelis Johannes Gerardus Maria van Peer, Halsteren (NL)

(73) Assignee: Nanogate SE, Göttelborn (DE)

( * ) Notice: Subject to any disclaimer, the term of this patent is extended or adjusted under 35 U.S.C. 154(b) by 854 days.

(21) Appl. No.: 16/964,216

(22) PCT Filed: Jan. 24, 2019

(86) PCT No.: PCT/EP2019/051688
§ 371 (c)(1),
(2) Date: Jul. 23, 2020

(87) PCT Pub. No.: WO2019/145388
PCT Pub. Date: Aug. 1, 2019

(65) Prior Publication Data
US 2021/0040280 A1    Feb. 11, 2021

(30) Foreign Application Priority Data

Jan. 25, 2018  (EP) .................................. 18153455
Oct. 5, 2018   (EP) .................................. 18198899
(Continued)

(51) Int. Cl.
*C08G 18/73*  (2006.01)
*B32B 17/10*  (2006.01)
(Continued)

(52) U.S. Cl.
CPC .............. *C08G 18/73* (2013.01); *C08J 5/18* (2013.01); *C08J 7/065* (2013.01); *G02B 5/23* (2013.01);
(Continued)

(58) Field of Classification Search
CPC ................. G02B 5/00–5/32; C08K 5/00–5/59
See application file for complete search history.

(56) References Cited

U.S. PATENT DOCUMENTS

| | | | |
|---|---|---|---|
| 2004/0180211 A1 | 9/2004 | Moravec et al. | |
| 2007/0259117 A1* | 11/2007 | Archey | C08J 7/042 427/430.1 |
| 2014/0340727 A1* | 11/2014 | Mori | C08G 18/282 252/586 |

FOREIGN PATENT DOCUMENTS

WO    WO-2010020770 A1 *  2/2010  ........... C07D 311/02

OTHER PUBLICATIONS

Eckelt et al: "Solubility of polymers", Encyclopedia of Polymer Science and Technology, Jan. 14, 2011, pp. 1-37.

* cited by examiner

*Primary Examiner* — Prashant J Khatri
(74) *Attorney, Agent, or Firm* — N.V. Nederlandsch Octrooibureau

(57) ABSTRACT

The invention relates to a self-supporting polymer film comprising a thermoplastic polymer, a ketone, and at least one organic photochromic molecule comprising a chromophore, wherein preferably the at least one organic photochromic molecule comprising a chromophore is evenly distributed in the self-supporting polymer film. A typical self-supporting polymer film of the invention is a self-supporting photochromic aliphatic thermoplastic polyurethane film imbibed with a ketone such as acetone and cyclohexanone, further comprising one or more of a diary- (Continued)

lethene, a spirooxazine and a naphthopyran, preferably a polydialkylsiloxane-substituted naphthopyran. The invention also relates to a method for the manufacturing of such a self-supporting polymer film of the invention, and to the use of such a self-supporting polymer film in the manufacturing of an article. Furthermore, the invention relates to an article comprising a self-supporting polymer film of the invention.

16 Claims, 1 Drawing Sheet

(30) Foreign Application Priority Data

Oct. 5, 2018 (EP) .................................... 18198902
Oct. 8, 2018 (EP) .................................... 18199061

(51) Int. Cl.
*C08J 5/18* (2006.01)
*C08J 7/06* (2006.01)
*C08K 5/07* (2006.01)
*C08K 5/45* (2006.01)
*G02B 5/23* (2006.01)

(52) U.S. Cl.
CPC ... *B32B 17/10036* (2013.01); *B32B 17/10486* (2013.01); *B32B 17/10651* (2013.01); *B32B 17/1077* (2013.01); *B32B 2260/02* (2013.01); *B32B 2260/04* (2013.01); *B32B 2307/42* (2013.01); *C08J 2375/06* (2013.01); *C08J 2375/08* (2013.01); *C08K 5/07* (2013.01); *C08K 5/45* (2013.01)

SELF-SUPPORTING PHOTOCHROMIC POLYURETHANE FILM, METHOD OF MANUFACTURING THE FILM, ARTICLE COMPRISING SAID FILM

TECHNICAL FIELD

The invention relates to a self-supporting polymer film comprising a thermoplastic polymer, a ketone, and at least one organic photochromic molecule comprising a chromophore. The at least one organic photochromic molecule comprising a chromophore can be evenly distributed in the self-supporting polymer film. A typical self-supporting polymer film of the invention is a self-supporting photochromic aliphatic polyether-based thermoplastic polyurethane film imbibed with a ketone such as cyclohexanone, further comprising one or more of a diarylethene, a spirooxazine and a naphthopyran, preferably a polydialkylsiloxane-substituted naphthopyran. The invention also relates to a method for the manufacturing of such a self-supporting polymer film of the invention, and to the use of such a self-supporting polymer film in the manufacturing of an article. Furthermore, the invention relates to an article comprising the self-supporting polymer film.

BACKGROUND

In today's society there is a need for smart technologies, to be able to mitigate environmental risks. For example, the ability of windows to darken upon light stimulus of the sun can prevent the heating up of buildings or cars. The incumbent solutions are typically electrochromic, meaning the electrochromic material darkens upon electrical stimulus. The consumption of electricity that is required to constantly drive this reaction cannot be considered environmentally friendly. Therefore, a different kind of lighten-darken reaction was required to solve this problem.

Photochromism is a physical phenomenon which has been well-established since the first half of the $20^{th}$ century. It is defined as the ability of a photochromic molecule to reversibly change from an inactivated state, light colour, to an activated state, dark colour, through exposure to electromagnetic radiation. There are two different kinds of photochromic molecules: inorganic and organic. Inorganic photochromic molecules, such as silver-halides are not favourable to use in our current time because they are very slow in response and also very expensive to produce. Organic photochromic molecules on the other hand are suitable for application in modern technology.

Organic photochromic molecules are most commonly incorporated in dyes. Photochromic dyes typically contain one or several of these types of organic photochromic molecules: spirooxazines, naphthopyrans, and diarylethenes. Most of these photochromic molecules change colour when they are exposed to UV or visible light and revert back to their original colour when the light source is removed; this is known as T-type photochromism since the back reaction is driven thermally. All of these photochromic molecules can be synthesised in such a way that they cover a range of colour spectra, e.g. reds, blues, yellows etc., and so could have industrial applications in many market segments. Applications include, but are not limited to, automotive and aircraft windows, helmet visors, ophthalmic lenses, self-shading sunglasses, and windowpanes for buildings.

One aspect of these photochromic molecules are that they are vulnerable towards degradation reactions, meaning they lose their photochromic properties over time. This shortens the lifetime of the application due to the degradation of photochromic molecules leading to less photochromic activity with every use. They also degrade at high temperatures. The high temperatures of some manufacturing processes, for example, injection moulding or extrusion, can destroy the photochromic properties of the material. A partial solution to this problem is lamination; creating a film containing the photochromic dye that is sandwiched between two transparent layers. This method has been explored for, for instance, the production of ophthalmic lenses with a photochromic film, such as the lenses described in patents U.S. Pat. No. 9,163,108B2 and U.S. Pat. No. 6,256,152B1, and in patent application US20040126587A1.

Commonly used film materials include: ethylene vinyl acetate (EVA), polyvinyl butyral (PVB), and thermoplastic polyurethane (TPU). TPU films are also suitable for use in lamination as disclosed for example in patent applications US20040126587A1 and WO2001049478A2.

Currently available films comprising photochromic molecules have relatively low lifetimes (for example, as short as approximately 500 hours). Current films comprising photochromic molecules also tend to have a less dark colour in their activated state than desired for several applications.

SUMMARY

It is a goal of the present invention to provide an improved photochromic film with an increased lifetime and/or with an improved velocity of discolouring once exposure of the film to ultraviolet radiation is terminated. That is to say, to provide a photochromic film which has a relatively short decay half time, improved photochromic effect in an activated state, and/or switches quickly between light and dark states.

It is an objective of the current invention to provide a photochromic film which is self-supporting, that has a high transparency, and has a good resistance to wear when the loss of photochromic activity over time is assessed.

At least one of the above objectives is achieved by providing a self-supporting aliphatic polyester-based or aliphatic polyether-based thermoplastic polyurethane film comprising imbibed ketone and at least one organic photochromic molecule comprising a chromophore which is/are dissolvable in said ketone. At least one of the above objectives is also achieved by providing a self-supporting aliphatic polyester-based or polyether-based thermoplastic polyurethane film which is immersed with a solution of a ketone and at least one organic photochromic molecule comprising a chromophore which is/are dissolvable in said ketone, and then dried after immersion such that the film does not comprise ketone.

The present invention will be described with respect to particular embodiments but the invention is not limited thereto but only by the claims.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The embodiments of the invention described herein can operate in combination and cooperation, unless specified otherwise.

Furthermore, the various embodiments, although referred to as "preferred" or "e.g." or "for example" or "in particular" are to be construed as exemplary manners in which the invention may be implemented rather than as limiting the scope of the invention.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a polymer film comprising A and B" should not be limited to polymer films consisting only of components A and B, rather with respect to the present invention, the only enumerated components of the polymer film are A and B, and further the claim should be interpreted as including equivalents of those components.

A first aspect of the invention relates to a self-supporting polymer film comprising:
 (a) a thermoplastic polymer;
 (b) between 0.0% and 12% by weight of a ketone based on the total weight of the self-supporting polymer film; and
 (c) at least one organic photochromic molecule comprising a chromophore, wherein said organic photochromic molecule comprising a chromophore is soluble in said ketone of (b) at a concentration of at least 0.1% based on the weight of a solution of the ketone containing the dissolved organic photochromic molecule comprising a chromophore at a temperature of between 15° C. and 30° C., wherein the thermoplastic polymer of (a) is thermoplastic polymer that is previously immersed in the solution of the ketone containing the dissolved organic photochromic molecule comprising a chromophore of (c) and then dried such that remaining ketone after said immersion and subsequent drying is imbibed in said thermoplastic polymer.

Typically, the self-supporting polymer film of the invention comprises between 0.1% and 12% by weight of the ketone based on the total weight of the self-supporting polymer film. Of course, as the case may be, also higher amounts of ketone can be comprised by the self-supporting polymer film, such as between 12% and 20% by weight based on the total weight of the self-supporting polymer film, or 12-18% by weight, or 13-15% by weight. The ketone present in the self-supporting polymer film is imbibed in the thermoplastic polymer after immersion of the thermoplastic polymer in the solution comprising the ketone and the organic photochromic molecule comprising a chromophore, and subsequently drying the thermoplastic polymer after immersion. The self-supporting polymer film of the invention that is void of ketone and the self-supporting polymer film of the invention that comprises ketone, such as between 0% and 0.1% ketone by weight based on the total weight of the self-supporting polymer film, is provided by first immersing the thermoplastic polymer in the solution of the ketone and the dissolved organic photochromic molecule comprising a chromophore and subsequently drying the immersed thermoplastic polymer until the thermoplastic polymer does not comprise ketone anymore or comprises ketone at an amount of for example 12% by weight or less. Of course, the self-supporting polymer film may also comprise about 0.01% by weight ketone after drying based on the total weight of the self-supporting polymer film, or about 0.03-0.08% by weight, such as about 0.05% by weight. During immersion the thermoplastic polymer obtains a more flexible appearance and, without wishing to be bound by theory, the ketone weakens the intermolecular forces between the polymer molecules in the thermoplastic polymer. The organic photochromic molecule comprising a chromophore is diffused evenly in the immersed thermoplastic polymer. Subsequent drying of the immersed thermoplastic polymer results in evaporation of the ketone until between 0% and, for example, about 12% by weight ketone remains imbibed in the thermoplastic polymer, based on the total weight of the self-supporting polymer film.

In the self-supporting polymer film, the at least one organic photochromic molecule comprising a chromophore is evenly distributed in the self-supporting polymer film. Immersion of the thermoplastic polymer in the solution comprising the ketone results in the ketone being imbibed in the whole volume of the thermoplastic polymer which enables homogeneous distribution of the organic photochromic molecule comprising a chromophore in said volume of the thermoplastic polymer. Current approaches for providing a self-supporting polymer film comprising an organic photochromic molecule comprising a chromophore comprises the provision of a sheet of thermoplastic polymer onto which a film or a coating is provided, which film or coating is a thin layer or foil comprising said organic photochromic molecule comprising a chromophore. In said multilayer laminate known in the art the organic photochromic molecule comprising a chromophore is thus not present in the thermoplastic polymer. Providing such a multilayer laminate known in the art is a multistep process and amongst other steps requires priming of the thermoplastic surface before the foil is adhered to the thermoplastic polymer. Efficient adhering the foil to the thermoplastic polymer may cause difficulties, e.g. such as those related to avoiding inclusion of air bubbles between layers, and to the foil and the thermoplastic polymer staying (fully) adhered to each other.

It is preferred that the thermoplastic polymer comprised by the self-supporting polymer film, is an aliphatic thermoplastic polyurethane, preferably a polyester-based aliphatic thermoplastic polyurethane or a polyether-based aliphatic thermoplastic polyurethane.

According to embodiments of the invention, the self-supporting polymer film of the invention comprises an aliphatic thermoplastic polyurethane (TPU), wherein this aliphatic thermoplastic polyurethane is based on an aliphatic diisocyanate selected from 1,4-tetramethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanatomethyl cyclopentane, isophorone diisocyanate (IPDI), 5-isocyanato-1-(isocyanatomethyl)-1,3,3-trimethylcyclohexane, bis-(4-isocyanatocyclohexyl)-methane, 2,4'-dicyclohexylmethane diisocyanate, 1,3-bis(isocyanatometyl)-cyclohexane, 1,4-bis(isocyanatometyl)-cyclohexane, bis-(4-isocyanato-3-methylcyclohexyl)-methane, α,α,α',α'-tetramethyl-1,3-xylylen diisocyanate, α,α,α',α'-tetramethyl-1,4-xylylen diisocyanate, 1-isocyanato-1-methyl-4(3)-isocyanatomethyl cyclohexane, 2,4-hexahydrotoluylene diisocyanate, 2,6-hexahydrotoluylene diisocyanate, 4,4'-methylene dicyclohexyl diisocyanate (H12 MDI), hexamethylene diisocyanate (HDI), or mixtures thereof, preferably selected from H12 MDI, HDI and IPDI, or mixtures thereof.

It is preferred that the thermoplastic polymer comprised by the photochromic self-supporting polymer film of the invention is an aliphatic thermoplastic polyurethane (TPU) based on a polyester known in the art and based on a here above listed aliphatic diisocyanate, according to the invention. Equally preferred is a TPU based on a polyether, known in the art. TPUs based on polyether are equally preferred. Aliphatic TPUs based on polyester and an aliphatic diisocyanate are known in the art. For manufacturing such an aliphatic TPU based on polyester and an aliphatic diisocyanate, the appropriate polyester and the appropriate aliphatic diisocyanate are selected and subjected to a poly-addition reaction for producing TPU known to the skilled person. Suitable aliphatic TPU for application in the self-supporting polymer film of the invention are for example the aliphatic TPU sold as "S-123" or "S123" by PPG Aerospace—Sierracin/Sylmar Corp. (CA, USA), and the TPU "S-158" or "S158" sold by the same company, and for example "Krystalflex PE 399" aliphatic TPU foil sold by company Huntsman (MI, USA). For example, the S-123 aliphatic TPU is available as a film and is for application in laminates, according to the manufacturer. Krystalflex PE 399 is an aliphatic polyester based TPU. It will be appreciated that aliphatic TPUs falling under the scope of the invention are those aliphatic TPUs suitable for forming flexible foil, sheet and film, according to the invention. Aliphatic TPUs based on polyester, polyether or polycaprolactone are known in the art and are suitable for incorporation in the flexible photochromic self-supporting polymer film, although application of aliphatic TPU based on polyester or polyether is preferred. Aliphatic TPUs based on polyether are also known in the art. An example is the aliphatic polyether TPU, made of combinations of diisocyanates, polyols and short length diols, 'NovoGlass SF 1959' (NovoGenio).

In particular, the self-supporting polymer film comprises imbibed ketone, or the self-supporting film comprises the thermoplastic polymer which is first immersed in the ketone with dissolved organic photochromic molecule comprising a chromophore and then fully dried such that no ketone remains in and on the thermoplastic polymer and the self-supporting polymer film does not comprise ketone, wherein said ketone is a ketone selected from any one or more of a straight-chain ketone, a branched ketone, an unsubstituted cyclic ketone and a cyclic ketone substituted with at least one alkyl group, or a combination thereof, preferable selected from a straight-chain ketone and an unsubstituted cyclic ketone. The selected ketone is a solvent for the at least one organic photochromic molecule comprising a chromophore, wherein the organic photochromic molecule comprising a chromophore is soluble in said solvent at a concentration of at least 0.1% based on the weight of a solution of the ketone containing the dissolved organic photochromic molecule comprising a chromophore at a temperature of between 15° C. and 30° C. Preferably, the at least one organic photochromic molecule comprising a chromophore is soluble in said selected ketone at a concentration of at least 0.3% based on the weight of a solution of the ketone containing the dissolved organic photochromic molecule comprising a chromophore, more preferably at least 0.5%, at a temperature of between 15° C. and 30° C., preferably 18° C.-25° C., such as room temperature or ambient temperature, e.g. about 20° C. or about 22° C.

It is preferred that the ketone comprised by the self-supporting polymer film, is selected from any one of methylethyl ketone, diethyl ketone, methylisobutyl ketone, acetyl actone, propan-2-one, butan-2-one, 3-methylbutan-2-one, pentan-2-one, pentan-3-one, cyclopentanone, 2-methylpentan-3-one, 3-methylpentan-2-one, 4-methylpentan-2-one, 4-methylpent-3-en-2-one, pentane-2,4-dione, hexan-2-one, 3,5,5-trimethyl-2-cyclohexene-1-one, 5-methylhexan-2-one, 1-cyclohexylpropan-1-one, 1-cyclohexylethanone, cyclohexanone, heptan-2-one, heptan-4-one, 2,6-dimethyl-4-heptanon, octan-3-one, octan-2-one, octan-4-one, or a mixture thereof, preferably the ketone is selected from propan-2-one and cyclohexanone, more preferably the ketone is cyclohexanone. As said before, the at least one organic photochromic molecule comprising a chromophore is soluble in said selected ketone to a sufficient extent at a temperature of e.g. about 21° C., according to the invention. Thus, also more than one, preferably two organic photochromic molecules comprising a chromophore are soluble in said selected ketone at a concentration of at least 0.1%, preferably at least 0.5% based on the weight of a solution of the ketone containing the dissolved organic photochromic molecule comprising a chromophore at a temperature of between 15° C. and 30° C.

In one embodiment, the self-supporting polymer film, comprises between 1% and 10% by weight ketone based on the total weight of the self-supporting polymer film, preferably between 1.5% and 8% by weight, more preferably between 2% and 6% by weight, most preferably about 3% by weight ketone based on the total weight of the self-supporting polymer film. For example, the self-supporting polymer film comprises 1%, 2%, 3%, 4%, 5%, 6%, 8%, 9% or 10% by weight of the ketone based on the total weight of the self-supporting polymer film, the ketone imbibed in the thermoplastic polymer, or any weight percentage in between these listed values. It is also preferred that the self-supporting polymer film comprises less than 0.1% by weight of the ketone based on the total weight of the self-supporting polymer film, such as between 0% and 0.05% by weight. Presence of imbibed ketone in the self-supporting polymer film of the invention in these ranges ensures the establishment of the plasticizer effect of the ketone towards the thermoplastic polymer comprised by the film of the invention, e.g. aliphatic TPU, for example based on a polyester and an aliphatic diisocyanate, or for example based on a polyether and diisocyanates. Presence of the imbibed ketone in the self-supporting polymer film of the invention, also referred to as 'photochromic film', as the plasticizer makes inclusion of a further plasticizer known in the art superfluous. Preferred is a photochromic self-supporting polymer film of the invention comprising at least 3 wt % ketone such as cyclohexanone based on the weight of the self-supporting polymer film, such as 4 wt %-11 wt %, in particular 5 wt %, 8 wt %. Equally preferred is the self-supporting polymer film of the invention wherein the ketone in which the thermoplastic polymer comprised by said film was immersed, is fully removed by drying said thermoplastic polymer after it has been immersed in a solution of the ketone and the organic photochromic molecule comprising a chromophore, such that the self-supporting polymer film comprises 0% by weight ketone based on the total weight of said film. It has been found by the inventor that the plasticizer effect of the ketone remains after immersion in ketone and subsequent drying of the thermoplastic polymer, when the self-supporting polymer film after drying of the immersed thermoplastic polymer comprises between 0% and about 12% by weight ketone based on the total weight of the self-supporting polymer film, such as about 0%, about 3%, about 8%, or less than 0.1%. The plasticizer effect of the ketone with regard to the flexibility of the thermoplastic polymer is for example established by determined differences of the glass transition temperature Tg (Tan Delta) peak in a dynamic mechanic analysis (See Examples section) between thermoplastic polymer that has not been immersed with ketone (Tan Delta peak Tg is 12° C. for TPU (S123, PPG Aerospace)), and thermoplastic polymer that has been immersed with ketone and comprises 0% or 8% by weight ketone based on the total weight of the self-supporting polymer film of the invention, respectively, i.e. Tan Delta peak is 16° C. and −1° C. for TPU (S123, PPG Aerospace), respectively with 0% and 8% ketone. These differences between thermoplastic polymer such as TPU, which is not immersed in ketone compared to the same type of thermoplastic polymer that has been immersed in ketone and then dried, are also evident when flexibility is assessed. Contacting the thermoplastic polymer with ketone results in a more flexible polymer sheet or film compared to the thermoplastic polymer not contacted with the ketone.

It is now established that the self-supporting polymer film has an increased loss modulus under influence of the imbibed ketone in the thermoplastic polymer, when compared to the loss modulus determined for the thermoplastic polymer lacking the ketone. Thus, presence of the ketone in the photochromic self-supporting polymer film results in increased flexibility of the polymer molecules in the film, which increased flexibility is beneficial for the decay half time of the one or more organic photochromic molecules comprising a chromophore comprised by the film of the invention, i.e. the decay half time of such photochromic molecule is shortened when the photochromic molecule is impregnated in a film of the invention, compared to a similar film though lacking the imbibed ketone.

For a preferred self-supporting polymer film, said self-supporting polymer film comprises at least one organic photochromic molecule comprising a chromophore selected from one or more of a diarylethene, a spirooxazine and a naphthopyran, or a combination thereof, preferably the self-supporting polymer film comprises at least two organic photochromic molecules comprising a chromophore. Such a mixture of at least two organic photochromic molecules comprising a chromophore provides the self-supporting polymer film with the ability to turn from essentially colorless to a color which is a mixture of the colors of the at least two organic photochromic molecules comprising a chromophore upon exposure of these chromophores to e.g. ultraviolet radiation. Preferably, the obtained color for the self-supporting polymer film comprising at least two organic photochromic molecules comprising a chromophore is for example a brown color, a dark blue color, a dark green color and/or a color between light gray and black. The chromophores are identical, or the chromophores are different moieties in the photochromic molecules. Equally preferred in the self-supporting polymer film of the invention are photochromic molecules selected from benzopyrans, naphthopyrans, spirobenzopyrans, spironaphthopyrans, spirobenzoxzines, spironaphthoxazines, fulgides and fulgimides, as long as such photochromic molecules are soluble in the selected ketone to a sufficient extent, i.e. at least soluble to 0.1 wt % dye in the ketone, based on the weight of the provided solution.

The self-supporting polymer film comprises in preferred embodiments at least one organic photochromic molecule comprising a chromophore selected from polydialkylsiloxane-substituted naphthopyrans, preferably a polydialkylsiloxane-substituted naphthopyran capable of taking on a blue color or a green color when irradiated with ultraviolet radiation, and/or selected from 1-[2,4-dimethyl-5-(4-methylphenyl)-3-thienyl]-2-[2-methyl-5-(4-methylphenyl)-3-thienyl]-3,3,4,4,5,5-hexafluorocyclopentene and 1,2-bis(2-methoxy-5-phenyl-3-thienyl)perfluorocyclopentene, preferably the self-supporting polymer film comprises at least two selected organic photochromic molecules comprising a chromophore. Typically preferred organic photochromic molecules comprising a chromophore in the self-supporting polymer film are those polydialkylsiloxane-substituted naphthopyrans described in U.S. Pat. No. 8,865,029B2, i.e. the photochromic molecules outlined in Example 3, column 46, line 42 to column 50, line 2, Example 4, column 50, line 4 to column 51 line 4, Example 6, column 62, line 50 to column 53, line 30, Example 7, column 53, line 32 to column 54, line 20, and Example 9, column 57, line 50 to column 63, line 20. Such polydialkylsiloxane-substituted naphthopyrans comprise two identical photochromic units per photochromic molecule. Particularly preferred is a self-supporting polymer film comprising cyclohexanone and one or more polydialkylsiloxane-substituted naphthopyrans. Suitable polydialkylsiloxane-substituted naphthopyrans, sufficiently soluble in e.g. cyclohexanone at e.g. room temperature, are for example Reversacol Pennine Green, Reversacol Sea Green and Reversacol Humber Blue (Vivimed Labs Ltd).

It is preferred that the self-supporting polymer film has a thickness of between 0.20 mm and 6.50 mm, preferably between 0.30 mm and 2.60 mm, more preferably between 0.38 mm and 0.68 mm, most preferably about 0.63 mm. It is also preferred that the self-supporting polymer film has a thickness of between 0.05 mm and 6.50 mm, preferably between 0.10 mm and 2.60 mm, more preferably between 0.38 mm and 0.68 mm, most preferably about 0.63 mm. In particular, application of a thermoplastic film having a thickness of for example between 0.10 mm and 0.80 mm or between 0.30 mm and 0.80 mm is preferred in the self-supporting polymer film, such as a thermoplastic film having a thickness of for example about 100 micrometer, about 0.38 mm, or 0.63 mm or 0.68 mm. The inventors established that the self-supporting polymer film is efficaciously impregnated evenly with photochromic dye, when films having a thickness in the above mentioned range, e.g. between 0.1 mm and 1.2 mm, such as between 0.35 mm and 0.76 mm, and when the self-supporting, or 'free-standing', film has a thickness of about 100 micrometer, about 150 micrometer and about 200 micrometer. In addition, the inventors established that a film having a thickness in the above mentioned range is endowed with increased flexibility due to the presence of the imbibed ketone, as expressed in for example an increased Tg and/or an increased value for the storage modulus, when compared to flexibility of a similar film of the thermoplastic polymer comprised by the self-supporting polymer film, though lacking the imbibed solvent, i.e. the ketone. As said before, such an increase in flexibility for the self-supporting polymer film is also achieved when the thermoplastic polymer comprised by said film is first immersed in ketone and then dried such that the film does not contain ketone after drying. While ketone is fully removed from the film, the at least one organic photochromic molecule comprising a chromophore remains homogeneously distributed in the self-supporting polymer film with increased flexibility.

It is one of the several benefits provided by the self-supporting polymer film that such a film is presented as a transparent film after being subjected to heat and pressure. For example, the self-supporting polymer film can be subjected to a pressure of between 6 bar and 20 bar, such as about 8 bar, 12 bar or 15 bar, at a temperature of e.g. between 120° C. and 165° C. for a time period of between for example 1 second and 1 hour, such as for about 1 second, 30 seconds, 4 minutes, 10 minutes or 20 minutes, with the direction of the pressure being essentially at both sides of the extended surface area perpendicular to the extended surface, and a transparent film is subsequently obtained. Here, transparent is to be understood as transmission of visible light of at least 80%, such as at least 84%. Preferred is a transmission of visible light of between 80% and 99% such as between 90% and 95%. For example, such a transparent self-supporting polymer film is obtainable by adhering the film at both sides of the film surface to a transparent material, i.e. sandwiched in between two sheets of such material. Such material is known in the art and commonly applied when the effect of photochromism is desired when such a sandwiched film is used for the purpose of shielding for light and/or radiation heat. Typically, such transparent materials known in the art are glass and polycarbonate, such as a pane of glass and a film or sheet of polycarbonate.

The self-supporting polymer film comprising e.g. aliphatic TPU, such as aliphatic poly-ester-based TPU or aliphatic polyether based TPU, provides, amongst others, the benefit of improved suitability for application in laminates, such as a composite laminate assembly, wherein the film is sandwiched in between sheets or layers or films of a first transparent material or in between a sheet of a first transparent material at a first side of the film surface and a sheet of a second transparent material at a second side of the film surface, dependent on the purpose of use of the sandwiched film. The self-supporting polymer film does not require any pre-preparation before being applicable for adhering to the common transparent materials applied in, for example, construction, visors, glasses, lenses, car windows, etc. That is to say, the film generally adheres to sheets or foils or films of materials for applying photochromism. The film comprising the thermoplastic polymer such as TPU that is immersed with ketone such as cyclohexanone and then dried, exposes a tacky surface suitable for adhering the film to further layers, the immersed and dried film thus being provided with a surface acting reminiscent to surface mount glue known in the art. Furthermore, the self-supporting polymer film provides the benefit that such film absorbs water to a lesser extent, if at all, compared to commonly applied foil made of EVA (a commonly used film material, as mentioned in the Background section, here above) in photochromism applications. One of the drawbacks of a photochromic film made of EVA is the tendency to absorb water to an unacceptable extent. For example, the self-supporting polymer film comprising aliphatic TPU, such as TPU based on polyether or polyester, does not suffer from this drawback.

The self-supporting film is suitable for being sandwiched in between layers of the common materials, i.e. transparent materials used in construction, windows, car glass, visors, goggles, etc., since the film is compatible with the materials in the sense that the film does not induce softening of the polymers applied in several of those transparent materials. For example, as mentioned in the Background section here above, photochromatic PVB is a commonly used film material. The photochromic molecules used for such applications (as mentioned in the Background section, here above) degrade at high temperatures. As such, these dyes commonly cannot be incorporated in standard plastic articles, such as those made of polycarbonates, which are, for example, produced by injection moulding or extrusion. The high temperatures of these manufacturing processes would destroy the photochromic properties of the material.

Photochromic PVB foil suffers from the drawback that the PVB softens and weakens polycarbonate once contacted with such material. It is now thus one of the many benefits of the film of the current self-supporting photochromic polymer film that such film is broadly applicable and compatible with transparent materials commonly applied in the art. Thus, the photochromic self-supporting polymer film provides for a more universally applicable film for the purpose of combining such film with layers of materials applied in the field of application of the photochromic effect and overcomes at least some of the degradation issues and use issues of past systems.

The self-supporting polymer film comprises further additives such as a light stabilizer and/or an anti-oxidant, in certain embodiments.

A second aspect of the invention relates a method for producing a self-supporting polymer film comprising between 0.0% and 12% by weight of a ketone based on the total weight of the self-supporting polymer film and further comprising at least one organic photochromic molecule comprising a chromophore, comprising the steps of:

a. providing an aliphatic thermoplastic polyurethane film wherein the polyurethane is based on an aliphatic diisocyanate selected from the aliphatic diisocyanates 1,4-tetramethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanatomethyl cyclopentane, IPDI, 5-isocyanato-1-(isocyanatomethyl)-1,3,3-trimethylcyclohexane, bis-(4-isocyanatocyclohexyl)-methane, 2,4'-dicyclohexylmethane diisocyanate, 1,3-bis(isocyanatometyl)-cyclohexane, 1,4-bis(isocyanatometyl)-cyclohexane, bis-(4-isocyanato-3-methylcyclohexyl)-methane, $\alpha,\alpha,\alpha',\alpha'$-tetramethyl-1,3-xylylen diisocyanate, $\alpha,\alpha,\alpha',\alpha'$-tetramethyl-1,4-xylylen diisocyanate, 1-isocyanato-1-methyl-4(3)-isocyanatomethyl cyclohexane, 2,4-hexahydrotoluylene diisocyanate, 2,6-hexahydrotoluylene diisocyanate, H12 MDI, HDI, or mixtures thereof, preferably selected from H12 MDI, HDI and IPDI, or mixtures thereof; providing a ketone selected from the ketones propan-2-one, butan-2-one, 3-methylbutan-2-one, pentan-2-one, pentan-3-one, cyclopentanone, 2-methylpentan-3-one, 3-methylpentan-2-one, 4-methylpentan-2-one, 4-methylpent-3-en-2-one, pentane-2,4-dione, hexan-2-one, 3,5,5-trimethyl-2-cyclohexene-1-one, 5-methylhexan-2-one, 1-cyclohexylpropan-1-one, 1-cyclohexylethanone, cyclohexanone, heptan-2-one, heptan-4-one, 2,6-dimethyl-4-heptanon, octan-3-one, octan-2-one, octan-4-one, or a mixture thereof; and providing at least one organic photochromic molecule comprising a chromophore selected from a diarylethene, a spirooxazine and a naphthopyran, or a combination thereof;

b. dissolving the at least one organic photochromic molecule comprising a chromophore of step a. in the ketone of step a. therewith providing a solution with a final concentration of the at least one organic photochromic molecule comprising a chromophore in the ketone of between 0.1% and 2.5% based on the weight of the solution;

c. immersing the aliphatic thermoplastic polyurethane film of step a. with the solution of step b., at a temperature of between 15° C. and 30° C., for a time period of at least 5 seconds; and d. drying the immersed aliphatic thermoplastic polyurethane film obtained with step c. for a time period of between 1 minute and 16 hours, at a temperature of between 45° C. and 75° C., such that the self-supporting polymer film is obtained.

The aliphatic thermoplastic polyurethane film in step a. preferably is a polyester-based TPU film or a polyether-based TPU film.

Preferably, in the method, the at least one organic photochromic molecule comprising a chromophore of step a. is a chromophore selected from polydialkylsiloxane-substituted naphthopyrans, preferably a polydialkylsiloxane-substituted naphthopyran capable of taking on a blue color or a green color when irradiated with ultraviolet radiation, and/or selected from 1-[2,4-dimethyl-5-(4-methylphenyl)-3-thienyl]-2-[2-methyl-5-(4-methylphenyl)-3-thienyl]-3,3,4,4,5,5-hexafluorocyclopentene and 1,2-bis(2-methoxy-5-phenyl-3-thienyl)perfluorocyclopentene, preferably in step a. at least two organic photochromic molecules comprising a chromophore are provided. Any single chromophore or any combination of a diarylethene, a spirooxazine and a naphthopyran can be selected for use in the method if the requirement is fulfilled that the organic photochromic molecule(s) comprising a chromophore is/are soluble in the selected ketone(s) at a concentration of at least 0.1% based on the weight of a solution of the ketone(s) containing the dissolved organic photochromic molecule(s) comprising a chromophore at a temperature of between 15° C. and 30° C. The chromophores may be the same or may be different chromophores in the at least one photochromic molecule(s). Preferred photochromic molecules comprised by the self-supporting polymer film are photochromic molecules or a combination of photochromic molecules that are typically activated upon exposure to radiation having a wavelength of between 360 nm and 450 nm, preferably 360-400 nm, such as about 380 nm or between 370 nm and 390 nm, or 360-380 nm.

In particular, the method provides the self-supporting polymer film, wherein said self-supporting polymer film comprises between 0.1% and 12% by weight of the ketone based on the total weight of the self-supporting polymer film, preferably between 3% and 8% by weight, or wherein the self-supporting polymer film comprises less than 0.1% by weight of the ketone based on the total weight of the self-supporting polymer film. It is preferred that the method provides the self-supporting polymer film, wherein said self-supporting polymer film comprises less than 0.1% by weight of the ketone based on the total weight of the self-supporting polymer film, such as about 0%.

In one embodiment, the ketone provided in step a. is selected from propan-2-one and cyclohexanone, preferably, the ketone is cyclohexanone, and/or the aliphatic thermoplastic polyurethane film of step a. is based on an aliphatic diisocyanate selected from H12 MDI, HDI and IPDI, or mixtures thereof, and/or the aliphatic thermoplastic polyurethane film of step a. is based on a polyester or on a polyether. It is preferred that the selected ketone is cyclohexanone and the aliphatic thermoplastic polyurethane film of step a. is based on an aliphatic diisocyanate selected from H12 MDI, HDI and IPDI and is based on a polyester. Equally preferred is that the ketone is cyclohexanone and the TPU is based on polyether.

One of the benefits of the method is the omission of a curing step after impregnating the thermoplastic polymer film with a (hot) solution of photochromic dye. Currently applied methods for producing photochromic films require such a cumbersome i.e., time- and material consuming additional curing step for the provision of photochromic film suitable for inclusion in laminate articles.

Currently available photochromic films also suffer from unacceptable wear and decay during relative short period of use, i.e. often within 100-500 hours of use, the current photochromic films are not applicable anymore for shielding against radiation such as ultraviolet radiation and/or for radiation heat, since the photochromic effect diminished in this time frame. Such low lifetimes incurs high costs with regard to replacement of worn films and use of raw materials. The films of the invention, however, have an extended life time with regard to the time period in which the photochromic film adequately changes color upon irradiation with ultraviolet radiation. That is to say, the self-supporting polymer film, such as a film comprising 2-11% by weight cyclohexanone or less than 0.1% by weight cyclohexanone based on the weight of the film, and comprising aliphatic TPU based on polyester or on polyether, has an extended life time of at least 2000 hours, as assessed in photo-stability tests known in the art. Surprisingly, the inventors established that the increased resistance against wear and decay of the photochromic effect of the film is accompanied by a relatively low value for the established decay half time. For the self-supporting polymer film, the decay half time is commonly 15 seconds or less, such as between 1 and 5 seconds, whereas the loss of photochromic activity upon exposure to ultraviolet light is surprisingly low in time. Thus, improved stability of the photochromic self-supporting polymer film is accompanied by yet a relatively high response speed when irradiating the film with ultraviolet radiation is stopped. Commonly, increasing photochromic film stability is hampered by occurrence of an accompanying increase in response time to changes in exposure to ultraviolet radiation, when photochromic films known in the art are assessed. These films known in the art typically suffer from the disadvantage that these films can take relatively long to switch between light and dark states for various applications (like automotive or aircraft windows). Thus, the current free-standing photochromic polymer film of the invention both improves lifetime and allows switching between light and dark states quickly.

As said, for the self-supporting photochromic TPU film, the loss of photochromic activity when irradiated with e.g. direct sunlight, under influence of exposure to ultraviolet light for over 100 hours, is surprisingly low. Referring to the Examples section and the Tables therein relating to results of loss of photochromic activity measurements, here below, wear when referring to loss of photochromic activity is 0%-40%, the extent of the wear relating to the amount of residual ketone remaining in the TPU film after treating the TPU film with the ketone (e.g. imbibement, immersion), followed by drying the imbibed TPU film. The photochromic self-supporting TPU film containing 0% of residual cyclohexanone, does not exhibit loss of photochromic activity at all after irradiating the laminate with UV light for over 100 hours, such as 100-2500 hours, such as 100 hours, 120 hours, 150 hours, 1000 hours, 2000 hours, or such film shows loss of photochromic activity of above 0%, such as less than 10%, such as 0%-9%. Similarly, the photochromic self-supporting TPU film containing 3% of residual cyclohexanone, does not exhibit loss of photochromic activity at all after irradiating the laminate with UV light for over 100 hours, such as 100-2500 hours, such as 100 hours, 120 hours, 150 hours, 1000 hours, 2000 hours, or such laminate shows loss of photochromic activity of above 0%, such as less than 20%, such as 0%-15%. The self-supporting TPU film containing 8% of residual cyclohexanone, does exhibit loss of photochromic activity after irradiating the laminate with UV light for over 100 hours, such as 100-2500 hours, such as 100 hours, 120 hours, 150 hours, 1000 hours, 2000 hours, wherein the loss of photochromic activity is 15%-50%, such as above 20%, above 25%, above 30%, about 30%, about 40%, or between 25% and 45%. The thickness of the self-supporting photochromic TPU film is 0.1 mm-3 mm, preferably 0.1 mm-0.8 mm, such as 0.1 mm-0.76 mm, 0.1 mm-0.68 mm, 0.34 mm-0.64 mm, or about 0.38 mm, 0.63 mm. The thickness of the optically transparent material in the laminate comprising the TPU film is 0.1 mm-2.5 mm, such as about 0.175 mm and about 2 mm. The optically transparent material is for example a polycarbonate and a glass. The content of at least one photochromic dye, preferably two dyes, preferably T-type organic photochromic molecules including spiropyrans, spirooxazines and naphthopyrans, is for example 0.5%-1.5% by weight of the TPU film for the at least one dye or for the more dyes together.

As said, the self-supporting polymer film does not have to be subjected to a curing step in the method in order to be suitable for adhering to transparent materials known in the field of applying photochromic laminates. Current photochromic films known in the art commonly have the drawback that a step of curing such films is required, before such films are applicable for laminating in between layers of further sheets of material applied in the field of applying photochromism.

According to the invention, the combination of a selected thermoplastic polymer film, e.g. an aliphatic TPU based on for example polyester or polyether and aliphatic diisocyanate, and a ketone imbibed in the polymer film or a ketone contacted with the film and subsequently fully discarded by drying, results in a self-supporting polymer film that has improved plasticity, i.e. increased plasticity, and a decreased storage modulus, i.e. is less stiff and/or has a more rubberlike appearance, compared to the thermoplastic polymer film that is not exposed to the ketone, immersed in the ketone, and that is thus not imbibed with the ketone. The method provides similar results with regard to the flexibility of the produced film, i.e. a decreased Young's modulus, when for example cyclohexanone is applied in the method or when for example acetone is applied. With the ketones listed here above the method provides a film which has at least 80% transparency, e.g. at least 84% transparency or at least 90% or 95%, when transmission of light of 400-750 nm is assessed after the film has been subjected to pressure and heat, such as 8-15 bar and about 140° C. for 1 second-10 minutes. Preferably, the transmission of the self-supporting polymer film of the invention is 95% or higher, e.g. 96%, 97%, 98%, 99%, 99.5%, 99.8% or 100%. For example, such transparent photochromic self-supporting polymer film is provided when the film obtained with the method is adhered at both sides of the film to sheets of transparent material commonly applied in applications for photochromic materials. Such transparent material commonly applied in applications for photochromic materials is for example optically transparent polycarbonate sheet or film, and glass such as soda lime glass, float glass.

A third aspect of the invention relates to a self-supporting polymer film obtainable by the method. It was found by the inventors that the method provides a photochromic film that does not turn yellow upon exposure to e.g. ultraviolet light and xenon light. Thus, the self-supporting polymer film obtainable by the method retains its transparency upon exposure to light, which is beneficial to the life time of the film when applied for its photochromic activity.

A fourth aspect of the invention relates to a use of the self-supporting polymer film or the self-supporting polymer film obtainable by the method in the manufacturing of an article. Such use, for example, relates to the manufacturing of car glass, glass cover for lights such as car lights, glass-based goggles, polymer-based goggles, glass- or polymer-based lenses for a glasses, glass- or polymer-based visors, window glass, construction material for buildings, etc. The inventors found that the photochromic self-supporting polymer film is particularly suitable as a host layer bonded between two transparent sheets of material commonly applied in the field of application of photochromic articles. As said before, the photochromic self-supporting polymer film, in particular aliphatic polyester-based TPU or polyether-based TPU imbibed with either acetone or cyclohexanone, is suitable for adherence to such transparent sheets of material used in the manufacturing of articles applied for the photochromic activity of included photochromic film, e.g. car windows, glazing for construction, glasses, lenses, etc. Thus, particularly suitable articles comprising the photochromic self-supporting polymer film are laminates made of transparent material, wherein the film is sandwiched in between such layers of transparent material.

A fifth aspect of the invention relates to an article comprising the self-supporting polymer film or the self-supporting Polymer film obtainable by the method.

DEFINITIONS

The term "chromophore" has its regular scientific meaning throughout the text, and here refers to the part of a molecule that defines the color of said molecule.

The term "photochromic" has its regular scientific meaning throughout the text, and here refers to being capable of darkening or changing color when exposed to light.

The term "photochromism" has its regular scientific meaning throughout the text, and here refers to the reversible transformation of a chemical entity between two molecular forms having different absorption spectra induced in one or both directions by photo-irradiation, such that a reversible change of color occurs upon exposure to light.

The term "float glass" has its regular scientific meaning throughout the text, and here refers to a sheet of glass made by floating molten glass on a bed of molten metal, giving the float glass sheet uniform thickness and two flat major surfaces.

DETAILED DESCRIPTION OF THE INVENTION

A first aspect of the invention relates to a self-supporting polymer film comprising:
 (a) a thermoplastic polymer;
 (b) between 0.0% and 12% by weight of a ketone based on the total weight of the self-supporting polymer film; and
 (c) at least one organic photochromic molecule comprising a chromophore, wherein said organic photochromic molecule comprising a chromophore is soluble in said ketone of (b) at a concentration of at least 0.1% based on the weight of a solution of the ketone containing the dissolved organic photochromic molecule comprising a chromophore at a temperature of between 15° C. and 30° C., wherein the thermoplastic polymer of (a) is thermoplastic polymer that is previously immersed in the solution of the ketone containing the dissolved organic photochromic molecule comprising a chromophore of (c) and then dried such that remaining ketone after said immersion and subsequent drying is imbibed in said thermoplastic polymer.

Surprisingly, the inventors found that when a sheet, foil or film of a thermoplastic polymer comprises imbibed ketone to a certain weight percentage based on the mass of the thermoplastic polymer, such as between about 0.1 wt % and 13 wt % ketone, or less than 0.1% by weight, such as between 0% and 0.05% by weight or even no residual ketone at all after a drying step, the sheet, foil or film becomes more flexible, due to enhanced plasticizing of the thermoplastic polymer. The effect of improved flexibility, i.e. decreased stiffness of the film or foil due to decreased Young's modulus, is also established when the thermoplastic polymer is first immersed in the ketone followed by completely drying the thermoplastic polymer from the ketone, although to a lower extent. Further surprisingly, the inventors thus also found that when the film of thermoplastic polymer, such as TPU, was immersed with ketone and subsequently completely dried again, the similar effect with regard to the improved flexibility, i.e. decreased stiffness of the film or foil due to decreased Young's modulus, was achieved when compared with a film immersed with ketone which still comprises imbibed ketone to a certain extent, e.g. between 3% and 8% by weight ketone based on the total weight of the self-supporting polymer film.

In particular, the self-supporting polymer film comprises between 0.1% and 12% by weight of the ketone based on the total weight of the self-supporting polymer film, or 0.1% by weight or less. It is therefore also part of the invention that the self-supporting polymer film comprises:
  a. a thermoplastic polymer;
  b. between 0.1% and 12% of a ketone based on the weight of the self-supporting polymer film, wherein the ketone is imbibed in said thermoplastic polymer; and
  c. at least one organic photochromic molecule comprising a chromophore, wherein the organic photochromic molecule comprising a chromophore is soluble in said ketone at a concentration of at least 0.1% based on the weight of a solution of the ketone containing the dissolved organic photochromic molecule comprising a chromophore at a temperature of between 15° C. and 30° C.

It is also part of the invention that the self-supporting polymer film comprises:
  a. a thermoplastic polymer;
  b. less than 0.1% by weight ketone based on the weight of the self-supporting polymer film, wherein the ketone is imbibed in said thermoplastic polymer; and
  c. at least one organic photochromic molecule comprising a chromophore, wherein the organic photochromic molecule comprising a chromophore is soluble in said ketone at a concentration of at least 0.1% based on the weight of a solution of the ketone containing the dissolved organic photochromic molecule comprising a chromophore at a temperature of between 15° C. and 30° C.

In preferred embodiments, the self-supporting polymer film comprises at least one organic photochromic molecule comprising a chromophore, wherein said at least one organic photochromic molecule comprising a chromophore is evenly distributed in the self-supporting polymer film.

It is preferred that the thermoplastic polymer comprised by the self-supporting polymer film, is an aliphatic thermoplastic polyurethane, preferably a polyester-based aliphatic thermoplastic polyurethane or a polyether-based aliphatic thermoplastic polyurethane.

According to embodiments, the self-supporting polymer film comprises an aliphatic thermoplastic polyurethane, wherein this aliphatic thermoplastic polyurethane is based on an aliphatic diisocyanate selected from 1,4-tetramethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanatomethyl cyclopentane, IPDI, 5-isocyanato-1-(isocyanatomethyl)-1,3,3-trimethylcyclohexane, bis-(4-isocyanatocyclohexyl)-methane, 2,4'-dicyclohexyl-methane diisocyanate, 1,3-bis(isocyanatometyl)-cyclohexane, 1,4-bis(isocyanatometyl)-cyclohexane, bis-(4-isocyanato-3-methylcyclohexyl)-methane, α,α,α',α'-tetramethyl-1,3-xylylen diisocyanate, α,α,α',α'-tetramethyl-1,4-xylylen diisocyanate, 1-isocyanato-1-methyl-4(3)-isocyanatomethyl cyclohexane, 2,4-hexahydrotoluylene diisocyanate, 2,6-hexahydrotoluylene diisocyanate, H12 MDI, HDI, or mixtures thereof, preferably selected from H12 MDI, HDI and IPDI, or mixtures thereof. It is preferred to include an aliphatic thermoplastic polyurethane (TPU) film in the self-supporting polymer film, wherein the TPU film is produced using a polyester base and a diisocyanate moiety comprising one or more of the here above listed aliphatic groups. Equally preferred is an aliphatic TPU based on a polyether and diisocyanates. The TPU film comprised by the self-supporting polymer film is manufactured according to procedures known in the art, which manufacturing is not part of the current inventive concept.

The inventors found that for the self-supporting polymer film the glass transition temperature Tg (Tan Delta) is decreased to a surprisingly large extent, e.g. from Tg (Tan Delta)=12° C. for the thermoplastic polymer which is not treated with a ketone, and which does not comprise imbibed ketone, to for example 7° C. or even as low as −1° C., after immersion of the very same thermoplastic polymer in e.g. cyclohexanone or acetone. This decrease in softening temperature is accompanied with a decreased storage modulus for the self-supporting polymer film, further demonstrating the reduced stiffness of the self-supporting polymer film with imbibed ketone when compared to the stiffness of the thermoplastic polymer before immersion with a ketone. Thus, the self-supporting polymer film comprising imbibed ketone can have a Tg which is at least 1° C. lower than the Tg for a similar film made of the thermoplastic polymer comprised by the film of the invention, though not comprising the imbibed ketone, preferably the Tg is at least 2° C. lower, such as 4° C. lower, 6° C. lower, 8° C. lower, 10° C. lower, 12° C. lower, 14° C. lower or 16° C. lower. It is preferred that the Tg (Tan Delta) for the self-supporting polymer film of the invention is for example between 2° C. and 30° C. lower than the Tg (Tan Delta) of the thermoplastic polymer comprised by the film of the invention, though lacking the imbibed ketone, such as about 13° C. lower, although even a larger difference in Tg (Tan Delta) is also applicable. The Tg for the self-supporting polymer film not comprising ketone anymore after immersion of thermoplastic polymer with ketone followed by complete drying such that the film does not comprise remaining ketone, is for example 16° C. for an S123 TPU film (PPG Aerospace).

In particular, the self-supporting polymer film comprises imbibed ketone, wherein said ketone is selected from any one or more of a straight-chain ketone, a branched ketone, an unsubstituted cyclic ketone and a cyclic ketone substituted with at least one alkyl group, or a combination thereof, preferable selected from a straight-chain ketone and an unsubstituted cyclic ketone.

In particular, the self-supporting polymer film is imbibed with ketone and subsequently the ketone is fully discarded from the film by drying the film after immersion with the ketone, wherein said ketone is selected from any one or more of a straight-chain ketone, a branched ketone, an unsubstituted cyclic ketone and a cyclic ketone substituted with at least one alkyl group, or a combination thereof, preferable selected from a straight-chain ketone and an unsubstituted cyclic ketone.

Preferred is a self-supporting polymer film, wherein the ketone is selected from any one or more of a linear ketone saturated with hydrogen, a branched ketone saturated with hydrogen, an unsubstituted cyclic ketone saturated with hydrogen and a cyclic ketone substituted with at least one alkyl group and further saturated with hydrogen, or a combination thereof, preferable selected from a linear ketone saturated with hydrogen, a branched ketone saturated with hydrogen, an unsubstituted cyclic ketone saturated with hydrogen and a cyclic ketone substituted with at least one alkyl group further saturated with hydrogen. In particular, the ketone is a ketone, wherein the number of carbon atoms is between three and ten for the linear ketone, between five and ten for the branched ketone, between three and ten for the unsubstituted cyclic ketone, and between four and ten for the cyclic ketone substituted with at least one alkyl group. According to the invention, a ketone is suitable for application as the solvent for dissolving the at least one organic photochromic molecule comprising a chromophore, when the organic photochromic molecule comprising a chromophore is soluble in said ketone at a concentration of at least 0.1% based on the weight of a solution of the ketone containing the dissolved organic photochromic molecule comprising a chromophore at a temperature of between 15° C. and 30° C., preferably at least 0.5%. The inventors found that for most self-supporting polymer films it is sufficient and efficacious to immerse the thermoplastic polymer with a ketone in which a dye, i.e. the at least one organic photochromic molecule comprising a chromophore, is dissolved to a final concentration of about 0.5 wt % based on the weight of the solvent, i.e. the ketone. This way, the dye is efficiently distributed throughout the whole volume of the sheet of thermoplastic polymer, e.g. aliphatic TPU based on polyester or polyether and on aliphatic diisocyanate. As said before, after immersion, ketone remains in the thermoplastic polymer to a certain extent, e.g. 0.1-12% by weight or less than 0.1% by weight ketone based on the total weight of the self-supporting polymer film, or ketone is fully discarded from the thermoplastic polymer by drying after immersion.

It is preferred that the ketone comprised by the self-supporting polymer film, is selected from any one of propan-2-one, butan-2-one, 3-methylbutan-2-one, pentan-2-one, pentan-3-one, cyclopentanone, 2-methylpentan-3-one, 3-methylpentan-2-one, 4-methylpentan-2-one, 4-methylpent-3-en-2-one, pentane-2,4-dione, hexan-2-one, 3,5,5-trimethyl-2-cyclohexene-1-one, 5-methylhexan-2-one, 1-cyclohexylpropan-1-one, 1-cyclohexylethanone, cyclohexanone, heptan-2-one, heptan-4-one, 2,6-dimethyl-4-heptanon, octan-3-one, octan-2-one, octan-4-one, or a mixture thereof, preferably the ketone is selected from propan-2-one and cyclohexanone, more preferably the ketone is cyclohexanone. In these ketones, a large series of organic photochromic molecule comprising a chromophore suitable for distribution in the self-supporting polymer film, dissolve to an extent sufficient for the purpose of impregnating the complete self-supporting polymer film. It will be appreciated that any ketone is applicable within the scope of the current invention, as long as a selected dye dissolves in said ketone to a suitable extent, e.g. about 0.5 wt %, and as long as said ketone is imbibed in the thermoplastic polymer and induces a decrease of the storage modulus and a decrease in Tg. The ketone thus serves at least two purposes: as a carrier for dividing the dissolved dye throughout the whole volume of the sheet or film of thermoplastic polymer, and as a plasticizer capable of increasing the plasticity and flexibility of the self-supporting polymer film. Surprisingly, these purposes are also achieved when the ketone is fully removed out of the thermoplastic polymer after immersion of said polymer with a solution containing ketone with dissolved organic photochromic molecule comprising a chromophore. Then, for example for a selected TPU (S123, PPG Aerospace), Tg was 16° C. for a self-supporting polymer film immersed in ketone followed by completely discarding the ketone, compared to a Tg of 12° C. for the same TPU film that was not immersed in ketone, whereas the TPU film treated with ketone became more flexible than the untreated film and stayed transparent upon ketone immersion followed by drying.

In one embodiment, the self-supporting polymer film comprises between 1% and 10% by weight ketone based on the total weight of the self-supporting polymer film, preferably between 1,5% and 8% by weight, more preferably between 2% and 6% by weight, most preferably about 3% by weight ketone based on the total weight of the self-supporting polymer film. For example, the self-supporting polymer film comprises 1%, 2%, 3%, 4%, 5%, 6%, 8%, 9% or 10% by weight of the ketone based on the total weight of the self-supporting polymer film, the ketone imbibed in the thermoplastic polymer, or any weight percentage in between these listed values. Equally preferred is a self-supporting polymer film comprising less than 0.1% by weight ketone based on the total weight of said film, such as about 0% by weight. According to a series of tests, for example self-supporting polymer film comprising 2-4 wt % ketone based on the total weight of the self-supporting polymer film, or for example 7-11 wt %, has significantly improved Tg, that is to say a decreased Tg (Tan Delta) when compared to a similar film of the thermoplastic material which has not been immersed with a ketone.

In a preferred self-supporting polymer film, said self-supporting polymer film comprises at least one organic photochromic molecule comprising a chromophore selected from one or more of a diarylethene, a spirooxazine and a naphthopyran, or a combination thereof, preferably the self-supporting polymer film comprises at least two organic photochromic molecules comprising a chromophore. Such a mixture of at least two organic photochromic molecules comprising a chromophore provides the self-supporting polymer film with the ability to turn from essentially colorless to a color which is a mixture of the colors of the at least two organic photochromic molecules comprising a chromophore upon exposure of these chromophores to e.g. ultraviolet radiation. Preferably, the obtained color for the self-supporting polymer film comprising at least two organic photochromic molecules comprising a chromophore is for example a brown color, a dark blue color, a dark green color and/or a color between light gray and black. It will be appreciated by the skilled person that dyes other than organic photochromic molecules comprising a chromophore selected from a diarylethene, a spirooxazine and a naphthopyran, are equally applicable, if a ketone is selected in which the alternative dye or dyes dissolve to a sufficient extent, e.g. 0.1-1.5 wt % based on the weight of the solution, and if the very same ketone is suitable for inducing the increased flexibility and reduced rigidity, amongst others expressed as a decreased value for Tg (Tan Delta), when a thermoplastic polymer, preferably an aliphatic TPU such as an aliphatic TPU based on a polyester and an aliphatic diisocyanate, is immersed with the solution comprising the ketone and the dye(s), such that at least e.g. 2 wt % of the ketone is imbibed in the polymer film after drying based on the weight of the polymer film, and such that the dye(s) are evenly distributed in the polymer film.

The self-supporting polymer film comprises in preferred embodiments at least ne organic photochromic molecule comprising a chromophore selected from polydialkylsiloxane-substituted naphthopyrans, preferably a polydialkylsiloxane-substituted naphthopyran capable of taking on a blue color or a green color when irradiated with ultraviolet radiation, and/or selected from 1-[2,4-dimethyl-5-(4-methylphenyl)-3-thienyl]-2-[2-methyl-5-(4-methylphenyl)-3-thienyl]-3,3,4,4,5,5-hexafluorocyclopentene and 1,2-bis(2-methoxy-5-phenyl-3-thienyl)perfluorocyclopentene, preferably the self-supporting polymer film comprises at least two selected organic photochromic molecules comprising a chromophore. The polydialkylsiloxane-substituted naphthopyran is typically an organic photochromic molecule comprising a chromophore comprising two chromophore moieties of the same type, although this not required.

It is preferred that the self-supporting polymer film has a thickness of 0.050 mm-6.50 mm such as 0.10 mm-6.50 mm, or between 0.20 mm and 6.50 mm, preferably between 0.30 mm and 2.60 mm, more preferably between 0.38 mm and 0.68 mm, most preferably about 0.63 mm. In particular, application of a thermoplastic film having a thickness of for example between 0.30 mm and 0.80 mm is preferred in the self-supporting polymer film according to the invention, such as a thermoplastic film having a thickness of for example about 0.38 mm, or 0.63 mm or 0.68 mm. A film having a thickness of about 100 micrometer is equally preferred. Immersion of a sheet or film of thermoplastic polymer, preferably an aliphatic TPU such as polyester-based TPU or polyether-based TPU, with an aforementioned ketone such as acetone or cyclohexanone, with the least one organic photochromic molecule comprising a chromophore, preferably two of such organic photochromic molecules comprising a chromophore of a different kind, dissolved therein, is very efficient when the thickness of the film is 6.50 mm or less, such as 1.0 mm or less, for example about 0.7 mm or about 0.4 mm or about 0.20 mm or about 0.10 mm, with regard to the even distribution of the dye throughout the complete volume of the polymer and with regard to the establishment of the induction of reduced flexibility, i.e. decreased Tg (Tan Delta) and/or increased flexibility of the thermoplastic polymer. Furthermore, incubating thermoplastic films, e.g. aliphatic TPU films with a thickness of e.g. smaller than 2 mm results in self-supporting polymer film having a surprisingly smooth surface. For example, an aliphatic TPU based on a polyester and an aliphatic diisocyanate regularly has a relatively opaque and rough surface comprising recesses and protrusions to some extent. Upon exposure to a ketone, that is to say, for example the aliphatic TPU comprising a ketone imbibed in the polymer sheet at an amount of e.g. 1-10 wt % based on the weight of the self-supporting polymer film, having e.g. a thickness of about 0.35 mm or about 0.65 mm, is relatively smooth. The aliphatic TPU is preferably a polyester-based TPU or a polyether-based TPU.

The inventors found that in tests for assessing the decay half time of the switch in color when irradiation of a self-supporting polymer film with ultraviolet radiation is disrupted, back to the color of the film before being exposed to ultraviolet radiation, the decay half time is surprisingly short compared to the decay half time of photochromic polymer films currently in use. That is to say, the decay half time of the self-supporting polymer film of the invention is typically 30 seconds or less, such as for example 20 second or less, 15 seconds or less, 10 seconds or less, or even 5 seconds or less. Moreover, many of the self-supporting polymer films of the invention have a decay half time of even about 1 second or even less, as assessed with spectroscopic measurements determining values for L, a and b according methods known in the art. Such decay half time of 10 seconds, 5 seconds, or even 4, 3, 2 or 1 second are much shorter than what is common for photochromic films nowadays in use for applications such as ski goggles, sunglasses, glazing for buildings, car glass, etc., or glass or polymers used in aerospace industry. With such short decay half time of the self-supporting polymer film, due to improved Tg and storage modulus and loss modulus, i.e. lowered values for Tg (Tan Delta) and the storage modules and increased values for the loss modulus, application of the self-supporting polymer film in articles requiring a fast reaction time with regard to coloring from a relatively dark color upon irradiation with ultraviolet radiation, to a relatively light color or even a colorless state when the source of ultraviolet radiation is absent. That is to say, applying the self-supporting polymer film in for example laminate type of articles for, for example, use in construction, glasses, visors for helmets, etc., now allows for the provision of articles having a relative short response time when the intensity of ultraviolet radiation to which the article is exposed, decreases.

A second aspect of the invention relates to a method for producing a self-supporting polymer film comprising between 0.0% and 12% by weight of a ketone based on the total weight of the self-supporting polymer film and further comprising at least one organic photochromic molecule comprising a chromophore, comprising the steps of:

a. providing an aliphatic thermoplastic polyurethane film wherein the polyurethane is based on an aliphatic diisocyanate selected from the aliphatic diisocyanates 1,4-tetramethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanatomethyl cyclopentane, IPDI, 5-isocyanato-1-(isocyanatomethyl)-1,3,3-trimethylcyclohexane, bis-(4-isocyanatocyclohexyl)-methane, 2,4'-dicyclohexylmethane diisocyanate, 1,3-bis (isocyanatometyl)-cyclohexane, 1,4-bis (isocyanatometyl)-cyclohexane, bis-(4-isocyanato-3-methylcyclohexyl)-methane, α,α,α',α'-tetramethyl-1,3-xylylen diisocyanate, α,α,α',α'-tetramethyl-1,4-xylylen diisocyanate, 1-isocyanato-1-methyl-4(3)-isocyanatomethyl cyclohexane, 2,4-hexahydrotoluylene diisocyanate, 2,6-hexahydrotoluylene diisocyanate, H12 MDI, HDI, or mixtures thereof, preferably selected from H12 MDI, HDI and IPDI, or mixtures thereof; providing a ketone selected from the ketones propan-2-one, butan-2-one, 3-methylbutan-2-one, pentan-2-one, pentan-3-one, cyclopentanone, 2-methylpentan-3-one, 3-methylpentan-2-one, 4-methylpentan-2-one, 4-methylpent-3-en-2-one, pentane-2,4-dione, hexan-2-one, 3,5,5-trimethyl-2-cyclohexene-1-one, 5-methylhexan-2-one, 1-cyclohexylpropan-1-one, 1-cyclohexylethanone, cyclohexanone, heptan-2-one, heptan-4-one, 2,6-dimethyl-4-heptanon, octan-3-one, octan-2-one, octan-4-one, or a mixture thereof; and providing at least one organic photochromic molecule comprising a chromophore selected from a diarylethene, a spirooxazine and a naphthopyran or a combination thereof;

b. dissolving the at least one organic photochromic molecule comprising a chromophore of step a. in the ketone of step a. therewith providing a solution with a final concentration of the at least one organic photochromic molecule comprising a chromophore in the ketone of between 0.1% and 2.5% based on the weight of the solution;

c. immersing the aliphatic thermoplastic polyurethane film of step a. with the solution of step b., at a temperature of between 15° C. and 30° C., for a time period of at least 5 seconds; and d. drying the immersed aliphatic thermoplastic polyurethane film obtained with step c. for a time period of between 1 minute and 16 hours, at a temperature of between 45° C. and 75° C., such that the self-supporting polymer film is obtained.

It is preferred that in the method an aliphatic TPU is applied selected from aliphatic polyester-based TPU and aliphatic polyether-based TPU.

A further aspect of the invention relates to a method for producing a self-supporting polymer film comprising between 0.1% and 12% of a ketone based on the weight of the self-supporting polymer film and further comprising at least one organic photochromic molecule comprising a chromophore, comprising the steps of:

a. providing an aliphatic thermoplastic polyurethane film wherein the polyurethane is based on an aliphatic diisocyanate selected from the aliphatic diisocyanates 1,4-tetramethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanatomethyl cyclopentane, IPDI, 5-isocyanato-1-(isocyanatomethyl)-1,3,3-trimethylcyclohexane, bis-(4-isocyanatocyclohexyl)-methane, 2,4'-dicyclohexylmethane diisocyanate, 1,3-bis(isocyanatometyl)-cyclohexane, 1,4-bis(isocyanatometyl)-cyclohexane, bis-(4-isocyanato-3-methylcyclohexyl)-methane, α,α,α',α'-tetramethyl-1,3-xylylen diisocyanate, α,α,α',α'-tetramethyl-1,4-xylylen diisocyanate, 1-isocyanato-1-methyl-4(3)-isocyanatomethyl cyclohexane, 2,4-hexahydrotoluylene diisocyanate, 2,6-hexahydrotoluylene diisocyanate, H12 MDI, HDI, or mixtures thereof, preferably selected from H12 MDI, HDI and IPDI, or mixtures thereof; providing a ketone selected from the ketones propan-2-one, butan-2-one, 3-methylbutan-2-one, pentan-2-one, pentan-3-one, cyclopentanone, 2-methylpentan-3-one, 3-methylpentan-2-one, 4-methylpentan-2-one, 4-methylpent-3-en-2-one, pentane-2,4-dione, hexan-2-one, 3,5,5-trimethyl-2-cyclohexene-1-one, 5-methylhexan-2-one, 1-cyclohexylpropan-1-one, 1-cyclohexylethanone, cyclohexanone, heptan-2-one, heptan-4-one, 2,6-dimethyl-4-heptanon, octan-3-one, octan-2-one, octan-4-one, or a mixture thereof; and providing at least one organic photochromic molecule comprising a chromophore selected from a diarylethene, a spirooxazine and a naphthopyran, or a combination thereof;

b. dissolving the at least one organic photochromic molecule comprising a chromophore of step a. in the ketone of step a. therewith providing a solution with a final concentration of the at least one organic photochromic molecule comprising a chromophore in the ketone of between 0.1% and 2.5% based on the weight of the solution;

c. immersing the aliphatic thermoplastic polyurethane film of step a. with the solution of step b., at a temperature of between 15° C. and 30° C., for a time period of at least 5 seconds; and d. drying the immersed aliphatic thermoplastic polyurethane film obtained with step c. for a time period of between 1 minute and 16 hours, at a temperature of between 45° C. and 75° C., such that the self-supporting polymer film is obtained.

It is preferred that in the method an aliphatic TPU is applied selected from aliphatic polyester-based TPU and aliphatic polyether-based TPU.

Yet a further aspect of the invention relates to a method for producing a self-supporting polymer film comprising between 0.1% and 12% of a ketone based on the weight of the self-supporting polymer film and further comprising at least one organic photochromic molecule comprising a chromophore, comprising the steps of:

a. providing an aliphatic thermoplastic polyurethane film wherein the polyurethane is based on an aliphatic diisocyanate selected from the aliphatic diisocyanates 1,4-tetramethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanatomethyl cyclopentane, IPDI, 5-isocyanato-1-(isocyanatomethyl)-1,3,3-trimethylcyclohexane, bis-(4-isocyanatocyclohexyl)-methane, 2,4'-dicyclohexylmethane diisocyanate, 1,3-bis(isocyanatometyl)-cyclohexane, 1,4-bis(isocyanatometyl)-cyclohexane, bis-(4-isocyanato-3-methylcyclohexyl)-methane, α,α,α',α'-tetramethyl-1,3-xylylen diisocyanate, α,α,α',α'-tetramethyl-1,4-xylylen diisocyanate, 1-isocyanato-1-methyl-4(3)-isocyanatomethyl cyclohexane, 2,4-hexahydrotoluylene diisocyanate, 2,6-hexahydrotoluylene diisocyanate, H12 MDI, HDI, or mixtures thereof, preferably selected from H12 MDI, HDI and IPDI, or mixtures thereof; providing a ketone selected from the ketones propan-2-one, butan-2-one, 3-methylbutan-2-one, pentan-2-one, pentan-3-one, cyclopentanone, 2-methylpentan-3-one, 3-methylpentan-2-one, 4-methylpentan-2-one, 4-methylpent-3-en-2-one, pentane-2,4-dione, hexan-2-one, 3,5,5-trimethyl-2-cyclohexene-1-one, 5-methylhexan-2-one, 1-cyclohexylpropan-1-one, 1-cyclohexylethanone, cyclohexanone, heptan-2-one, heptan-4-one, 2,6-dimethyl-4-heptanon, octan-3-one, octan-2-one, octan-4-one, or a mixture thereof; and providing at least one organic photochromic molecule comprising a chromophore selected from a diarylethene, a spirooxazine and a naphthopyran, or a combination thereof;

b. dissolving the at least one organic photochromic molecule comprising a chromophore of step a. in the ketone of step a. therewith providing a solution with a final concentration of the at least one organic photochromic molecule comprising a chromophore in the ketone of between 0.1% and 2.5% based on the weight of the solution;

c. immersing the aliphatic thermoplastic polyurethane film of step a. with the solution of step b., for a time period of at least 5 seconds; and d. drying the immersed aliphatic thermoplastic polyurethane film obtained with step c. for a time period of between 1 minute and 16 hours, at a temperature of between 45° C. and 75° C., such that the self-supporting polymer film is obtained.

Preferably, in the method, in step c. the aliphatic thermoplastic polyurethane film is immersed with the solution of step b. at a temperature of between 8° C. and 60° C., preferably between 10° C. and 50° C., more preferably between 12° C. and 40° C., most preferably between 15° C. and 30° C. For example, the film is immersed in the solution, wherein the temperature of the solution is room temperature, or ambient temperature, such as between about 17° C. and about 25° C., such as about 19° C. and 21° C.

It is preferred that the amount of the at least one organic photochromic molecule comprising a chromophore in the ketone is between 0.3% and 1.0% based on the weight of the solution, preferably about 0.5 wt %. Immersing a thermoplastic film, preferably an aliphatic TPU, more preferably an aliphatic TPU based on a polyester and based on an aliphatic diisocyanate or an aliphatic TPU based on a polyether and based on diisocyanates, with a ketone with the at least one organic photochromic molecule comprising a chromophore dissolved therein at a concentration of about 0.4-0.6 wt % based on the weight of the solution comprising the dye, is efficient and enough to fully and evenly impregnate the thermoplastic polymer film with the dye, while simultaneously the thermoplastic polymer film is fully imbibed with the ketone. Typically, about one square meter of the aliphatic TPU is immersed with at least 300 ml of the solution comprising the ketone and the dye, preferably at least two different dyes, more preferably two different dyes. Preferably, the one square meter of the thermoplastic polymer film having a thickness of between 0.1 mm and 6.5 mm, typically between 0.3 mm and 1.0 mm such as about 0.38 mm or about 0.63 mm or about 0.68 mm for an aliphatic TPU, such as an aliphatic TPU based on a polyester and based on an aliphatic diisocyanate, or an aliphatic polyether based TPU is immersed with between 350 ml and 1000 ml, such as between 400 ml and 450 ml, according to the method. Applying such volume of ketone with dye dissolved therein ensures an equal distribution of the dye(s) throughout the polymer film and ensures a self-supporting aliphatic TPU film of the invention that is evenly imbibed with e.g. 1-11 wt % ketone(s) based on the weight of the self-supporting film, preferably about 2-6 wt %, such as about 3.5 wt % or 3.0 wt %. Equally preferred is a self-supporting polymer film comprising two dyes and with about 6-12 wt % of imbibed ketone or ketones based on the weight of the film. Also preferred is a self-supporting polymer film comprising two dyes and with less than 0.1 wt % of imbibed ketone or ketones based on the weight of the film, such as 0 wt % ketone (i.e. all ketone is removed after immersion of thermoplastic polymer with ketone, such as for example complete removal of the imbibed ketone from the film by a drying step).

Preferably, in the method, the at least one organic photochromic molecule comprising a chromophore of step a. is a chromophore selected from polydialkylsiloxane-substituted naphthopyrans, preferably a polydialkylsiloxane-substituted naphthopyran capable of taking on a blue color or a green color when irradiated with ultraviolet radiation, and/or selected from 1-[2,4-dimethyl-5-(4-methylphenyl)-3-thienyl]-2-[2-methyl-5-(4-methylphenyl)-3-thienyl]-3,3,4,4,5,5-hexafluorocyclopentene and 1,2-bis(2-methoxy-5-phenyl-3-thienyl)perfluorocyclopentene, preferably in step a. at least two organic photochromic molecules comprising a chromophore are provided. Any single chromophore or any combination of a diarylethene, a spirooxazine and a naphthopyran can be selected for use in the method, if the requirement is fulfilled that the organic photochromic molecule(s) comprising a chromophore is/are soluble in the selected ketone(s) at a concentration of at least 0.1% based on the weight of a solution of the ketone(s) containing the dissolved organic photochromic molecule(s) comprising a chromophore at a temperature of between 15° C. and 30° C. Referring to the Examples section, for example particular improved self-supporting polymer films were obtainable when for example Reversacol dyes such as Ocean Green, Pennine Green or Humber Blue (Vivimed Labs Europe Ltd), or combinations thereof, were evenly distributed in the thermoplastic polymer applying the method. Spectral data collected before and after exposure of the self-supporting polymer film comprising such polydialkylsiloxane-substituted naphthopyrans, provided the insight that the decay half time of such films are relatively short, i.e. 60 seconds or less, such as for example 15 seconds or less, or 10 seconds or less, or 5 seconds or less, such as for example about 1 second. For further details, see the Examples section, below. Preferred photochromic molecules for application in the self-supporting polymer film are for example the photochromic molecules outlined in U.S. Pat. No. 8,865,029 B2, Example 3, column 46, line 42 to column 50, line 2, Example 4, column 50, line 4 to column 51 line 4, Example 6, column 62, line 50 to column 53, line 30, Example 7, column 53, line 32 to column 54, line 20, and Example 9, column 57, line 50 to column 63, line 20.

The method is equally suitable for application of any combination of two or more dyes such as Reversacol dyes such as Ocean Green, Pennine Green or Humber Blue, any polydialkylsiloxane-substituted naphthopyran, a diarylethene, a spirooxazine and a naphthopyran, as long as such combination of dyes is sufficiently soluble in the ketone or mixture of ketones, preferably acetone or cyclohexanone, more preferably, cyclohexanone, that is to say at least about 0.1 wt % of each dye is soluble in the ketone(s), based on the weight of the provided solution. Combination of dyes are for example desired when a dark color is desired upon exposure of a transparent or semi-transparent article comprising a layer of the self-supporting polymer film to ultraviolet radiation. Dark colors such as a brown color or a dark gray color is for example achievable when a self-supporting polymer film comprises at least two different dyes that together appear as e.g. a brown-colored dye or gray-colored dye when an article comprising a layer of the self-supporting polymer film is exposed to ultraviolet radiation. Shielding the self-supporting polymer film from further exposure to the ultraviolet radiation results in a relative fast discoloring step, with a decay half-life of for example 10 seconds or less such as about 5 seconds or less.

A self-supporting polymer film which has a relative low Young's modulus of for example 4 MPa or less is for example achieved when a thermoplastic polymer such as an aliphatic TPU is immersed in a ketone such as acetone or cyclohexanone. In one embodiment, in the method, the ketone provided in step a. is selected from propan-2-one and cyclohexanone, preferably, the ketone is cyclohexanone, and/or wherein the aliphatic thermoplastic polyurethane film of step a. is based on an aliphatic diisocyanate selected from H12 MDI, HDI and IPDI, or mixtures thereof, and/or wherein the aliphatic thermoplastic polyurethane film of step a. is based on a polyester or a polyether. It is preferred that the selected ketone is cyclohexanone and the aliphatic thermoplastic polyurethane film of step a. is based on an aliphatic diisocyanate selected from H12 MDI, HDI and IPDI and is based on a polyester. It is also preferred that the selected ketone is cyclohexanone and the aliphatic thermoplastic polyurethane film of step a. is based on a diisocyanate and is based on a polyether.

Typical further components in the self-supporting polymer film are common additives in polymer compositions, blends and plastics known in the art, such as stabilizers, compatibilizers, anti-oxidants, clarifying agents, plasticizers, and pigments. In one embodiment, the self-supporting polymer film comprises an anti-oxidant as an additive, for example between about 0.1 wt % and 2 wt % anti-oxidant based on the weight of the self-supporting polymer film.

It is preferred that the method provides a self-supporting polymer film, wherein said self-supporting polymer film comprises between 0.1% and 12% by weight of the ketone based on the total weight of the self-supporting polymer film, preferably between 3% and 8% by weight.

A third aspect of the invention relates to a self-supporting polymer film obtainable by the method. An aspect of the invention thus relates to a self-supporting polymer film obtainable by any of the methods for producing a self-supporting polymer film outlined here above.

A fourth aspect of the invention relates to a use of the self-supporting polymer film of the invention or the self-supporting polymer film obtainable by the method of the invention in the manufacturing of an article. Such use for example relates to the manufacturing of car glass, glass cover for lights such as car lights, glass-based goggles, polymer-based goggles, glass- or polymer-based lenses for a glasses, glass- or polymer-based visors, window glass, construction material for buildings, etc.

A fifth aspect of the invention relates to an article comprising the self-supporting polymer film or the self-supporting polymer film obtainable by the method. Again, here 'the method' should be read as 'any of the methods for producing a self-supporting polymer film outlined here above'.

While the invention has been described in terms of several embodiments, it is contemplated that alternatives, modifications, permutations and equivalents thereof will become apparent to one having ordinary skill in the art upon reading the specification and upon study of the drawings. The invention is not limited in any way to the illustrated embodiments. Changes can be made without departing from the scope which is defined by the appended claims.

The invention is further illustrated by the following examples, which should not be interpreted as limiting the present invention in any way.

EXAMPLES

A series of self-supporting polymer films were prepared.
The method that was used for producing the exemplifying self-supporting polymer films was as follows:
an aliphatic thermoplastic polyurethane film was provided, the film typically having a size of about 1 square meter and typically having a thickness of about 0.38 mm, 0.63 mm or 0.68 mm;
a ketone was provided;
at least one organic photochromic molecule comprising a chromophore was provided;
the at least one organic photochromic molecule comprising a chromophore was dissolved in the ketone to provide a solution of the ketone comprising between 0.1% and 5% of the at least one organic photochromic molecule comprising a chromophore based on the weight of the solution, typically 0.5% of each organic photochromic molecule comprising a chromophore, based on the weight of the solution, that was dissolved in the ketone;
the about 1 square meter of aliphatic thermoplastic polyurethane film was immersed at room temperature with about 200 ml to 900 ml, typically about 400-450 ml of the solution of ketone comprising the at least one dissolved organic photochromic molecule comprising a chromophore, typically at a temperature of between 17° C. and 24° C., such as about 18° C., 19° C., 20° C., 21° C. or 22° C., typically for about 40 seconds to 100 seconds, such as about 60 seconds, such that the film is imbibed with the ketone and such that the at least one organic photochromic molecule comprising a chromophore is evenly distributed in the aliphatic thermoplastic polyurethane film;
after immersing the aliphatic thermoplastic polyurethane film with organic photochromic molecule comprising a chromophore in ketone, the immersed film is dried for about 90 minutes in a hot-air oven set at a temperature of about 60° C.,
such that self-supporting polymer films were provided.

Homogeneous and even distribution of the organic photochromic molecule comprising a chromophore in the thermoplastic polymer, here a TPU film, was established by visualizing the photochromic effect which was apparent equally distributed throughout the whole volume of the TPU film.

In Table 1, an overview is provided of a series of self-supporting polymer films, prepared according to the method here-above described. In summary, a series of aliphatic thermoplastic polyurethanes having varying sheet thickness as indicated in Table 1, purchased from PPG (USA), were immersed with varying solutions consisting of cyclohexanone or acetone with varying organic photochromic molecule comprising a chromophore dissolved therein, such as Reversacol Pennine Green and Reversacol Humber Blue (Vivimed Labs Europe Ltd) and/or 1-[2,4-dimethyl-5-(4-methylphenyl)-3-thienyl]-2-[2-methyl-5-(4-methylphenyl)-3-thienyl]-3,3,4,4,5,5-hexafluorocyclopentene and 1,2-bis(2-methoxy-5-phenyl-3-thienyl)perfluorocyclopentene (Yamada Chemical Co. Ltd), and/or Sea Green, and combinations thereof. As said, the dye concentration in the ketone solution was about 0.5% based on the weight of the solution, for each dye present in the solution. The Reversacol dyes are provided by the manufacturer as single-molecule neutral gray photochromic dyes in the form of fine crystalline powder.

Obviously, alternative dyes known in the art which are soluble to a similar extent as the currently applied dyes, are equally applicable in the film.

All dye solutions were clear and all dye dissolved in the ketone of the solutions, as exemplified.

In the examples, the immersed film was dried in a hot-air oven. Obviously, alternative known methods for drying an immersed film are equally applicable.

TABLE 1

Constituents of manufactured self-supporting polymer films

| Film ## | Thermoplastic polymer (film thickness in mm) | Solvent applied for immersion and residual solvent in the film after drying (wt %) | organic photochromic molecule comprising a chromophore |
|---|---|---|---|
| A | S123† (0.38) | Cyclohexanone (0%) | Pennine Green‡ |

TABLE 1-continued

Constituents of manufactured self-supporting polymer films

| Film ## | Thermoplastic polymer (film thickness in mm) | Solvent applied for immersion and residual solvent in the film after drying (wt %) | organic photochromic molecule comprising a chromophore |
|---|---|---|---|
| B | S123 (0.38) | Cyclohexanone (3%) | Pennine Green |
| C | S123 (0.38) | Cyclohexanone (8%) | Pennine Green |
| D | S123 (0.38) | Cyclohexanone (10%) | Pennine Green |
| E | S123 (0.38) | Cyclohexanone (0%) | Humber Blue‡ |
| F | S123 (0.38) | Cyclohexanone (3%) | Humber Blue |
| G | S123 (0.38) | Cyclohexanone (8%) | Humber Blue |
| H | S123 (0.38) | Cyclohexanone (10%) | Humber Blue |
| I | S123 (0.68) | Cyclohexanone (0%) | Pennine Green |
| J | S123 (0.68) | Cyclohexanone (3%) | Pennine Green |
| K | S123 (0.68) | Cyclohexanone (8%) | Pennine Green |
| L | S123 (0.68) | Cyclohexanone (10%) | Pennine Green |
| M | S123 (0.68) | Cyclohexanone (0%) | Humber Blue |
| N | S123 (0.68) | Cyclohexanone (3%) | Humber Blue |
| O | S123 (0.68) | Cyclohexanone (8%) | Humber Blue |
| P | S123 (0.68) | Cyclohexanone (10%) | Humber Blue |
| Q | S158† (0.63) | Cyclohexanone (0%) | Pennine Green + Humber Blue |
| R | S158 (0.63) | Cyclohexanone (3%) | Pennine Green + Humber Blue |
| S | S158 (0.63) | Cyclohexanone (8%) | Pennine Green + Humber Blue |
| T | S123 (0.38) | Cyclohexanone (0%) | Pennine Green+ Humber Blue |
| U | S123 (0.38) | Cyclohexanone (3%) | Pennine Green + Humber Blue |
| V | S123 (0.38) | Cyclohexanone (8%) | Pennine Green + Humber Blue |
| W | S123 (0.38) | acetone (0%) | Pennine Green+ Humber Blue |
| X | S123 (0.38) | acetone (3%) | Pennine Green + Humber Blue |
| Y | S123 (0.38) | acetone (10%) | Pennine Green + Humber Blue |
| Z | S123 (0.38) | Cyclohexanone (0%) | Dye-1[1)] |
| AA | S123 (0.38) | Cyclohexanone (3%) | Dye-1 |
| BB | S123 (0.38) | Cyclohexanone (8%) | Dye-1 |
| CC | S123 (0.38) | Cyclohexanone (0%) | Dye-2[2)] |
| DD | S123 (0.38) | Cyclohexanone (3%) | Dye-2 |
| EE | S123 (0.38) | Cyclohexanone (8%) | Dye-2 |
| FF | S123 (0.38) | Cyclohexanone (0%) | Dye-1 + Dye-2 |
| GG | S123 (0.38) | Cyclohexanone (3%) | Dye-1 + Dye-2 |
| HH | S123 (0.38) | Cyclohexanone (8%) | Dye-1 + Dye-2 |
| II | S123 (0.68) | Cyclohexanone (0%) | Dye-1 + Dye-2 |
| JJ | S123 (0.68) | Cyclohexanone (3%) | Dye-1 + Dye-2 |
| KK | S123 (0.68) | Cyclohexanone (8%) | Dye-1 + Dye-2 |
| LL | S123 (0.38) | acetone (0%) | Dye-1 + Dye-2 |
| MM | S123 (0.38) | acetone (3%) | Dye-1 + Dye-2 |
| NN | S123 (0.38) | acetone (8%) | Dye-1 + Dye-2 |
| OO | S123 (0.68) | Cyclohexanone (0%) | Dye-1 + Dye-2 |
| PP | S123 (0.68) | Cyclohexanone (3%) | Dye-1 + Dye-2 |
| QQ | S123 (0.68) | Cyclohexanone (8%) | Dye-1 + Dye-2 |
| RR | S123 (0.68) | Cyclohexanone (0%) | Pennine Green+ Humber Blue |
| SS | S123 (0.68) | Cyclohexanone (3%) | Pennine Green + Humber Blue |
| TT | S123 (0.68) | Cyclohexanone (10%) | Pennine Green + Humber Blue |
| UU | S123 (0.68) | Cyclohexanone (8%) | Pennine Green + Humber Blue |
| VV | S123 (0.68) | Cyclohexanone (3%) | Sea Green‡ |
| WW | S158 (0.68) | Cyclohexanone (0%) | Pennine Green + Humber Blue |
| XX | S158 (0.68) | Cyclohexanone (3%) | Pennine Green + Humber Blue |
| YY | S158 (0.68) | Cyclohexanone (8%) | Pennine Green + Humber Blue |
| AB | S123 (0.38) | methylisobutylketone | Dye-1 + Dye-2 |
| AC | S123 (0.38) | methylisobutylketone | Dye-1 + Dye-2 |
| AD | S123 (0.38) | methylisobutylketone | Dye-1 + Dye-2 |

†S123 and S158 are aliphatic thermoplastic polyurethane sheets purchased from PPG-Sierracin/Sylmar Corp. (Sylmar, USA) in the third quartile of 2017.
‡Pennine Green and Humber Blue and Sea Green are organic photochromic molecules comprising a chromophore, polydialkylsiloxane-substituted naphthopyrans, sold under the trademark Reversacol Photochromic dyes by Vivimed Labs Europe Ltd (Yorkshire, England), and were purchased in the second quartile of 2017.
[1)]Dye-1 is 1-[2,4-dimethyl-5-(4-methylphenyl)-3-thienyl]-2-[2-methyl-5-(4-methylphenyl)-3-thienyl]-3,3,4,4,5,5-hexafluorocyclopentene (Yamada Chemical Co. Ltd)
[2)]Dye-2 is 1,2-bis(2-methoxy-5-phenyl-3-thienyl)perfluorocyclopentene (Yamada Chemical Co. Ltd)

The aliphatic thermoplastic polyurethane sheets referred to as "S123" and "S158" in Table 1 have the following characteristics, respectively, as determined by the manufacturer. Specific gravity (g/cc; test method ASTM D-792:2013, version in force in 2017 and 2018)) of 1.08 and 1.08; shore hardness of 80 A and 64 A (test method ASTM D-2240:2015, version in force in 2017 and 2018); tensile strength at 25° C. of 6200 psi (42.75 MPa) and 3400 psi (23.44 MPa) (test method ASTM D-412 type C:2016, version in force in 2017 and 2018); modulus at 100% elongation at 25° C. of 530 psi (3.54 MPa) and 370 psi (2.55 MPa) (test method ASTM D-412 type C: 2016); modulus at 300% elongation at 25° C. of 1700 psi (11.72 MPa) and 740 psi (5.10 MPa) (test method ASTM D-412 type C:2016); ultimate elongation at 25° C. of 620% and 860% (test method ASTM D-412 type C:2016); tear strength at 25° C. of 320 pli (kN/m) and 260 pli (test method ASTM D-624 type C:2016), for S123 and for S158, respectively (all values are nominal values). Transmission of ultraviolet radiation is 10% and transmission of visible light is 85%.

For comparison, the comparative examples exemplified in Table 2 are produced, applying solvents not comprising a ketone, though, comprising either isopropanol or tetrahydrofuran, instead.

It was observed that the thermoplastic polymer films of the comparative examples were not applicable for use in an application wherein a photochromic effect of the film is desired. That is to say, the dyes did not dissolve properly in the solvent (e.g. comparative example CA), and/or the film did not remain sufficiently self-supporting, and/or the film was stained to an unacceptable extent upon the steps of immersion with solvent and drying thereafter, to name a few disadvantages of the use of isopropanol or tetrahydrofuran as the solvent for dissolving photochromic dyes. Furthermore, with the solvents tetrahydrofuran (THF) and toluene, it was observed that the photochromic dyes did dissolve to a sufficient extent, e.g. at least 0.5 wt % based on the weight of the solution, however, the THF and toluene did not exert a plasticizer effect on the thermoplastic polymer material applied in the comparative examples, e.g. aliphatic TPU, and thus immersion of the thermoplastic polymer with THF (comparative example CG, CN) or toluene (comparative example CM, CO) did not beneficially result in a decreased value for the glass transition temperature Tg (Tan Delta), and/or did nor beneficially result in a decreased value for the storage modulus, as is seen with the self-supporting polymer film of the invention for which the thermoplastic polymer has been immersed with a ketone, preferably cyclohexanone. Therefore, exemplifying comparative polymer films were not subsequently tested in e.g. a set-up for determining the glass-transition temperature.

TABLE 2

Constituents of manufactured exemplifying comparative polymer films

| Film ## | Thermoplastic polymer (film thickness in mm) | Solvent applied for immersion and residual solvent in the film | organic photochromic molecule comprising a chromophore |
|---|---|---|---|
| CA | S123[†] (0.68) | isopropanol | Pennine Green[‡] + Humber Blue[‡] |
| CD | S123 (0.38) | isopropanol | Pennine Green + Humber Blue |
| CG | S123 (0.38) | THF[3)] | Dye-1[1)] + Dye-2[2)] |
| CM | S123 (0.68) | toluene | Pennine Green + Humber Blue |
| CN | S123 (0.68) | THF | Pennine Green + Humber Blue |
| CM | S123 (0.38) | isopropanol | Dye-1 + Dye-2 |
| CO | S123 (0.38) | toluene | Dye-1 + Dye-2 |

[†]S123 is an aliphatic thermoplastic polyurethane sheet purchased from PPG-Sierracin/Sylmar Corp. (Sylmar, USA) in the third quartile of 2017.
[‡]Pennine Green and Humber Blue are organic photochromic molecules comprising a chromophore, i.e. polydialkylsiloxane-substituted naphthopyrans, sold under the trademark Reversacol Photochromic dyes by Vivimed (Yorkshire, England), and were purchased in the second quartile of 2017.
[1)]Dye-1 is 1-[2,4-dimethyl-5-(4-methylphenyl)-3-thienyl]-2-[2-methyl-5-(4-methylphenyl)-3-thienyl]-3,3,4,4,5,5-hexafluorocyclopentene (Yamada Chemical Co. Ltd)
[2)]Dye-2 is 1,2-bis(2-methoxy-5-phenyl-3-thienyl)perfluorocyclopentene (Yamada Chemical Co. Ltd)
[3)]THF is tetrahydrofuran After immersion of polyurethane films detailed in Table 1, with the dye solutions, and the drying step thereafter, the flexibility of the obtained self-supporting films was improved compared to the aliphatic thermoplastic polyurethane film applied in the method, before the immersion in the solution. The immersion in the ketone improved the flexibility and the ketone acted as a plasticizer for the polyurethane films. It was further observed that immersing in a ketone solution resulted in increased surface smoothness of the polyurethane films tested, as determined after drying of the films.

For some films of Table 1, the step of immersion of the film with the solution of ketone with dissolved dye(s), was conducted by applying the film in a roll-to-roll process, known in the art. Also the subsequent step of drying the immersed film imbibed with a ketone and impregnated with evenly distributed dye(s), is applicable in such a roll-to-roll process for producing impregnated flexible film.

Typically, the Young's modulus of the exemplifying self-supporting polymer films of the invention was below 10 MPa, typically 5 MPa or lower, such as 4 MPa or lower (ISO 527 [527-1:2012; 527-2:2012; 527-3:1995; 527-4:1997; 527-5:2009], versions in force in 2017 and 2018; ASTM D412 type C: 2016, version in force in 2017 and 2018).

The exemplifying self-supporting polymer films of the invention were transparent or semi-transparent or opaque.

All tested films turned transparent under influence of pressure and increased temperature, as observed after applying pressure and heat to the films in a heated film press. Transparent is here to be understood as a light transmission of at least 80% for light with a wavelength of between 400 nm and 750 nm. For example, self-supporting polymer films, i.e. examples RR, SS and UU (Table 1), were subjected to a pressure of 8 bar for 10 minutes at 140° C., such that transparent films were obtained.

In a card press laminator (Oasys) known in the art, it was seen that for example self-supporting polymer films, i.e. examples RR and SS and UU, adhered to sheets of various materials commonly applied in construction, manufacturing of car windows, windows, glasses, devices, visors, etc. For example, when applying a pressure of 8 bar for 10 minutes at 140° C. on a sheet of a film, said film embedded in between a layer of such here aforementioned material known in the art at both sides of the exemplifying films, evenly adherence of the film of the invention to the materials was obtained. For example, when applying a pressure of 15 bar for 1 second at 140° C. on a sheet of a film of example RR or example SS, said film embedded in between a layer of such here aforementioned material known in the art at both sides of the exemplifying films, evenly adherence of the film of the invention to the materials was obtained.

It was observed that self-supporting polymer films comprising a combination of Pennine Green and Humber Blue turned into a relatively dark brown color upon exposure to ultraviolet radiation. Both dyes were applied in the method of the invention as a ketone solution comprising 0.5 wt % of each dye based on the weight of the solution. The ketone was cyclohexanone.

Exemplifying self-supporting polymer films RR, SS and TT (see Table 1) were subjected to standardized Dynamic Mechanical Analysis (DMA) according to a set-up and procedures known in the art (ISO 6721 [6721-1:2011; 6721-2:2008; 6721-3:1994; 6721-4:2008; 6721-5:1996; 6721-6:1996; 6721-7:1996; 6721-8:1997; 6721-9:1997; 6721-10:2015; 6721-11:2012; 6721-12:2009], versions in force in 2017 and 2018; Dynamic Mechanical Thermal Analysis, DMTA). For these three examples and for the S123 aliphatic thermoplastic polyurethane film that was not subjected to immersion in ketone (control measurement for obtaining a reference value), the storage modulus between −80° C. and 100° C. was determined in MPa, the loss modulus in the same temperature range was determined as well as the Tan Delta value, for determining the glass-transition temperature, $T_g$ (temperature was ramped at 3 Kelvin/minute, the set frequency was 1 Hz, the amplitude was 10 micrometer, the preload was 0.01 N). Samples of the films subjected to the DMA were analyzed in tensile mode. These samples of the exemplifying films and the control reference film had a size of about 3 cm times about 4 cm at minimum.

For the reference sample of the S123 polymer sheet, the $T_g$ was 12° C. (Tan Delta). For examples RR, SS, TT, the values for Tg were 16° C., 7° C. and −1° C., respectively. In similar analyses with polyurethane films obtained after immersion in cyclohexanone such that about 8% cyclohexanone was imbibed in the polymer sheet, based on the weight of the self-supporting polymer film, the Tg was comparable with the value obtained for example TT.

From these measurements and from further performed analyses with further examples of self-supporting polymer films, it is seen that the presence of imbibed ketone in the polymer film lowers the Tg, therewith inducing a softening of the aliphatic thermoplastic polyurethane film applied in the method. The ketone, e.g. the cyclohexanone or the acetone, thus beneficially serves as a plasticizer. The plasticizer effect of the imbibed ketone is further demonstrated by assessing the storage modulus for examples RR, SS, TT and the starting material S123, before immersion in solvent, here ketone. With increasing weight percentage of imbibed ketone in the polyurethane film, the storage modulus in MPa decreases between −80° C. and 20° C. and is 0 MPa for all samples tested at temperatures above about 20° C. For example, for example RR (0 wt % cyclohexanone in the film), the storage modulus is about 1400 MPa at −40° C., whereas the storage modulus at −40° C. is about 800 MPa for example TT (10 wt % cyclohexanone in the film).

In the DMA, a peak value for the loss modulus in MPa was measured for all examples RR, SS and TT and the reference S123 polymer sheet, at a temperature of about −43° C. It was observed that the loss modulus was similar for the example RR compared to the starting material of thermoplastic polyurethane film S123 before immersion in cyclohexanone solution, i.e. about 1800 MPa at about −43° C. However, the examples SS and TT, with 3 wt % and 10 wt % cyclohexanone imbibed in the polyurethane film, respectively after immersion and drying, showed an increased loss modulus up to about 2200 MPa and 2300 MPa, respectively, at about −43° C. These data further show that immersion of the aliphatic thermoplastic polyurethane film with a ketone induces an increase in the flexibility of the polymer material, thus the ketone acting as a plasticizer.

When cyclohexanone was replaced by acetone in the method, similar results were obtained.

Several of the exemplifying self-supporting polymer films were laminated in between layers of various materials commonly applied in construction, manufacturing of car windows, windows, glasses, devices, visors, etc., by using an Oasys card press laminator, at for example 140° C., 8 bar for 10 minutes or at 135° C., 10 bar for 120 seconds, or by using an autoclave at 110° C., 8 bar for 4 hours. For example, examples T, U, V, RR, SS, UU and VV were laminated in between two layers of various transparent materials commonly applied in car windows, construction, etc. For each separate experiment, the two sheets of material used for sandwiching a self-supporting polymer film of the invention were made of the same transparent material, or were made of two different materials (See Table 3).

For the samples sandwiched in between sheets of transparent material, the values for L, a and b were determined, according to standard procedures commonly applied in the art (CIELABS, 1976). The L, a, B values were determined with the example self-supporting polymer films, before and after exposure for 1 minute to for example a Heraeus Suntest CPS, or a CPS+ source of ultraviolet radiation, such that each example film is exposed to an amount of ultraviolet radiation equivalent to a dose of ultraviolet radiation received by the films as if exposed to the sun at a sunny day in central Europe. After the exposure to the light source, a first sweep between 400 nm and 750 nm was immediately recorded, and subsequently, the color (transmission between 400 nm and 750 nm) was recorded in 5 seconds intervals for 120 seconds, followed by a last measurement at t=240 seconds after the end of the exposure to the ultraviolet radiation of the light source.

It was observed that for examples T, U, V, RR, SS, UU, WW, XX and YY, the 5-seconds time interval in between measurements of the transmission was already too long for the purpose of determining the decay half time in seconds more accurately than now established. That is to say, the decay half time for the example films was surprisingly short, i.e. 5 seconds or shorter than 5 seconds. It was estimated that the decay half time was even as short as 1 second. For examples SS and VV, the films sandwiched in between two layers of yet different transparent materials commonly applied in car windows and visors for e.g. motor bike helmets, showed a decay half time of about 15 seconds or shorter. As a reference, the decay half time of a commercially available laminate comprising a photochromic film of 0.75 mm (thickness) was assessed, i.e. a Vision Ease laminate applied for eye-wear, providing a value of about 10 seconds. For comparison, also the L, a, b and spectral curves for a reference ophthalmic lens comprising photochromic film (Transition) were determined. The decay half time of the Transition lens was as long as 90 seconds.

The applied settings for the measurements were as follows. Settings spectrophotometer: light source was a D65; the observer angle was 10°; measurement in transmission mode; measured values were L, a, b and spectral curves (transmission (%) from 400 nm to 750 nm).

For all laminates of an exemplifying self-supporting polymer film of the invention sandwiched by adhering to two layers of a transparent material, the initial values for L, before exposure to the light source, were above 84%, i.e. between 84.2% and 92.2%. After exposure of the self-supporting polymer films to the ultraviolet radiation of the light source, the values for L were between 36% and 85%, with for most examples L values of between about 50% and about 60%. The L values for the reference Vision Ease laminate were 87.909% before irradiation with ultraviolet light and 64.55% after irradiation. The L values for the lens of Transition were 99.897% before irradiation with ultraviolet light and 44.917% after irradiation.

In Table 3, the L, a, b values before and after exposure of the self-supporting polymer films, as well as the indicated two reference materials, are summarized, as well as the decay halftime in seconds after irradiation of the films to ultraviolet radiation.

TABLE 3

Spectral data of exemplifying self-supporting polymer films, determination of L, a, b before and after exposure to ultraviolet light, and decay halftime values, wherein the films are adhered in between layers of various transparent support materials

| Sample, Example (See Table 1) | Initial L, a, b values | Activated L, a, b values | Decay half time (s) |
|---|---|---|---|
| SS, adhered in a sandwich of material I | 82.841 −1.73 1.812 | 36.661 −0.497 −2.672 | 15 |
| SS, adhered in a sandwich of material II | 86.167 0.45 1.485 | 66.204 2.377 −6.988 | 15 |
| VV, adhered in a sandwich of material III | 92.16 −8.21 7.37 | 84.27 −20 −1.32 | 15 |
| UU, adhered in a sandwich of material IV and V | 86.803 0.284 0.714 | 51.276 0.7 −1.186 | 5 |
| SS, adhered in a sandwich of material IV and V | 84.538 0.31 −0.616 | 49.735 1.719 −7.178 | 5 |
| RR, adhered in a sandwich of material IV and V | 84.206 0.361 −1.314 | 51.771 1.897 −8.131 | 5 |
| V, adhered in a sandwich of material IV and V | 86.803 0.284 0.714 | 51.276 0.7 −1.186 | 5 |
| U, adhered in a sandwich of material IV and V | 86.942 0.315 −0.212 | 54.253 1.432 −5.573 | 5 |
| T, adhered in a sandwich of material IV and V | 88.054 0.57 −0.645 | 60.498 1.753 −6.042 | 5 |
| YY, adhered in a sandwich of material IV | 87.807 0.72 −0.621 | 59.157 2.142 −5.566 | 5 |
| XX, adhered in a sandwich of material IV and V | 86.781 0.71 −0.576 | 57.134 2.417 −6.257 | 5 |
| WW, adhered in a sandwich of material IV and V | 87.988 0.72 −0.406 | 59.833 2.506 −6.083 | 5 |
| Vision Ease laminate Reference | 87.909 −0.99 −0.187 | 64.55 −2.386 −3.15 | 10 |
| Transition | 99.897 | 44.917 | 90 |

TABLE 3-continued

Spectral data of exemplifying self-supporting polymer films, determination of L, a, b before and after exposure to ultraviolet light, and decay halftime values, wherein the films are adhered in between layers of various transparent support materials

| Sample, Example (See Table 1) | Initial L, a, b values | Activated L, a, b values | Decay half time (s) |
|---|---|---|---|
| ophthalmic lens 2 mm | −0.011 0.053 | 5.986 15.845 | |

Referring to Table 3: Material I is a sheet of float glass with a thickness of 4 mm; Material II is a sheet of polycarbonate sold under the trademark Makrolon UV, the sheet having a thickness of 2 mm. Makrolon® UV polycarbonate is purchased from Covestro (Germany); Material III is float glass (soda-lime glass (AGC Nederland, Tiel, Netherlands)). Thickness of a float glass ply was 4 mm; Material IV is a sheet of Lexan HP92W polycarbonate with a thickness of 0.175 mm. Lexan is a trademark for polycarbonate (Sabic Innovative Plastics BV, Bergen op Zoom, Netherlands); Material V is a sheet of Lexan 8010MC polycarbonate with a thickness of 0.175 mm.

In a next series of tests, several of the self-supporting polymer films listed in Table 1 were sandwiched in between layers of two separate materials commonly applied in the construction of various articles requiring a transparent glazing made of polymer material. The self-supporting polymer films were adhered to the various materials by applying the Oasys card press laminator at 135° C. and a pressure of 10 bar for 120 seconds. Similar to the previous series of tests, described here above, the initial L, a, b values and spectral data (400-750 nm) were measured and recorded for all test sample, before and after exposure of the self-supporting polymer films of the invention to Xenon light source (ISO 11341: 2004). Decay half time in seconds was determined as well as the loss of photochromic activity expressed as the percentage of photochromic activity that is lost after exposure of the test samples for 100 hours to the xenon light source (ISO 11341: 2004). Thus, a value for the loss of photochromic activity of 100% depicts complete loss of activity. According to ISO 11341: 2004, these activities are calculated based on measured values for L. All tested examples were adhered in between a sandwich of a first transparent polymer material and a second transparent polymer material commonly applied for the manufacturing of articles applied for the purpose of using such laminates comprising sandwiched film, in circumstances were photochromic activity is desired. The transparent polymer material was a polycarbonate sheet.

Exemplifying self-supporting polymer films tabulated in Table 1 and tested in the photochromic activity measurements, were U, V, RR, SS, UU and YY. Test results are displayed in Table 4. For comparison, the same two control samples as were applied in the previous tests, displayed in Table 3, were applied.

TABLE 4

Determination of the loss of photochromic activity after exposure of self-supporting polymer films to xenon lamp radiation.

| Sample, Example (See Table 1) | Initial L, a, b values | Activated L, a, b values | Decay Half time (s) | Loss of photochromic activity (%) |
|---|---|---|---|---|
| UU, adhered in a sandwich of material IV and V | 82.596 0.108 0.555 | 61.644 0.592 −2.388 | 5 | 40 |
| SS, adhered in a sandwich of material IV and V | 86.207 0.13 0.254 | 56.664 0.673 −4.359 | 5 | 12 |
| RR, adhered in a sandwich of material IV and V | 83.648 0.216 0.228 | 54.891 1.169 −5.478 | 5 | 9 |
| V, adhered in a sandwich of material IV and V | 86.748 0.34 0.221 | 64.407 1.35 −3.955 | 10 | 30 |
| U, adhered in a sandwich of material IV and V | 86.536 0.404 −0.067 | 58.09 1.303 −4.944 | 10 | 15 |
| YY, adhered in a sandwich of material IV | 88.945 0.555 0.348 | 68.404 1.501 −3.287 | 10 | 29 |
| Vision Ease 0.75 mm laminate | 86.358 −1.437 8.32 | 66.177 −1.34 4.469 | 10 | Sample turned yellow; not applicable |
| Transitions ophthalmic lens 2 mm | 91.222 −1.074 6.054 | 58.489 3.843 13.4 | 90 | 42/Sample discoloured to some extent |

Referring to Table 3 and Table 4: Material IV is a sheet of Lexan HP92W polycarbonate with a thickness of 0.175 mm. Lexan is a trademark for polycarbonate (Sabic Innovative Plastics BV, Bergen op Zoom, Netherlands); Material V is a sheet of Lexan 8010MC polycarbonate with a thickness of 0.175 mm.

From the test results in Table 4, it is seen that the decay half time for the various tested self-supporting polymer films is relatively short, and is even below 5 seconds for, for example examples RR, SS and UU. In fact, the decay half time was shorter than 5 seconds and was estimated at about 1 second. More importantly, the reference sample "Vision Ease 0.75 mm laminate" turned useless when exposed to the xenon radiation for 100 hours according to ISO 11341: 2004, since the laminate material turned completely yellow indicating severe decay or break down of the photochromic film and/or the sandwiching material(s). In contrast, the tested self-supporting polymer films of the invention resisted the exposure to Xenon light for 100 hours to a significant extent, i.e. even up to 91% (9% loss) (Table 4). The second reference sample, "Transitions ophthalmic lens 2 mm" had a relatively long decay half time compared to the examples of self-supporting polymer films of the invention tested, and in addition, the tested Transitions material turned yellow upon exposure to the Xenon light source.

Subsequently, example SS of a self-supporting polymer film (Table 1) was sandwiched between two layers of a transparent material commonly applied in car manufacturing, i.e. plies of float glass, by adhering the example SS to the glass layers using an autoclave at 110° C., 8 bar for 4 hours. The float glass was a soda-lime glass (AGC Nederland, Tiel, Netherlands)). Thickness of each float glass ply was 4 mm. Subsequently, the sandwiched example SS of a self-supporting polymer film was exposed for 2000 hours to radiation of a xenon light source according to ISO 11341: 2004. Values for L, a, b were determined before and after the exposure to xenon light, the decay half time was established, as well as the loss of photochromic activity based on determined values for L.

It was established that even after 2000 hours of exposure of example SS to xenon light, still no loss of photochromic activity occurred, showing that example SS sandwiched in the float glass laminate is extremely robust against wear and decay of the photochromic film.

EXAMPLE

Photochromic TPU Film, Immersed in Cyclohexanone, then Dried

TPU films with a varying thickness and purchased from different suppliers were tested for their photochromic performance, after the TPU films were immersed in solvent comprising cyclohexanone and photochromic molecules, followed by complete drying of the TPU film.

Samples:
1. An S123 TPU film (thickness: 0.68 mm, surface area was A4 size, 210 mm×297 mm) was sandwiched in between two layers of transparent material (thickness 4 mm, each).
2. A NovoGlass SF1959 TPU film (thickness: 0.38 mm, surface area was A4 size, 210 mm×297 mm; NovioGenio) was sandwiched in between two layers of transparent material (thickness 4 mm, each).
3. An S123 TPU film (thickness: 0.38 mm, surface area was A4 size, 210 mm×297 mm) was sandwiched in between two layers of transparent material (thickness 4 mm, each).

The S-123 thermoplastic polyurethane is an aliphatic PU; the SF1959 thermoplastic polyurethane is a poly-ether based PU.

For samples 1-3, the transparent material applied was float glass (soda-lime glass (AGC Nederland, Tiel, Netherlands)).

Said TPU films of samples 1-3 were impregnated with cyclohexanone comprising photochromic molecules dissolved therein, and then dried, before the TPU films were laminated in between the two further layers. The TPU films of samples 1-3 were contacted for 1 minute with the solution of cyclohexanone and two dyes by dipping the TPU films in a solution of cyclohexanone and 0.5% w/w of Reversacol Humber Blue and 0.5% w/w Reversacol Pennine Green based on the total weight of the solution. The three films 1-3 are subsequently dried at 60° C. for 4 hours, such that all the cyclohexanone solvent has evaporated from the TPU films (0% cyclohexanone left in interlayer TPU films of Samples 1-3, when subsequently sandwiched in between the two layers of transparent material).

For the samples 1-3 sandwiched in between sheets of transparent material, the values for L, a and b were determined, according to standard procedures commonly applied in the art (CIELABS, 1976). The L, a, B values were determined with the example self-supporting polymer films 1-3, before and after exposure for 1 minute to for example a Suntest CPS+(Atlas) of ultraviolet radiation, such that each example film 1-3 is exposed to an amount of ultraviolet radiation equivalent to a dose of ultraviolet radiation received by the films as if exposed to the sun at a sunny day in central Europe. After the exposure to the light source, a first sweep of % transmission measurements between 400 nm and 750 nm was immediately recorded, and subsequently, the color (transmission between 400 nm and 750 nm) was recorded in 20 seconds intervals for 180 seconds, followed by a last measurement at t=240 seconds after the end of the exposure to the ultraviolet radiation of the light source. Measurements were established on an Xrite spectrophotometer with the settings:

Light Source: D65
Observer angle: 10 degrees
Mode: Transmission (UV excluded)
Measured values: L,a,b and spectral curve (Transmission (%) from 400-750 nm).

Measuring Initial Color
Measure all three samples 1-3 on the spectrophotometer when these have not been exposed to light, yet.

Measuring "Decay-Time" of Photochromic Coating
Have the spectrophotometer ready to measure the colour once the exposed sample will come out of the Suntester.
Expose the sample for 1 minute to light using a Heraeus Suntest CPS (or identical suntest equipment). UV dose should be equal to a sunny day during summer in central Europe.
Take the sample out of the Suntester and place it as soon as possible in the spectrophotometer (t=0 sec)
Measure the colour for each 20 seconds time interval. This has to be done till t=180 s (let the timer run during measuring the sample).

The laminates sample 1-3 of TPU with a ply of transparent material adhered to both major surfaces have been produced by laminating in an autoclave, at a temperature of 110° C., at a pressure of 8 bar pressure and with a dwell time of 4 hours.

Initial Performance:

| Sample | Initial L a b values | Activated L a b values | Decay half time (s) |
|---|---|---|---|
| 1 | 92.168 −1.786 1.198 | 36.661 −0.497 −2.672 | 20 |
| 2 | 91.874 −2.121 2.57 | 33.398 −0.107 −2.834 | 20 |
| 3 | 92.027 −1.418 1.48 | 39.695 −0.252 −3.705 | 20 |

Surprisingly, the impregnated TPU film in sample 3 has a thickness which is half the thickness of the impregnated TPU film in sample 1 which is made of the same material, while the photochromic activity is the same for these two samples.

Performance after 120 hours in Xenon weathering test (according to ISO 11341: 2004, version in force in 2017 and 2018):

| Sample | Initial L a b values | Activated L a b values | Decay Half time (s) | Loss of photochromatic activity (%) |
|---|---|---|---|---|
| 1 | 91.231 −1.87 2.109 | 51.544 −0.718 −2.057 | 20 | 25 |
| 2 | 91.896 −2.466 4.102 | 48.537 −0.926 −2.2 | 20 | 27 |
| 3 | 89.352 −1.008 1.486 | 47.666 −1.033 −2.486 | 20 | 15 |

When the loss of photochromic activity is compared between sample 1 (thickness of the TPU film is 0.68 mm) and sample 2 and 3 (thickness of the TPU film is 0.38 mm), these samples show comparable characteristics. Loss of photochromic activity after exposure of the self-supporting photochromic TPU film to UV light is less than 30% and even 15%-27%.

Comparing the results with these samples 1-3 with the results obtained with the tested samples which comprise a residual percentage of cyclohexanone in the TPU film after immersion of the TPU in the solvent and subsequently drying the films (see the results in the examples here above), it is shown that the presence of residual cyclohexanone in the TPU film improves stability (in favour of retaining photochromic activity). Indeed, the films of samples 1-3 do not comprise a residual amount of cyclohexanone after immersion and subsequent drying, which is reflected in these stability test results, showing that samples 1-3 are less stable than TPU film comprising cyclohexanone.

EXAMPLE

Photochromic Molecules are Homogenously Distributed in TPU Film After Immersion of Said Film in a Solvent Comprising Cyclohexanone and the Photochromic Molecules A first TPU film with a thickness of 0.38 mm (PPG Aerospace—Argotec) was sprayed with a solvent consisting of cyclohexanone with 0.5% w/w of Reversacol Humber Blue and 0.5% w/w Reversacol Pennine Green based on the total weight of the solution dissolved therein. Subsequently, the TPU film was dried: "TPU-SPRAY".

A second TPU film with a thickness of 0.38 mm (PPG Aerospace—Argotec) was immersed at ambient temperature in a solvent consisting of cyclohexanone with 0.5% w/w of Reversacol Humber Blue and 0.5% w/w Reversacol Pennine Green based on the total weight of the solution dissolved therein. Subsequently, the TPU film was dried: "TPU-IMBIBED".

The TPU-SPRAY and TPU-IMBIBED samples were subjected to exposure to UV light. It was observed that only the major surface of TPU-SPRAY onto which the photochromic dyes were sprayed, showed a colour change from colourless to dark purple. Further, it was observed that TPU-IMBIBED was presented as a homogenously dark purple coloured film after exposure to UV light, indicative for evenly distributed photochromic dyes throughout the whole film in three dimensions. Optical micrographs were obtained in reflection using a Motic STEREO SMZ-168T-LED microscope, equipped with a MOTICAM 580 camera and LED top light. Further, it was observed that both the colouring of the TPU-IMBIBED film upon exposure to light and the subsequent discolouring occurred evenly throughout the whole volume of the film, further showing that the photochromic molecules were homogenously and evenly distributed in the TPU film upon immersion of the film in cyclohexanone with the photochromic dyes dissolved therein.

Glass Laminate with Photochromic Thermoplastic Film

TECHNICAL FIELD—The invention also relates to a photochromic glass laminate comprising a self-supporting photochromic polymer film and at least one glass sheet, wherein the self-supporting photochromic polymer film comprises a thermoplastic polymer and at least one organic photochromic molecule comprising a chromophore. The self-supporting photochromic polymer film can comprise a ketone. A typical photochromic glass laminate is a self-supporting photochromic aliphatic thermoplastic polyurethane film imbibed with a ketone, such as cyclohexanone, further comprising one or more of a diarylethene, a spirooxazine and a naphthopyran, which is laminated between two sheets of glass such as soda-lime glass. The invention also relates to a method for the manufacturing of such a photochromic glass laminate, and to the use of such a laminate in the manufacturing of an article. Furthermore, the invention relates to an article comprising a photochromic glass laminate.

BACKGROUND—Photochromism is a physical phenomenon which has been well-established since the first half of the $20^{th}$ century. It is the ability of a photochromic molecule to reversibly change from an inactivated state, lighter colour (high L value according to CIELAB measurement), to an activated state, darker colour (lower L value according to CIELAB measurement), through exposure to electromagnetic radiation, such as UV light. When exposed to UV light the photochromic molecules have a chemical bond broken causing them to rearrange into a species that absorbs light at longer wavelengths in the visible region. This rearrangement in turn causes the material in which the photochromic molecule is embedded to darken.

Photochromic molecules can be separated into two categories: inorganic and organic photochromic molecules. First to be discovered were the inorganic photochromic molecules, which were also the foundation for the first commercial photochromic product, Photogray® ophthalmic lenses.

The first true industrial application of a photochromic material was the introduction of photochromic ophthalmic lenses in the 1960s by the company Corning. U.S. Pat. No. 3,208,860 filed in July 1962 by Corning is mentioned as the first patent describing photochromic glass and an article made thereof. Corning's Photogray® ophthalmic lenses were the commercial result relating to this patent. These photochromic ophthalmic lenses can turn grey upon stimulus by UV light, shading their wearers' eyes from the sun. This first industrial application of photochromism used inorganic photochromic molecules, i.e. silver halides.

Nowadays, it is well-known that these inorganic photochromic molecules are not favourable to use when compared to organic photochromic molecules. There are several reasons why inorganic photochromic molecules are no longer widely used. Firstly, they are relatively slow to respond to light stimulus when compared to organic photochromic molecules. Secondly, they are relatively expensive to produce. Thirdly, even though they have a longer lifetime than glass lenses containing organic photochromic molecules, the photochromic reaction of inorganic photochromic molecules gets stronger over time up to the point that materials containing inorganic photochromic molecules, such as silver halides, remain in their darkened state without light stimulus therewith rendering them useless.

Therefore, research and product development now mainly focuses on organic photochromic molecules. Organic photochromic molecules are most commonly incorporated in photochromic dyes, which contain at least one or several types of organic photochromic molecules.

Commonly used organic photochromic molecules include spirooxazines, naphthopyrans, and diarylethenes. The majority of the organic photochromic molecules change colour in response to exposure to UV radiation or visible light and revert back to their original colour when the light source is removed; this is known as T-type photochromism since the back reaction is driven thermally. That is to say, the back reaction is temperature-dependent. The higher the temperature the less dark the photochromic film will be in its activated state, but the faster it will return to its inactivated state. The colder the temperature, the longer the film will take to return to its inactivated state, but the darker the film will be in its activated state.

All of these photochromic molecules can be synthesised in such a way that they cover a range of colour spectra, e.g. reds, blues, yellows etc., and so could have industrial applications in many market segments. Applications include, but are not limited to, use in articles such as automotive and aircraft windows, helmet visors, ophthalmic lenses, self-shading sunglasses, and windowpanes for buildings. All these articles could for example be made out of glass and/or plastic.

One method of incorporating a photochromic element into a product, i.e. an article, is by laminating a photochromic film onto at least one sheet of glass. This has been described in for example EP 2 700 502 A1, US 2008/0248315 A1, US 2009/0297806 A1, and U.S. Pat. No. 4,889,413.

However, currently available photochromic glass laminates have several limitations that prevent them from being industrially applicable in all market segments. A problem encountered in industry is light fatigue. This light fatigue refers to the irreversible deterioration of the photochromic reaction after repeated exposure to UV radiation and/or to visible light. Photochromic glass laminates may already partially lose photochromic activity after only 100 hours of light exposure, while they completely lose all photochromic activity after only 500 hours of light exposure. This loss of photochromic activity makes these laminates industrially inapplicable in many market segments due to high costs with regard to replacement of worn laminates and with regard to unacceptable high use of raw materials related to the short turn-over time.

Another problem that is preventing photochromic glass laminates from being commercially applicable is that the photochromic reaction can be too slow for various applications. For example, for incorporation in articles such as automotive windows or aircraft windows and helmet visors, a relatively fast colour (intensity) switch from dark to light state, or the reverse, in the order of seconds is needed when for instance a car or motorcyclist enters or exits a tunnel. Generally, currently available photochromic laminates cut off 50% of light within the first minute and 80% within 15 minutes, but the back reaction is much slower. Generally, about 60% of the laminate will have cleared after 5 minutes, and such a laminate can need up to an hour to clear completely. Such relatively slow decolourization speed is limiting the application of current photochromic laminates for the aforementioned purposes.

Finally, a limitation of current photochromic glass laminates is that they cannot be produced cost-effectively to be durable at a large size. So far, no photochromic glass laminates are commercially available for application as windows in buildings, cars or aircrafts. Currently, for fulfilling the aim of providing a fast colouring laminate, the solution has been to add an electrochromic element to for example a glass pane such as a car window. However, a drawback is the dependency of such a glass pane with an electrochromic element on electricity, which results in relatively high costs over time. Additionally, the current electrochromic laminates are not reliable enough for certain applications. For example, failure to supply the electrochromic film with the electric current required for (de)activation, could have catastrophic consequences. That is to say, when such an electrochromic glass laminate is applied in an article such as a helmet visor, failure to provide the electrochromic element with sufficient power, may result in a visor that remains in its dark state as a consequence of the absence of the decolouring effect.

SUMMARY—It is a further goal of the present invention to provide an improved photochromic glass laminate that has an improved lifetime, and/or that is more durable, and/or that allows for faster switching between light and dark states and/or that can be cost-effectively produced to have a large surface area. That is to say, to provide a photochromic glass laminate comprising a photochromic film which film has a relatively short decay half time, improved photochromic effect in an activated state, and/or switches quickly between light and dark states.

An aspect of the invention relates to a photochromic laminate comprising a first sheet of transparent material and a self-supporting photochromic polymer film which is bonded at least partially to a surface of the first sheet of transparent material, wherein the self-supporting photochromic polymer film comprises:
   (a) a thermoplastic polymer;
   (b) between 0.0% and 14% by weight of a ketone based on the total weight of the self-supporting photochromic polymer film; and
   (c) at least one organic photochromic molecule comprising a chromophore, wherein said organic photochromic molecule comprising a chromophore is soluble in said ketone of (b) at a concentration of at least 0.1% based on the weight of a solution of the ketone containing the dissolved organic photochromic molecule comprising a chromophore at a temperature of between 15° C. and 30° C., wherein the thermoplastic polymer of (a) is thermoplastic polymer that is previously immersed in the solution of the ketone containing the dissolved organic photochromic molecule comprising a chromophore of (c) and then dried such that remaining ketone after said immersion and subsequent drying is imbibed in said thermoplastic polymer. Preferred is the photochromic laminate, wherein the self-supporting photochromic polymer film comprises between 0.1% and 12% y weight of a ketone based on the total weight of the self-supporting photochromic polymer film.

A further aspect of the invention relates to a method for producing a photochromic laminate comprising the steps of:
   a) providing a self-supporting photochromic polymer film of the invention;
   b) bonding a first sheet of transparent material at least partially to a surface of the self-supporting photochromic polymer film of step a);
   c) optionally bonding a second sheet of transparent material at least partially to a free surface of the two-layer laminate of step b); and
   d) optionally laminating a third sheet of transparent material at least partially to a free surface of the three-layer laminate of step c).
   Preferred is the method for producing a photochromic laminate, wherein in step c) or in step d) the second sheet of transparent material or the third sheet of transparent material is bonded to the free surface of the self-supporting photochromic polymer film of the two-layer laminate provided in step b).

A further aspect of the invention relates to the use of the photochromic laminate or the use of the photochromic laminate obtainable by the method in the manufacturing of an article.

A further aspect of the invention relates to an article comprising the photochromic laminate of the invention or to an article comprising the photochromic laminate obtainable by the method of the invention. Typically, the article is an optic article, preferably an optic article selected from visors, goggles, sunglasses, sun screen, face-shields, architectural windows, automotive windows, and aeronautic windows.

DEFINITIONS—The term "chromophore" has its regular scientific meaning throughout the text, and here refers to the part of a molecule that defines the colour of said molecule.

The term "photochromic" has its regular scientific meaning throughout the text, and here refers to a molecule being capable of darkening or changing colour when exposed to light.

The term "photochromism" has its regular scientific meaning throughout the text, and here refers to the reversible transformation of a chemical entity between two molecular forms having different absorption spectra induced in one or both directions by photo-irradiation, such that a reversible change of colour occurs upon exposure to light.

The term "film" has its regular scientific meaning throughout the text, and here refers to a thin sheet of material that can be flexible and can be bonded to another material such as a sheet of material.

The term "bonded" has its regular scientific meaning throughout the text, and here refers to one sheet of material being bound to another sheet of material by any binding means indicated.

The term "laminate" has its regular scientific meaning throughout the text, and here refers to an article that comprises a first sheet of material that is bonded with at least a portion of its first major surface to at least a portion of a first major surface of a second sheet of material. Optionally, at least a portion of a first major surface of a third sheet of material is bonded to at least a portion of a second major surface of the first sheet of material and/or at least a portion of a second major surface of the second sheet of material.

The term "optic glass" has its regular scientific meaning throughout the text, and here refers to a glass that is suitable for the manufacturing of optic articles, such as the optic articles defined herein.

The term "float glass" has its regular scientific meaning throughout the text, and here refers to a sheet of glass made by floating molten glass on a bed of molten metal, giving the float glass sheet uniform thickness and two flat major surfaces.

The term "glass plies", or "ply of glass" has its regular scientific meaning throughout the text, and here refers to a single sheet of glass.

The term "optical grade plastic" has its regular scientific meaning throughout the text, and here refers to a plastic that is suitable for the manufacturing of optic articles, such as the optic articles defined herein.

The term "polycarbonate based on the precursor monomer bisphenol A" has its regular scientific meaning throughout the text, and here refers to the polycarbonate material obtained through the reaction of bisphenol A with phosgene.

The term "thermoplastic polyurethane film" or "TPU film" as used herein, should be read as "ketone-treated thermoplastic polyurethane film" unless stated otherwise, which refers to the process of soaking, or immersing or imbibing, the TPU film in a ketone solvent as hereunder defined, unless specified otherwise. In brief, the process of soaking the TPU film in a ketone solvent comprises the steps of:
  (a) providing a non-treated TPU film with regard to ketone treatment;
  (b) imbibing the non-treated TPU film in ketone solvent and at least one photochromic dye dissolved in said solvent;
  (c) discarding excess ketone solvent that is not impregnated in or adhered to the TPU film;
  (d) drying the TPU film (for example in a hot air circulating oven), for a period of time such that the TPU film comprises between 0% and 12% by weight residual ketone based on the weight of the imbibed TPU film.

Preferably, the TPU film comprises between 0% and 14% ketone, more preferably between 0% and 5%, most preferably between 0% and 3% based on the original weight of the TPU film, preferably 0%, about 0.1%, 1%, 2%, or 3% or between 0.1% and 10%.

The term "sheet of transparent material" as used herein refers to a material that is see-through and has a total transmittance of at least 50%.

The term "total transmittance" has its regular scientific meaning throughout the text, and here refers to the percentage of solar radiation that can pass through an optic article such as a laminate of polymer sheets or a sheet of glass by any means.

The term "UV protective film" has its regular scientific meaning throughout the text, and here refers to a film that can block transmittance of at least one wavelength of light within the UV spectrum.

The term "foil" has its regular scientific meaning throughout the text, and here refers to a flexible sheet of material that can be bonded on the surface of another material, for example for the purpose of preventing or promoting a certain feature, i.e. preventing scratches, preventing light transmittance.

The term "coating" has its regular scientific meaning throughout the text, and here refers to a covering that is applied to the surface of an object such as an article, wherein the coating is for example decorative, functional or both, e.g. a coating providing corrosion resistance to a coated object, a coating providing wear resistance to a coated article.

The term "L a b values" has its regular scientific meaning throughout the text, and here refers to the Lab Color Space measurement that measures colour differences, wherein "L" indicates lightness, "a" indicates the red/green coordinate and "b" indicates the yellow/blue coordinate.

The term "decay half time" (T½ Expressed in Seconds) has its Regular Scientific Meaning throughout the text, and here refers to the time it takes for the photochromic material to reach the point where it is halfway to returning from its activated state to its original state before being activated.

The term "autoclave process" has its regular scientific meaning throughout the text, and here refers to a lamination process by autoclaving for laminating for example two or more of any of for example films, sheets, foils and coatings of certain materials.

The term "press lamination process" has its regular scientific meaning throughout the text, and here refers to a lamination process using a press laminator for laminating for example two or more of any of for example films, sheets, foils and coatings of certain materials.

The term "optic article" has its regular scientific meaning throughout the text, and here refers to an article with sufficient transparency and sufficiently high uniformness so that it is suitable for use in optic applications such as windows, car windshields, helmet visors, etc.

The term "article" as used herein has its regular scientific meaning throughout the text, and here refers to an item that can be manufactured.

ABBREVIATIONS USED—The abbreviation "CIELAB" has it regular scientific meaning throughout the text, and here stands for "Commission Internationale de l'Eclairage L*a*b color space".

The abbreviation "TPU" has its regular scientific meaning throughout the text, and here stands for "thermoplastic polyurethane".

BRIEF DESCRIPTION OF THE DRAWINGS

FIG. 1 displays a photochromic laminate 2, 20 and 200, comprising a self-supporting photochromic polymer film 10 or 100.

DETAILED DESCRIPTION

The present invention will be described with respect to particular embodiments but the invention is not limited thereto but only by the claims.

The embodiments of the invention described herein can operate in combination and cooperation, unless specified otherwise.

It is a goal of the invention to provide an improved photochromic glass laminate with an increased lifetime and/or with an improved velocity of discolouring once exposure of the photochromic glass laminate to UV radiation is terminated and/or which can be manufactured to have a sufficiently large surface area.

It is an objective of the current invention to provide a photochromic glass laminate that has a high transparency, has good resistance to wear in terms of loss of photochromic activity over time, and can be manufactured to cover large surface areas.

At least one of the above objectives is achieved by providing a photochromic glass laminate comprising a self-supporting photochromic aliphatic thermoplastic polyurethane film imbibed with a ketone and further comprising at least one organic photochromic molecule comprising a chromophore which is/are dissolvable in said ketone, the self-supporting photochromic aliphatic thermoplastic polyurethane film bonded to at least one sheet or pane of glass.

An aspect of the invention relates to a photochromic laminate comprising a first sheet of transparent material and a self-supporting photochromic polymer film which is bonded at least partially to a surface of the first sheet of transparent material, wherein the self-supporting photochromic polymer film comprises:
(a) a thermoplastic polymer;
(b) between 0.0% and 14% by weight of a ketone based on the total weight of the self-supporting photochromic polymer film; and
(c) at least one organic photochromic molecule comprising a chromophore, wherein said organic photochromic molecule comprising a chromophore is soluble in said ketone of (b) at a concentration of at least 0.1% based on the weight of a solution of the ketone containing the dissolved organic photochromic molecule comprising a chromophore at a temperature of between 15° C. and 30° C.,
wherein the thermoplastic polymer of (a) is thermoplastic polymer that is previously immersed in the solution of the ketone containing the dissolved organic photochromic molecule comprising a chromophore of (c) and then dried such that remaining ketone after said immersion and subsequent drying is imbibed in said thermoplastic polymer.

Figure 1A:
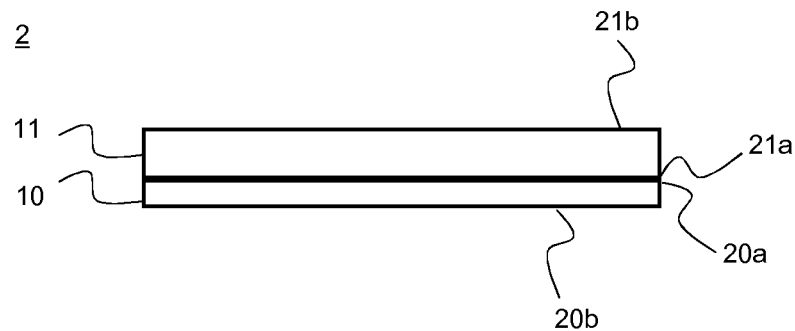
FIG. 1A. Photochromic laminate 2. A self-supporting photochromic polymer film 10 has a first major surface 20a and a second major surface 20b at the opposite site of the film. The major surface 20a of the self-supporting photochromic polymer film is bonded to the first major surface 21a of a sheet of transparent material 11, e.g. a sheet of glass. The sheet of transparent material has an exposed major surface 21b.

Surprisingly, the inventors found that when a sheet, foil or film of a thermoplastic polymer comprises imbibed ketone to a certain weight percentage based on the mass of the thermoplastic polymer, such as between about 0.1 wt % and 13 wt % ketone, or less than 0.1% by weight, such as between 0% and 0.05% by weight, or even no residual ketone at all after a drying step, the sheet, foil or film becomes more flexible, due to enhanced plasticizing of the thermoplastic polymer. The effect of improved flexibility, i.e. decreased stiffness of the film or foil due to decreased Young's modulus, is also established when the thermoplastic polymer is first immersed in the ketone followed by completely drying the thermoplastic polymer from the ketone, although to a lower extent. Further surprisingly, the inventors thus also found that when the film of thermoplastic polymer, such as TPU, was immersed with ketone and subsequently completely dried again, the similar effect with regard to the improved flexibility, i.e. decreased stiffness of the film or foil due to decreased Young's modulus, was achieved when compared with a film immersed with ketone which still comprises imbibed ketone to a certain extent, e.g. between 3% and 8% by weight ketone based on the total weight of the self-supporting polymer film, according to the invention. An example of such a photochromic laminate is provided in FIG. 1A.

The inventors found that for the self-supporting polymer film comprised by the photochromic laminate the glass transition temperature Tg (Tan Delta) is decreased to a surprisingly large extent, e.g. from Tg (Tan Delta)=12° C. for the thermoplastic polymer which is not treated with a ketone, and which does not comprise imbibed ketone, to for example 7° C. or even as low as −1° C., after immersion of the very same thermoplastic polymer in e.g. cyclohexanone or acetone. This decrease in softening temperature is accompanied with a decreased storage modulus for the self-supporting polymer film, further demonstrating the reduced stiffness of the self-supporting polymer film with imbibed ketone when compared to the stiffness of the thermoplastic polymer before immersion with a ketone. Thus, the self-supporting polymer film comprised by the photochromic laminate, comprising imbibed ketone has a Tg which is at least 1° C. lower than the Tg for a similar film made of the thermoplastic polymer comprised by the film of the invention, though not comprising the imbibed ketone, preferably the Tg is at least 2° C. lower, such as 4° C. lower, 6° C.

lower, 8° C. lower, 10° C. lower, 12° C. lower, 14° C. lower or 16° C. lower. It is preferred that the Tg (Tan Delta) for the self-supporting polymer film comprised by the photochromic laminate, is for example between 2° C. and 30° C. lower than the Tg (Tan Delta) of the thermoplastic polymer comprised by the film, though lacking the imbibed ketone, such as about 13° C. lower, although even a larger difference in Tg (Tan Delta) is also applicable. The Tg for the self-supporting polymer film not comprising ketone anymore after immersion of thermoplastic polymer with ketone followed by complete drying such that the film does not comprise remaining ketone, is for example 16° C. for an S123 TPU film (PPG Aerospace).

The self-supporting photochromic polymer film comprised by the photochromic laminate is provided by immersing the thermoplastic polymer of step (a) in a solution consisting of the ketone of step (b) wherein the at least one organic photochromic molecule comprising a chromophore of step (c) is dissolved. Typically, the ketone is acetone or cyclohexanone, preferably cyclohexanone. Typically, the thermoplastic polymer is imbibed with the solution of the ketone containing the dissolved organic photochromic molecule comprising a chromophore, the concentration of the photochromic molecule(s) typically being at least 0.1% by weight based on the weight of the solution. Typically, the thermoplastic polymer is immersed in the solution at room temperature. Further details on suitable steps for providing the self-supporting photochromic polymer film comprised by the photochromic laminate are provided in the Examples section, here below. For example, the self-supporting photochromic polymer film comprised by the photochromic laminate can be provided by following the steps of:

providing an aliphatic thermoplastic polyurethane film, the film typically having a size of about 1 square meter and typically having a thickness of about 0.1 mm, 0.2 mm, 0.38 mm, 0.63 mm or 0.68 mm;

dissolving at least one organic photochromic molecule comprising a chromophore in a ketone such as acetone or cyclohexanone, preferably cyclohexanone, to provide a solution of the ketone comprising between 0.1% and 5% by weight of the at least one organic photochromic molecule comprising a chromophore based on the weight of the solution, typically 0.5% by weight of each of two organic photochromic molecules comprising a chromophore, based on the weight of the solution, that is dissolved in the ketone;

immersion of the about 1 square meter of aliphatic thermoplastic polyurethane film at room temperature with about 200 ml to 900 ml, typically about 400-450 ml of the solution of ketone comprising the at least one dissolved organic photochromic molecule comprising a chromophore, typically at a temperature of between 17° C. and 24° C., such as about 18° C., 19° C., 20° C., 21° C. or 22° C., typically for about 40 seconds to 100 seconds, such as about 60 seconds, such that the film is imbibed with the ketone and such that the at least one organic photochromic molecule comprising a chromophore is evenly distributed in the aliphatic thermoplastic polyurethane film;

after immersing the aliphatic thermoplastic polyurethane film with organic photochromic molecule comprising a chromophore in ketone, the immersed film is dried for about 90 minutes in a hot-air oven set at a temperature of about 60° C., such that self-supporting polymer films are provided.

Homogeneous and even distribution of the organic photochromic molecule comprising a chromophore in the thermoplastic polymer, here a TPU film, was established by visualizing the photochromic effect which was apparent equally distributed throughout the whole volume of the TPU film.

Immersion of the thermoplastic polymer in the solution comprising the ketone results in the ketone being imbibed in the whole volume of the thermoplastic polymer which enables homogeneous distribution of the organic photochromic molecule comprising a chromophore in said volume of the thermoplastic polymer. Current approaches for providing a self-supporting polymer film comprising an organic photochromic molecule comprising a chromophore comprises the provision of a sheet of thermoplastic polymer onto which a film or a coating is provided, which film or coating is a thin layer or foil comprising said organic photochromic molecule comprising a chromophore. In said multilayer laminate known in the art the organic photochromic molecule comprising a chromophore is thus not present in the thermoplastic polymer. Providing such a multilayer laminate known in the art is a multistep process and amongst other steps requires priming of the thermoplastic surface before the foil is adhered to the thermoplastic polymer. Efficient adhering the foil to the thermoplastic polymer may cause difficulties, e.g. such as those related to avoiding inclusion of air bubbles between layers, and to the foil and the thermoplastic polymer staying (fully) adhered to each other.

A further aspect of the invention relates to a photochromic laminate comprising a first sheet of transparent material and a self-supporting photochromic polymer film which is bonded at least partially to a surface of the first sheet of transparent material, wherein the self-supporting photochromic polymer film comprises:

(a) a thermoplastic polymer;

(b) between 0.1% and 12% by weight of a ketone based on the total weight of the self-supporting photochromic polymer film; and (c) at least one organic photochromic molecule comprising a chromophore, wherein said organic photochromic molecule comprising a chromophore is soluble in said ketone of (b) at a concentration of at least 0.1% based on the weight of a solution of the ketone containing the dissolved organic photochromic molecule comprising a chromophore at a temperature of between 15° C. and 30° C.

Preferred is a photochromic laminate, wherein the self-supporting photochromic polymer film comprises between 0.1% and 12% by weight of the ketone based on the total weight of the self-supporting photochromic polymer film. Equally preferred is a photochromic laminate, wherein the self-supporting photochromic polymer film comprises less than 0.1% by weight of the ketone based on the total weight of the self-supporting photochromic polymer film. It is to be understood that the photochromic laminate may also comprise more than 12% by weight of the ketone based on the total weight of the self-supporting photochromic polymer film, such as less than 20% by weight, 15%, 16% or 18% by weight. The inventors found that a lower weight percentage of residual cyclohexanone in the TPU film is preferable for certain embodiments where blistering may occur or when the risk of occurring said blistering is expected in the TPU film upon the manufacturing of the end product, i.e. the photochromic laminate. Similarly, the photochromic laminate can comprise an amount of ketone of for example 0.01% by weight, 0.025, 0.050, 0.075 or 0.15% by weight, based on the total weight of the self-supporting photochromic polymer film.

An embodiment is the photochromic laminate, wherein the at least one organic photochromic molecule comprising a chromophore is evenly distributed in the self-supporting photochromic polymer film. Preferred is the photochromic laminate wherein the at least one organic photochromic molecule comprising a chromophore is evenly and homogeneously distributed in the volume of the self-supporting photochromic polymer film. It has been established that immersion of the self-supporting polymer film in a solution of the ketone comprising photochromic dyes is efficient and sufficient for establishing such an even and homogenous distribution of the photochromic molecules in the polymer film.

Surprisingly, the inventors found that when a sheet, foil or film of a thermoplastic polymer comprises imbibed ketone to a certain weight percentage based on the mass of the thermoplastic polymer, such as between 0.1 wt % and 13 wt % ketone, the sheet, foil or film becomes more flexible, due to enhanced plasticizing of the thermoplastic polymer. Another surprising effect of this imbibed ketone, was that due to the plasticizing of the thermoplastic polymer, curing was no longer necessary to adhere the film to transparent materials known in the field of applying photochromic laminates. Current photochromic films known in the art commonly have the drawback that a step of curing such films is required, before such films are applicable for laminating in between layers of further sheets of material applied in the field of applying photochromism. Also surprisingly, the inventors found that at least part of the beneficial effects of the immersion of polymer film, e.g. TPU, in a ketone remained also when the ketone was completely removed from the TPU film by drying. For example, the photochromic laminate comprising the self-supporting polymer film that was previously imbibed in ketone and then fully dried, proved to be highly stable in the tests outlined here below in Example 4A and Example 5A.

Preferably, in the photochromic laminate, the thermoplastic polymer is an aliphatic thermoplastic polyurethane, preferably a polyester-based aliphatic thermoplastic polyurethane or a polyether-based aliphatic thermoplastic polyurethane.

Preferably, the self-supporting photochromic polymer film comprised by the photochromic laminate has a thickness of between 0.05 mm and 6.50 mm, preferably between 0.10 mm and 2.60 mm, more preferably between 0.20 mm and 1.0 mm, most preferably between 0.38 mm and 0.68 mm, such as about 0.63 mm, about 0.38 mm, about 0.68 mm, about 0.73 mm.

One embodiment is the photochromic laminate, wherein the aliphatic thermoplastic polyurethane is based on an aliphatic diisocyanate selected from 1,4-tetramethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanatomethyl cyclopentane, isophorone diisocyanate, 5-isocyanato-1-(isocyanatomethyl)-1,3,3-trimethylcyclohexane, bis-(4-isocyanatocyclohexyl)-methane, 2,4'-dicyclohexylmethane diisocyanate, 1,3-bis(isocyanatometyl)-cyclohexane, 1,4-bis(isocyanatometyl)-cyclohexane, bis-(4-isocyanato-3-methylcyclohexyl)-methane, α,α,α',α'-tetramethyl-1,3-xylylen diisocyanate, α,α,α',α'-tetramethyl-1,4-xylylen diisocyanate, 1-isocyanato-1-methyl-4(3)-isocyanatomethyl cyclohexane, 2,4-hexahydrotoluylene diisocyanate, 2,6-hexahydrotoluylene diisocyanate, 4,4'-methylene dicyclohexyl diisocyanate, hexamethylene diisocyanate, or mixtures thereof, preferably selected from 4,4'-methylene dicyclohexyl diisocyanate, hexamethylene diisocyanate and isophorone diisocyanate, or mixtures thereof.

Figure 1B:
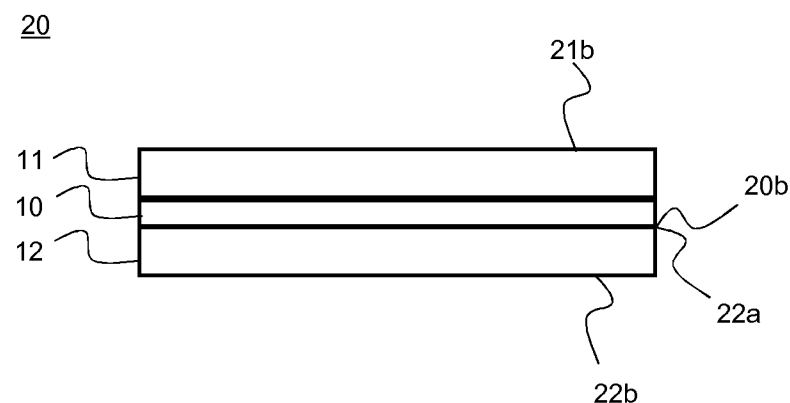
FIG. 1B. Photochromic laminate 20. Similar to the two-sheet photochromic laminate of FIG. 1A, a first major surface of the self-supporting photochromic polymer film 10 is bonded to a first major surface of a sheet of transparent material 11. In addition, the second major surface 20b of the self-supporting photochromic polymer film 10 is bonded to a first major surface 22a of a second sheet of transparent material 12. The second major surfaces 21b and 22b of the sheets of transparent material 11 and 12, respectively, are exposed in the laminate 20.

Part of the invention is the photochromic laminate, wherein a second sheet of transparent material is bonded at least partially to a free surface of the self-supporting photochromic polymer film. An example of such a photochromic laminate is provided in FIG. 1B.

In particular, the photochromic laminate is provided, wherein the first sheet of transparent material is made of a glass, preferably a glass selected from any of an optic glass, a float glass, and a soda-lime glass.

A preferred embodiment is the photochromic laminate, comprising between 0% and 8% of the solvent, the solvent being a ketone such as cyclohexanone, more preferably between 0% and 5%, most preferably 3% or about 0.5%, based on the weight of the self-supporting polymer film. Yet a further aspect of the invention relates to a photochromic laminate, wherein the amount of ketone comprised by the photochromic laminate is between 0.1% and 12% of the solvent selected from a ketone, such as about 0.5%, about 3% or about 8%, based on the weight of the self-supporting polymer film. One embodiment is the photochromic laminate, wherein the amount of the solvent is between 0% and 8%, more preferably between 0% and 5%, most preferably about 3% or about 8%. Also preferred is the photochromic laminate, wherein the self-supporting photochromic polymer film comprises less than 0.1% by weight of the ketone based on the total weight of the self-supporting photochromic polymer film.

The TPU film comprised by the photochromic self-supporting polymer film in the photochromic laminate, such as a polyester-based PU or a polyether-based PU, is manufactured according to procedures known in the art, which manufacturing is not part of the current inventive step.

In an embodiment, the photochromic laminate comprises the photochromic self-supporting polymer film comprising the thermoplastic polymer, wherein said thermoplastic polymer is immersed in the solution comprising the ketone, the ketone in the solution selected from any one or more of a straight-chain ketone, a branched ketone, an unsubstituted cyclic ketone and a cyclic ketone substituted with at least one alkyl group, or a combination thereof, preferably selected from a straight-chain ketone and an unsubstituted cyclic ketone. In particular, the solvent is selected from a ketone, wherein the number of carbon atoms is between three and ten for the straight-chain ketone, between five and ten for the branched ketone, and between four and ten for the cyclic ketone substituted with at least one alkyl group. Preferably, the solvent is selected from any one of propan-2-one, butan-2-one, 3-methylbutan-2-one, pentan-2-one, pentan-3-one, cyclopentanone, 2-methylpentan-3-one, 3-methylpentan-2-one, 4-methylpentan-2-one, 4-methylpent-3-en-2-one, pentane-2,4-dione, hexan-2-one, 3,5,5-trimethyl-2-cyclohexene-1-one, 5-methylhexan-2-one, 1-cyclohexylpropan-1-one, 1-cyclohexylethanone, cyclohexanone, heptan-2-one, heptan-4-one, 2,6-dimethyl-4-heptanon, octan-3-one, octan-2-one, octan-4-one, or a mixture thereof, preferably the solvent is selected from propan-2-one and cyclohexanone, more preferably the solvent is cyclohexanone. It will be appreciated that any ketone is applicable within the scope of the current invention, as long as a selected dye dissolves in said ketone to a suitable extent, e.g. about 0.5 wt % or at least 0.1 wt % at 15° C.-30° C., e.g. at ambient temperature or room temperature, such as between 8° C. and 30° C., preferably between 15° C. and 25° C., and as long as said ketone is imbibed in the thermoplastic polymer and induces enhanced plasticizing of the thermoplastic polymer. The ketone thus serves at least two purposes: as a carrier for dividing the dissolved dye throughout the whole volume of the sheet or film of thermoplastic polymer, and as a plasticizer capable of increasing the plasticity and flexibility of the photochromic self-supporting polymer film. Of course, it is also part of the invention that the ketone first imbibed in the self-supporting photochromic polymer film is subsequently fully removed or discarded from said film by for example drying. Thus, the self-supporting photochromic polymer film comprised by the photochromic laminate comprises solvent, e.g. a ketone, upon previous immersion of the thermoplastic polymer in the solvent, or does not comprise the solvent anymore as a result of drying after said immersion.

The ketone in which the thermoplastic polymer comprised by the self-supporting polymer film of the photochromic laminate is immersed, serves at least two purposes: as a carrier for dividing the dissolved photochromic dye throughout the whole volume of the sheet or film of thermoplastic polymer, and as a plasticizer capable of increasing the plasticity and flexibility of the self-supporting polymer film. Surprisingly, these purposes are also achieved when the ketone is fully removed out of the thermoplastic polymer after immersion of said polymer with a solution containing ketone with dissolved organic photochromic molecule comprising a chromophore. Then, for example for a selected TPU (S123, PPG Aerospace), Tg was 16° C. for a self-supporting polymer film immersed in ketone followed by completely discarding the ketone, compared to a Tg of 12° C. for the same TPU film that was not immersed in ketone, whereas the TPU film treated with ketone became more flexible than the untreated film and stayed transparent upon ketone immersion followed by drying. The inventors found for example that a self-supporting polymer film comprised by the photochromic laminate, comprising 2-4 wt % ketone based on the total weight of the self-supporting polymer film, or for example 7-11 wt %, has significantly improved Tg, that is to say a decreased Tg (Tan Delta) when compared to a similar film of the thermoplastic material which has not been immersed with a ketone.

Yet another aspect of the invention relates to the self-supporting polymer film of the photochromic laminate, which comprises at least one organic photochromic molecule comprising a chromophore selected from one or more of a diarylethene, a spirooxazine and a naphthopyran, or a combination thereof, preferably the self-supporting polymer film comprises at least two organic photochromic molecules comprising a chromophore. Preferred is the photochromic laminate comprising the self-supporting polymer film, wherein the at least one organic photochromic molecule comprising a chromophore is selected from naphthopyrans.

In a preferred embodiment, the self-supporting polymer film comprises at least one organic photochromic molecule comprising a chromophore selected from polydialkylsiloxane-substituted naphthopyrans, preferably a polydialkylsiloxane-substituted naphthopyran capable of taking on a blue colour or a green colour when irradiated with ultraviolet radiation, and/or selected from 1-[2,4-dimethyl-5-(4-methylphenyl)-3-thienyl]-2-[2-methyl-5-(4-methylphenyl)-3-thienyl]-3,3,4,4,5,5-hexafluorocyclopentene and 1,2-bis (2-methoxy-5-phenyl-3-thienyl)perfluorocyclopentene, preferably the self-supporting polymer film comprises at least two selected organic photochromic molecules comprising a chromophore. The polydialkylsiloxane-substituted naphthopyran is typically an organic photochromic molecule comprising a chromophore comprising two chromophore moieties of the same type, although this not required.

Such a mixture of at least two organic photochromic molecules comprising a chromophore provides the self-supporting polymer film with the ability to turn from essentially colorless to a color which is a mixture of the colors of the at least two organic photochromic molecules comprising a chromophore upon exposure of these chromophores to e.g. ultraviolet radiation. Preferably, the obtained color for the self-supporting polymer film comprising at least two organic photochromic molecules comprising a chromophore is for example a brown color, a dark blue color, a dark green color and/or a color between light gray and black. It will be appreciated by the skilled person that dyes other than organic photochromic molecules comprising a chromophore selected from a diarylethene, a spirooxazine and a naphthopyran, are equally applicable, if a ketone is selected in which the alternative dye or dyes dissolve to a sufficient extent, e.g. 0.1-1.5 wt % based on the weight of the solution, and if the very same ketone is suitable for inducing the increased flexibility and reduced rigidity, amongst others expressed as a decreased value for Tg (Tan Delta), when a thermoplastic polymer, preferably an aliphatic TPU such as an aliphatic TPU based on a polyester or based on a polyether and an aliphatic diisocyanate, is immersed with the solution comprising the ketone and the dye(s), such that at least e.g. 2 wt % of the ketone is imbibed in the polymer film after drying based on the weight of the polymer film, and such that the dye(s) are evenly distributed in the polymer film.

In one embodiment, the photochromic laminate comprising a photochromic self-supporting polymer film and a first sheet of material, comprises a photochromic self-supporting polymer film with a thickness of between 0.20 mm and 6.50 mm, preferably between 0.30 mm and 2.60 mm, more preferably between 0.38 mm and 0.68 mm, most preferably about 0.63 mm. Also preferred is the self-supporting polymer film comprised by the photochromic laminate, having a thickness of 0.050 mm-6.50 mm such as 0.10 mm-6.50 mm, or between 0.20 mm and 6.50 mm, preferably between 0.30 mm and 2.60 mm, more preferably between 0.38 mm and 0.68 mm, most preferably about 0.63 mm. In particular, application of a thermoplastic film having a thickness of for example between 0.30 mm and 0.80 mm is preferred in the self-supporting polymer film comprised by the photochromic laminate, such as a thermoplastic film having a thickness of for example about 0.38 mm, or 0.63 mm or 0.68 mm. A film having a thickness of about 100 micrometer is equally preferred. Immersion of a sheet or film of thermoplastic polymer, preferably an aliphatic TPU, with an aforementioned ketone such as acetone or cyclohexanone, with the least one organic photochromic molecule comprising a chromophore, preferably two of such organic photochromic molecules comprising a chromophore of a different kind, dissolved therein, is very efficient when the thickness of the film is 6.50 mm or less, such as 1.0 mm or less, for example about 0.7 mm or about 0.4 mm or about 0.20 mm or about 0.10 mm, with regard to the even distribution of the dye throughout the complete volume of the polymer film and with regard to the establishment of the induction of decreased Tg (Tan Delta) and/or increased flexibility of the thermoplastic polymer. Furthermore, incubating thermoplastic films, e.g. aliphatic TPU films with a thickness of e.g. smaller than 2 mm results in self-supporting polymer film having a surprisingly smooth surface. For example, an aliphatic TPU based on a polyester and an aliphatic diisocyanate regularly has a relatively opaque and rough surface comprising recesses and protrusions to some extent. Upon exposure to a ketone, that is to say, for example the aliphatic TPU comprising a ketone imbibed in the polymer sheet at an amount of e.g. 1-10 wt % based on the weight of the self-supporting polymer film, having e.g. a thickness of about 0.35 m or about 0.65 mm, is relatively smooth.

In certain embodiments it is preferred that the first sheet of material to which the photochromic TPU film is bonded, is made of a glass, preferably a glass selected from any of an optic glass, a float glass and a soda-lime glass. The first sheet of material is a transparent material.

Preferably, the photochromic laminate comprises a second sheet of transparent material that is bonded at least partially to a free surface of the self-supporting photochromic polymer film. In an embodiment, the photochromic laminate comprising a photochromic self-supporting polymer film and a first sheet of material, additionally comprises a second sheet of material, wherein at least a portion of a second major surface of the self-supporting polymer film is bonded to at least a portion of a first major surface of the second sheet of material, wherein said second sheet of material is made of a glass or a polymer material such as a plastic, preferably a glass or a polymer material such as a plastic selected from any of an optic glass, an optical grade plastic, a float glass, an optical grade polycarbonate, a soda-lime glass and an optical grade polycarbonate based on the precursor monomer bisphenol A. Preferred is the photochromic laminate, wherein a second sheet of transparent material is bonded at least partially to a free surface of the self-supporting photochromic polymer film.

In a preferred embodiment, the second sheet of material in the photochromic laminate is made of a glass, preferably an optic glass, more preferably a float glass, most preferably a soda-lime glass. Preferred is the photochromic laminate, wherein the second sheet of transparent material is made of a polymer material such as a plastic or is made of a glass, preferably selected from any of an optical grade plastic, an optic glass, an optical grade polycarbonate, a float glass, an optical grade polycarbonate based on the precursor monomer bisphenol A or based on the precursor monomer diphenylcarbonate, and a soda-lime glass, more preferably any of an optic glass, a float glass and a soda-lime glass.

Figure 1C:
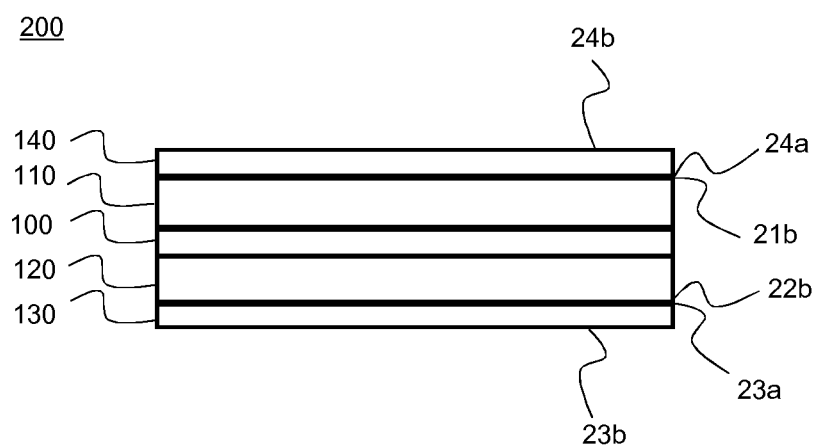
FIG. 1C. Photochromic laminate 200. A first surface of a self-supporting photochromic polymer film 100 is bonded to a first major surface of a sheet of transparent material 110 and the second surface of a self-supporting photochromic polymer film 100 is bonded to a first major surface of a sheet of transparent material 120. The second surface 21b of the sheet of transparent material 110 is bonded to the first major surface 24a of a further sheet of transparent material 140, with the second surface 24b of said further sheet 140 exposed. The second surface 22b of the sheet of transparent material 120 is bonded to the first major surface 23a of yet a further sheet of transparent material 130, with the second surface 23b of said yet further sheet 130 exposed.

In an embodiment, the photochromic laminate comprising a photochromic self-supporting polymer film and a first sheet of material and/or a second sheet of material, additionally comprises a third sheet of material, wherein at least a portion of a first major surface of the third sheet of material is bonded to at least a portion of a second major surface of the first sheet of material and/or at least a portion of a second major surface of the second sheet of material. An example of such a photochromic laminate comprising a first, a second and a third sheet of transparent material is displayed in FIG. 1C. Preferred is the photochromic laminate, wherein a third sheet of material is bonded at least partially to a free surface of the first sheet of transparent material and/or to a free surface of the second sheet of transparent material, wherein the third sheet of material is selected from any one of a glass, a polymer film, a UV protective film, an IR reflective film or coating, a foil and a coating. Preferably, the third sheet of material is made of a material selected from the list of materials comprising a polymer film, a UV protective film, a foil and a coating. It is preferred that said third sheet of transparent material is an anti-fog foil or an anti-scratch protective foil. Preferred is the photochromic laminate wherein the first sheet of transparent material is bonded to a first major surface of the photochromic self-supporting polymer film and the second or third sheet of transparent material is bonded to the second major surface of the photochromic self-supporting polymer film, such that the photochromic self-supporting polymer film is embedded or sandwiched in between two layers of transparent material. Preferably, said first and second/third sheet of transparent material is a sheet of glass, such that the photochromic self-supporting polymer film is provided in between layers of glass in the laminate. Of course, the second or third layer of transparent material can also be a polymer film such as polycarbonate.

In preferred embodiments the sheet of material or the sheets of material, i.e. the first, second and third sheet of transparent material, has/have a total transmittance at least 50%, preferably at least 65%, more preferably at least 75%, most preferably at least 80%. Preferably the sheet of material or sheets of material is/are made of a material selected from a glass, an optic glass, a float glass and soda-lime glass. Also preferred is the photochromic laminate, wherein the first, second and third sheet of transparent material have a total transmittance of more than 80% such as at least 85%, between 85% and 100%, such as 90-95%, about 98% or 98-99.5%. The transmittance relate to the portion of the electromagnetic spectrum that is visible to the human eye.

It is part of the invention that the ketone comprised by the photochromic laminate or the ketone in which the thermoplastic polymer comprised by the photochromic laminate was previously immersed, is selected from any one or more of a straight-chain ketone, a branched ketone, an unsubstituted cyclic ketone and a cyclic ketone substituted with at least one alkyl group, or a combination thereof, preferable selected from a straight-chain ketone and an unsubstituted cyclic ketone. Preferably, said ketone is selected from any one of propan-2-one, butan-2-one, 3-methylbutan-2-one, pentan-2-one, pentan-3-one, cyclopentanone, 2-methylpentan-3-one, 3-methylpentan-2-one, 4-methylpentan-10 2-one, 4-methylpent-3-en-2-one, pentane-2,4-dione, hexan-2-one, 3,5,5-trimethyl-2-cyclohexene-1-one, 5-methylhexan-2-one, 1-cyclohexylpropan-1-one, 1-cyclohexylethanone, cyclohexanone, heptan-2-one, heptan-4-one, 2,6-dimethyl-4-heptanon, octan-3-one, octan-2-one, octan-4-one, or a mixture thereof, preferably the ketone is selected from propan-2-one and cyclohexanone, more preferably the ketone is cyclohexanone.

In embodiments, the photochromic laminate comprises the self-supporting photochromic polymer film, said film comprising at least one organic photochromic molecule comprising a chromophore selected from one or more of a diarylethene, a spirooxazine and a naphthopyran, or a combination thereof, preferably the self-supporting photochromic polymer film comprises at least two organic photochromic molecules comprising a chromophore. It is preferred that the photochromic laminate comprises the self-supporting photochromic polymer film, said film comprising at least one organic photochromic molecule comprising a chromophore selected from polydialkylsiloxane-substituted naphthopyrans, preferably a polydialkylsiloxane-substituted naphthopyran capable of taking on a blue color or a green color when irradiated with ultraviolet radiation, and/or selected from 1-[2,4-dimethyl-5-(4-methylphenyl)-3-thienyl]-2-[2-methyl-5-(4-methylphenyl)-3-thienyl]-3,3,4,4,5,5-hexafluorocyclopentene and 1,2-bis(2-methoxy-5-phenyl-3-thienyl)perfluorocyclopentene, and preferably the self-supporting photochromic polymer film comprises at least two selected organic photochromic molecules comprising a chromophore.

The self-supporting polymer film comprised by the photochromic laminate, comprising e.g. aliphatic TPU provides, amongst others, the benefit of improved suitability for application in laminates, such as a composite laminate assembly, wherein the film is sandwiched in between sheets or layers or films of a first transparent material or in between a sheet of a first transparent material at a first side of the film surface and a sheet of a second transparent material at a second side of the film surface, dependent on the purpose of use of the sandwiched film. The self-supporting polymer film does not require any pre-preparation before being applicable for adhering to the common transparent materials applied in, for example, construction, visors, glasses, lenses, car windows, etc. That is to say, the film generally adheres to sheets or foils or films of materials for applying photochromism, e.g. glass panes, sheets of glass, polymer film such as a layer or sheet of polycarbonate. The film comprising the thermoplastic polymer such as TPU that is immersed with ketone such as cyclohexanone and then dried, exposes a tacky surface suitable for adhering the film to further layers, the immersed and dried film thus being provided with a surface acting reminiscent to surface mount glue known in the art. Furthermore, the self-supporting polymer film provides the benefit that such film absorbs water to a lesser extent, if at all, compared to commonly applied foil made of EVA (a commonly used film material) in photochromism applications. One of the drawbacks of a photochromic film made of EVA is the tendency to absorb water to an unacceptable extent. For example, the self-supporting polymer film of the invention comprising aliphatic TPU does not suffer from this drawback.

The self-supporting film is suitable for being sandwiched in between layers of the common materials, i.e. transparent materials used in construction, windows, car glass, visors, goggles, etc., since the film of the invention is compatible with the materials in the sense that the film does not induce softening of the polymers applied in several of those transparent materials. The photochromic molecules used for such applications degrade at high temperatures. As such, these dyes commonly cannot be incorporated in standard plastic articles, such as those made of polycarbonates, which are, for example, produced by injection moulding or extrusion. The high temperatures of these manufacturing processes would destroy the photochromic properties of the material.

For example, photochromic PVB is a commonly used film material. Photochromic PVB foil suffers from the drawback that the PVB softens and weakens polycarbonate once contacted with such material. It is now thus one of the many benefits of the polyurethane based film of the current invention that such film is broadly applicable and compatible with transparent materials commonly applied in the art. Thus, the photochromic self-supporting polymer film of the invention provides fora more universally applicable film for the purpose of combining such film with layers of materials applied in the field of application of the photochromic effect and overcomes at least some of the degradation issues and use issues of past systems.

The inventors found that in tests for assessing the decay half time of the switch in color when irradiation of a photochromic laminate comprising the self-supporting polymer film with ultraviolet radiation is disrupted, back to the color of the polymer film before being exposed to ultraviolet radiation, the decay half time is surprisingly short compared to the decay half time of photochromic laminates comprising photochromic coating currently in use. That is to say, the decay half time of the self-supporting polymer film comprised by the photochromic laminate is typically 30 seconds or less, such as for example 20 second or less, 15 seconds or less, 10 seconds or less, or even 5 seconds or less. Moreover, many of the self-supporting polymer films comprised by the photochromic laminates have a decay half time of even about 1 second or even less, as assessed with spectroscopic measurements determining values for L, a and b according to methods known in the art. Such decay half time of 10 seconds, 5 seconds, or even 4, 3, 2 or 1 second are much shorter than what is common for photochromic films nowadays in use for applications such as ski goggles, sunglasses, glazing for buildings, car glass, etc., or glass or polymers used in aerospace industry. With such short decay half time of the self-supporting polymer film comprised by the photochromic laminate, due to improved Tg and storage modulus and loss modulus, i.e. lowered values for Tg (Tan Delta) and the storage modules and increased values for the loss modulus, application of the photochromic laminate comprising the self-supporting polymer film is very suitable in articles requiring a fast reaction time with regard to coloring from a relatively dark color upon irradiation with ultraviolet radiation, to a relatively light color or even a colorless state when the source of ultraviolet radiation is absent. That is to say, applying the photochromic laminate comprising the self-supporting polymer film in for example laminate type of articles for, for example, use in construction, glasses, visors for helmets, etc., now allows for the provision of articles having a relative short response time when the intensity of ultraviolet radiation to which the article is exposed, decreases.

A further aspect of the invention relates to a method for producing a photochromic laminate comprising the steps of:
  a) providing a self-supporting photochromic polymer film of the invention;
  b) bonding a first sheet of transparent material at least partially to a surface of the film of step a);
  c) optionally bonding a second sheet of transparent material at least partially to a free surface of the two-layer laminate of step b); and
  d) optionally laminating a third sheet of transparent material at least partially to a free surface of the first sheet of transparent material of step b) or c) and/or to a free surface of the second sheet of transparent material of step c).

Preferred is the photochromic laminate wherein the self-supporting photochromic polymer film is bonded at both sides to a layer of glass. Therefore, an embodiment is the method for producing a photochromic laminate, wherein in step c) or in step d) the second sheet of transparent material or the third sheet of transparent material is bonded to the free surface of the self-supporting photochromic polymer film of the two-layer laminate provided in step b).

An embodiment is the method for producing a photochromic laminate, wherein in step b) the bonding of the first sheet of transparent material to a surface of the film of step a) is by autoclaving at a temperature of between 90° C. and 130° C. and at a pressure of between 8 bar and 15 bar during a time period of at least 60 minutes, wherein said first sheet of transparent material is made of a glass selected from an optic glass, a float glass and a soda-lime glass;
  and/or wherein in step c) the bonding of the second sheet of transparent material at least partially to a free surface of the two-layer laminate of step b) is by autoclaving at a temperature of between 90° C. and 130° C. and at a pressure of between 8 bar and 15 bar, for a time period of at least 60 minutes or by press-laminating at a temperature of between 90° C. and 135° C. at a pressure of between 10 and 25 bar during a time period of at least 1 minute, wherein the second sheet of transparent material is made of a polymer material such as a plastic or is made of a glass, preferably selected from any of an optical grade plastic, an optic glass, an optical grade polycarbonate, a float glass, an optical grade polycarbonate based on the precursor monomer bisphenol A or based on the precursor monomer diphenylcarbonate and a soda-lime glass, preferably any of an optic glass, a float glass and a soda-lime glass, therewith providing a three-layer photochromic laminate;

and/or wherein in step d) the third sheet of transparent material is selected from a polymer film, a UV protective film, a foil and a coating.

A further embodiment is the method for producing a photochromic laminate comprising the steps of:

a) providing a self-supporting photochromic polymer film according to the invention;

b) bonding a first sheet of transparent material at least partially to a surface of the film of step a) by autoclaving at a temperature of between 90° C. and 130° C. and at a pressure of between 8 bar and 15 bar, for a time period of at least 60 minutes;

c) optionally bonding a second sheet of transparent material at least partially to a free surface of the film of step b) by autoclaving at a temperature of between 90° C. and 130° C. and at a pressure of between 8 bar and 15 bar, for a time period of at least 60 minutes or by press-laminating at a temperature of between 90° C. and 135° C. at a pressure of between 10 and 25 bar during a time period of at least 1 minute; and d) optionally laminating a third sheet of material at least partially to a free surface of the first sheet of material of step b) or c) and/or to a free surface of the second sheet of material of step c).

Embodiments of the invention are the method, wherein in step b) the first sheet of transparent material is made of a glass selected from an optic glass, a float glass and a soda-lime glass, preferably a soda-lime glass.

Embodiments of the invention are the method, wherein in step c) the second sheet of transparent material is made of a glass or a plastic selected from any of an optic glass, an optical grade plastic, a float glass, an optical grade polycarbonate, a soda-lime glass and an optical grade polycarbonate based on the precursor monomer bisphenol A, preferably any of an optic glass, a float glass and a soda-lime glass. It is preferred that the first sheet of transparent material is bonded to the first major surface of the self-supporting photochromic polymer film and the second sheet of transparent material, or the third sheet of transparent material if present, is bonded to the second major surface of the self-supporting photochromic polymer film.

Embodiments of the invention are the method, wherein in step d) the third sheet of transparent material is selected from a polymer film, a UV protective film, an IR reflecting film or coating, a foil and a coating.

In a preferred embodiment, the method provides the photochromic laminate, said photochromic laminate having a length and a width of between 10 cm and 200 cm and/or wherein the self-supporting photochromic polymer film of said photochromic laminate has a thickness of between 0.20 mm and 6.50 mm, preferably between 0.30 mm and 2.60 mm, more preferably between 0.38 mm and 0.68 mm, most preferably about 0.63 mm. Preferred is the method wherein the photochromic laminate has a length and a width of between 10 cm and 200 cm and/or wherein the self-supporting photochromic polymer film has a thickness of between 0.05 mm and 6.50 mm, preferably between 0.10 mm and 2.60 mm, more preferably between 0.2 mm and 1.0 mm, most preferably between 0.3 mm and 0.8 mm.

In preferred embodiments the sheet of transparent material or the sheets of transparent material has/have a total transmittance at least 50%, preferably at least 65%, more preferably at least 75%, most preferably at least 80%, wherein preferably the sheet of transparent material or sheets of transparent material is/are made of a transparent material selected from a glass, an optic glass, a float glass and soda-lime glass. It is one of the several benefits provided by the self-supporting polymer film comprised by the photochromic laminate that such a film is presented as a transparent film after being subjected to heat and pressure. For example, the self-supporting polymer film can be subjected to a pressure of between 6 bar and 20 bar, such as about 8 bar, 12 bar or 15 bar, at a temperature of e.g. between 120° C. and 165° C. for a time period of between for example 1 second and 1 hour, such as for about 1 second, 30 seconds, 4 minutes, 10 minutes or 20 minutes, with the direction of the pressure being essentially at both sides of the extended surface area perpendicular to the extended surface of the film, and a transparent film is subsequently obtained. Here, transparent is to be understood as transmission of visible light of at least 80%, such as at least 84%. Preferred is a transmission of visible light of between 80% and 99% such as between 90% and 95%. For example, such a transparent self-supporting polymer film is obtainable by adhering the film at both sides of the film surface to a transparent material, i.e. sandwiched in between two sheets of such material. Preferably, at least one sheet of transparent material is a ply of glass, preferably the photochromic laminate encompasses the self-supporting polymer film wherein said film is bonded at both major surfaces to a sheet of glass.

It is preferred that the optional third sheet of transparent material is an anti-fog foil or an anti-scratch protective foil. See for example FIG. 1C.

The invention also provides a method for producing the self-supporting polymer film comprised by the photochromic laminate, comprising between 0.0% and 12% by weight of a ketone based on the total weight of the self-supporting polymer film and further comprising at least one organic photochromic molecule comprising a chromophore, comprising the steps of:

(i) providing an aliphatic thermoplastic polyurethane film wherein the polyurethane is based on an aliphatic diisocyanate selected from the aliphatic diisocyanates 1,4-tetramethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanatomethyl cyclopentane, IPDI, 5-isocyanato-1-(isocyanatomethyl)-1,3,3-trimethylcyclohexane, bis-(4-isocyanatocyclohexyl)-methane, 2,4'-dicyclohexylmethane diisocyanate, 1,3-bis(isocyanatometyl)-cyclohexane, 1,4-bis(isocyanatometyl)-cyclohexane, bis-(4-isocyanato-3-methylcyclohexyl)-methane, α,α,α',α'-tetramethyl-1,3-xylylen diisocyanate, α,α,α',α'-tetramethyl-1,4-xylylen diisocyanate, 1-isocyanato-1-methyl-4(3)-isocyanatomethyl cyclohexane, 2,4-hexahydrotoluylene diisocyanate, 2,6-hexahydrotoluylene diisocyanate, H12 MDI, HDI, or mixtures thereof, preferably selected from H12 MDI, HDI and IPDI, or mixtures thereof; providing a ketone selected from the ketones propan-2-one, butan-2-one, 3-methylbutan-2-one, pentan-2-one, pentan-3-one, cyclopentanone, 2-methylpentan-3-one, 3-methylpentan-2-one, 4-methylpentan-2-one, 4-methylpent-3-en-2-one, pentane-2,4-dione, hexan-2-one, 3,5,5-trimethyl-2-cyclohexene-1-one, 5-methylhexan-2-one, 1-cyclohexylpropan-1-one, 1-cyclohexylethanone, cyclohexanone, heptan-2-one, heptan-4-one, 2,6-dimethyl-4-heptanon, octan-3-one, octan-2-one, octan-4-one, or a mixture thereof; and providing at least one organic photochromic molecule comprising a chromophore selected from a diarylethene, a spirooxazine and a naphthopyran, or a combination thereof;

(ii) dissolving the at least one organic photochromic molecule comprising a chromophore of step (i) in the ketone of step (i) therewith providing a solution with a final concentration of the at least one organic photochromic molecule comprising a chromophore in the ketone of between 0.1% and 2.5% based on the weight of the solution;

(iii) immersing the aliphatic thermoplastic polyurethane film of step (i) with the solution of step (ii), at a temperature of between 15° C. and 30° C., for a time period of at least 5 seconds; and (iv) drying the immersed aliphatic thermoplastic polyurethane film obtained with step (iii) for a time period of between 1 minute and 16 hours, at a temperature of between 45° C. and 75° C., such that the self-supporting polymer film is obtained.

Preferably, in this method for providing the self-supporting polymer film comprised by the photochromic laminate, the at least one organic photochromic molecule comprising a chromophore of step (i) is a chromophore selected from polydialkylsiloxane-substituted naphthopyrans, preferably a polydialkylsiloxane-substituted naphthopyran capable of taking on a blue color or a green color when irradiated with ultraviolet radiation, and/or selected from 1-[2,4-dimethyl-5-(4-methylphenyl)-3-thienyl]-2-[2-methyl-5-(4-methylphenyl)-3-thienyl]-3,3,4,4,5,5-hexafluorocyclopentene and 1,2-bis(2-methoxy-5-phenyl-3-thienyl)perfluorocyclopentene, preferably in step (i) at least two organic photochromic molecules comprising a chromophore are provided. Any single chromophore or any combination of a diarylethene, a spirooxazine and a naphthopyran can be selected for use in this method for providing the self-supporting polymer film comprised by the photochromic laminate, if the requirement is fulfilled that the organic photochromic molecule(s) comprising a chromophore is/are soluble in the selected ketone(s) at a concentration of at least 0.1% based on the weight of a solution of the ketone(s) containing the dissolved organic photochromic molecule(s) comprising a chromophore at a temperature of between 15° C. and 30° C. The chromophores may be the same or may be different chromophores in the at least one photochromic molecule(s). Preferred photochromic molecules comprised by the self-supporting polymer film are photochromic molecules or a combination of photochromic molecules that are typically activated upon exposure to radiation having a wavelength of between 360 nm and 450 nm, preferably 360-400 nm, such as about 380 nm or between 370 nm and 390 nm, or 360-380 nm.

In particular, this method for providing the self-supporting polymer film comprised by the photochromic laminate, provides the self-supporting polymer film, wherein said self-supporting polymer film comprises between 0.1% and 12% by weight of the ketone based on the total weight of the self-supporting polymer film, preferably between 3% and 8% by weight, or wherein the self-supporting polymer film comprises less than 0.1% by weight of the ketone based on the total weight of the self-supporting polymer film. It is preferred that this method for providing the self-supporting polymer film comprised by the photochromic laminate, provides the self-supporting polymer film, wherein said self-supporting polymer film comprises less than 0.1% by weight of the ketone based on the total weight of the self-supporting polymer film, such as about 0%.

In one embodiment, the ketone provided in step (i) is selected from propan-2-one and cyclohexanone, preferably, the ketone is cyclohexanone, and/or wherein the aliphatic thermoplastic polyurethane film of step (i) is based on an aliphatic diisocyanate selected from H12 MDI, HDI and IPDI, or mixtures thereof, and/or wherein the aliphatic thermoplastic polyurethane film of step (i) is based on a polyester or on a polyether. It is preferred that the selected ketone is cyclohexanone and the aliphatic thermoplastic polyurethane film of step (i) is based on an aliphatic diisocyanate selected from H12 MDI, HDI and IPDI and is based on a polyester or is based on a polyether.

One of the benefits of this method for providing the self-supporting polymer film comprised by the photochromic laminate is the omission of a curing step after impregnating the thermoplastic polymer film with a solution of photochromic dye. Current methods for producing photochromic films require such a cumbersome i.e., time- and material consuming additional curing step for the provision of photochromic film suitable for inclusion in laminate articles.

Typically, in the method for providing the self-supporting photochromic polymer film about one square meter of the aliphatic TPU is immersed with at least 300 ml of the solution comprising the ketone and the dye, preferably at least two different dyes, more preferably two different dyes. Preferably, the one square meter of the thermoplastic polymer film having a thickness of between 0.1 mm and 6.5 mm, typically between 0.3 mm and 1.0 mm such as about 0.38 mm or about 0.63 mm or about 0.68 mm for an aliphatic TPU, such as an aliphatic TPU based on a polyester or on a polyether and based on an aliphatic diisocyanate, is immersed with between 350 ml and 1000 ml ketone solution, such as between 400 ml and 450 ml. Applying such volume of ketone with dye dissolved therein ensures an equal distribution of the dye(s) throughout the polymer film and ensures a self-supporting aliphatic TPU film that is evenly imbibed with e.g. 1-11 wt % ketone(s) based on the weight of the self-supporting film, preferably about 2-6 wt %, such as about 3.5 wt % or 3.0 wt %. Equally preferred is a self-supporting polymer film comprised by the photochromic laminate, comprising two dyes and with about 6-12 wt % of imbibed ketone or ketones based on the weight of the film. Also preferred is a self-supporting polymer film comprised by the photochromic laminate, comprising two dyes and with less than 0.1 wt % of imbibed ketone or ketones based on the weight of the film, such as 0 wt % ketone (i.e. all ketone is removed after immersion of thermoplastic polymer with ketone, such as removed by drying in a hot-air oven).

Preferably, in the method for providing the photochromic laminate, the self-supporting photochromic polymer film comprises at least one organic photochromic molecule comprising a chromophore selected from polydialkylsiloxane-substituted naphthopyrans, preferably a polydialkylsiloxane-substituted naphthopyran capable of taking on a blue color or a green color when irradiated with ultraviolet radiation, and/or selected from 1-[2,4-dimethyl-5-(4-methylphenyl)-3-thienyl]-2-[2-methyl-5-(4-methylphenyl)-3- thienyl]-3,3,4,4,5,5-hexafluorocyclopentene and 1,2-bis(2-methoxy-5-phenyl-3-thienyl)perfluorocyclopentene, preferably at least two organic photochromic molecules comprising a chromophore are selected. Any single chromophore or any combination of a diarylethene, a spirooxazine and a naphthopyran can be selected, if the requirement is fulfilled that the organic photochromic molecule(s) comprising a chromophore is/are soluble in the selected ketone(s) at a concentration of at least 0.1% based on the weight of a solution of the ketone(s) containing the dissolved organic photochromic molecule(s) comprising a chromophore at a temperature of between 15° C. and 30° C. Referring to the Examples section, for example particular improved photochromic laminate comprising self-supporting photochromic polymer film was obtainable when for example Reversacol dyes such as Ocean Green, Pennine Green or Humber Blue (Vivimed Labs Europe Ltd), or combinations thereof, were evenly distributed in the thermoplastic polymer comprised by the self-supporting photochromic polymer film. Spectral data collected before and after exposure of the photochromic laminate comprising self-supporting photochromic polymer film comprising such polydialkylsiloxane-substituted naphthopyrans, provided the insight that the decay half time of such laminates are relatively short, i.e. 60 seconds or less, such as for example 15 seconds or less, or 10 seconds or less, or 5 seconds or less, such as for example about 1 second. For further details, see the Examples section, below. Preferred photochromic molecules for application in the photochromic laminate comprising self-supporting photochromic polymer film are for example the photochromic molecules outlined in U.S. Pat. No. 8,865,029 B2, Example 3, column 46, line 42 to column 50, line 2, Example 4, column 50, line 4 to column 51 line 4, Example 6, column 52, line 50 to column 53, line 30, Example 7, column 53, line 32 to column 54, line 20, and Example 9, column 57, line 50 to column 63, line 20.

The method for providing the photochromic laminate comprising self-supporting photochromic polymer film is equally suitable for application of the self-supporting photochromic polymer film comprising any combination of two or more dyes such as Reversacol dyes such as Ocean Green, Pennine Green or Humber Blue, any polydialkylsiloxane-substituted naphthopyran, a diarylethene, a spiropyran, a spirooxazine and a naphthopyran, as long as such combination of dyes is sufficiently soluble in the ketone or mixture of ketones, preferably acetone or cyclohexanone, more preferably, cyclohexanone, that is to say at least about 0.1 wt % of each dye is soluble in the ketone(s), based on the weight of the provided solution. Combination of dyes are for example desired when a dark color is desired upon exposure of a transparent or semi-transparent article comprising a layer of the self-supporting polymer film of the invention to ultraviolet radiation. Dark colors such as a brown color or a dark gray color is for example achievable when a self-supporting polymer film comprises at least two different dyes that together appear as e.g. a brown-colored dye or gray-colored dye when an article comprising a layer of the self-supporting polymer film is exposed to ultraviolet radiation. Shielding the self-supporting polymer film from further exposure to the ultraviolet radiation results in a relative fast discoloring step, with a decay half-life of for example 10 seconds or less such as about 5 seconds or less.

Currently available photochromic films also suffer from unacceptable wear and decay during relative short period of use, i.e. often within 100-500 hours of use the current photochromic films are not applicable anymore for shielding against radiation such as ultraviolet radiation and/or for radiation heat, since the photochromic effect diminished in this time frame. Such low lifetimes incurs high costs with regard to replacement of worn films and use of raw materials. The films comprised by the photochromic laminate of the invention, however, have an extended life time with regard to the time period in which the photochromic film adequately changes color upon irradiation with ultraviolet radiation. That is to say, the self-supporting polymer film comprised by the photochromic laminate, such as a film comprising 2-11% by weight or less than 0.1% by weight cyclohexanone based on the weight of the film, and comprising aliphatic TPU based on polyester or TPU based on polyether, has an extended life time of at least 2000 hours, as assessed in photo-stability tests known in the art. Surprisingly, the inventors established that the increased resistance against wear and decay of the photochromic effect of the film comprised by the photochromic laminate is accompanied by a relatively low value for the established decay half time. For the self-supporting polymer film comprised by the photochromic laminate, the decay half time is commonly 15 seconds or less, such as between 1 and 5 seconds, whereas the loss of photochromic activity upon exposure to ultraviolet light is surprisingly low in time. Thus, improved stability of the photochromic self-supporting polymer film comprised by the photochromic laminate is accompanied by yet a relatively high response speed when irradiating the film with ultraviolet radiation is stopped. Commonly, increasing photochromic film stability is hampered by occurrence of an accompanying increase in response time to changes in exposure to ultraviolet radiation, when photochromic films known in the art are assessed. They typically suffer from the disadvantage that they can take relatively long to switch between light and dark states for various applications (like automotive or aircraft windows). Thus, the current film comprised by the photochromic laminate both improves lifetime and allows switching between light and dark states quickly.

As said, the self-supporting polymer film comprised by the photochromic laminate does not have to be subjected to a curing step in the method in order to be suitable for adhering to transparent materials known in the field of applying photochromic laminates. Current photochromic films known in the art commonly have the drawback that a step of curing such films is required, before such films are applicable for laminating in between layers of further sheets of material applied in the field of applying photochromism.

According to the invention, the combination of a selected thermoplastic polymer film, e.g. an aliphatic TPU based on for example polyester or polyether and aliphatic diisocyanate, and a ketone imbibed in the polymer film or a ketone contacted with the film and subsequently fully discarded by drying, results in a self-supporting polymer film that has improved plasticity, i.e. increased plasticity, and a decreased storage modulus, i.e. is less stiff and/or has a more rubber-like appearance, compared to the thermoplastic polymer film that is not exposed to the ketone, immersed in the ketone, and that is thus not imbibed with the ketone. The method of the invention provides similar results with regard to the flexibility of the produced film, i.e. a decreased Young's modulus, when for example cyclohexanone is applied in the method or when for example acetone is applied. With the ketones listed here above the method provides a film which has at least 80% transparency, e.g. at least 84% transparency or at least 90% or 95%, when transmission of light of 400-750 nm is assessed after the film has been subjected to pressure and heat, such as 8-15 bar and about 140° C. for 1 second-10 minutes. Preferably, the transmission of the self-supporting polymer film of the invention is 95% or higher, e.g. 96%, 97%, 98%, 99%, 99.5%, 99.8% or 100% For example, such transparent photochromic self-supporting polymer film of the invention is provided when the film obtained with the method is adhered at both sides of the film to sheets of transparent material commonly applied in applications for photochromic materials.

Known photochromic laminates cannot cost-effectively be produced at a large scale. In contrast, the photochromic laminate now described is however producible to cover large surface areas and so can be used in market segments that were previously unable to exploit the properties of a photochromic material, such as building glazing and vehicle windows and aircraft windows.

Yet a further aspect of the invention relates to the use of the photochromic laminate according to the invention or the use of the photochromic laminate obtainable by the method of the invention, in the manufacturing of an article. It was found by the inventors that the method for providing the photochromic laminate provides a photochromic laminate comprising the self-supporting photochromic polymer film, wherein said film does not turn yellow upon exposure to e.g. ultraviolet light and xenon light. Thus, the self-supporting polymer film comprised by the photochromic laminate retains its transparency upon exposure to light, which is beneficial to the life time of the film when applied for its photochromic activity. The use of the photochromic laminate or the use of the photochromic laminate obtainable by the method, for example, relates to the manufacturing of car glass, glass cover for lights such as car lights, glass-based goggles, polymer-based goggles, glass- or polymer-based lenses for a glasses, glass- or polymer-based visors, window glass, construction material for buildings, etc. The inventors found that the photochromic self-supporting polymer film comprised by the photochromic laminate is particularly suitable as a host layer bonded between two transparent sheets of material commonly applied in the field of application of photochromic articles, such as sheets of glass. As said before, the photochromic self-supporting polymer film, in particular aliphatic polyester-based TPU or aliphatic polyether-based TPU imbibed with either acetone or cyclohexanone, is suitable for adherence to such transparent sheets of material used in the manufacturing of articles applied for the photochromic activity of included photochromic film, e.g. car windows, glazing for construction, glasses, lenses, etc. Thus, particularly suitable articles comprising photochromic self-supporting polymer film of the invention are laminates made of transparent material, wherein the film is sandwiched in between such layers of transparent material.

Another aspect of the invention relates to an article comprising the photochromic laminate according to the invention or the photochromic laminate obtainable by the method of the invention. FIG. 1 displays various embodiments of such photochromic laminates applicable to be comprised by such an article.

In a preferred embodiment, the article is an optic article, preferably an optic article selected from, but not limited, to visors, goggles, sunglasses, face-shields, architectural windows, automotive windows, and aeronautic windows. The optic article can also be ophthalmic lenses.

The present invention will be described with respect to particular embodiments, but the invention is not limited thereto, unless so described in the claims.

The embodiments of the invention described herein can operate in combination and cooperation, unless specified otherwise.

EXAMPLES

Examples are described below that illustrate certain embodiments of the invention. These examples are not intended in any way to limit the scope of the invention. It should be understood that in the exemplifying embodiments the term "thermoplastic polyurethane film" or "TPU film" should be read as "cyclohexanone-treated thermoplastic polyurethane film", unless specified otherwise. As said before, the residual amount of ketone in the imbibed TPU film is preferably between 0% and 12%, preferably between 0.1% and 12%, such as about 0%, 0.025%, 0.075%, 0.1%, 1.5%, 3%, 5%, 8% or 10%, based on the weight of the TPU film after the drying step of the process applied for imbibing TPU film with a ketone compared to the original weight of the untreated TPU film.

A series of self-supporting polymer films applied in the photochromic laminate, were prepared.

The method that was used for producing the exemplifying self-supporting polymer films for incorporation in the photochromic laminates comprising at least a layer of glass, was as follows:

- an aliphatic thermoplastic polyurethane film was provided, the film typically having a size of about 1 square meter or about the size of A4 (210×297 mm) and typically having a thickness of about 0.1 mm, 0.2 mm, 0.38 mm, 0.63 mm, 0.68 mm or about 0.75 mm; a ketone was provided;
- at least one organic photochromic molecule comprising a chromophore was provided;
- the at least one organic photochromic molecule comprising a chromophore was dissolved in the ketone to provide a solution of the ketone comprising between 0.1% and 5% of the at least one organic photochromic molecule comprising a chromophore based on the weight of the solution, typically 0.5% of each organic photochromic molecule comprising a chromophore, based on the weight of the solution, that was dissolved in the ketone;
- the about 1 square meter of aliphatic thermoplastic polyurethane film was immersed at room temperature with about 200 ml to 900 ml, typically about 400-450 ml of the solution of ketone comprising the at least one dissolved organic photochromic molecule comprising a chromophore, typically at a temperature of between 17° C. and 24° C., such as about 18° C., 19° C., 20° C., 21° C. or 22° C., typically for about 40 seconds to 100 seconds, such as about 60 seconds, such that the film is imbibed with the ketone and such that the at least one organic photochromic molecule comprising a chromophore is evenly distributed in the aliphatic thermoplastic polyurethane film;
- after immersing the aliphatic thermoplastic polyurethane film with organic photochromic molecule comprising a chromophore in ketone, the immersed film is dried for about 90 minutes in a hot-air oven set at a temperature of about 60° C., such that self-supporting polymer films were provided.

Homogeneous and even distribution of the organic photochromic molecule comprising a chromophore in the thermoplastic polymer, here a TPU film, was established by visualizing the photochromic effect which was apparent equally distributed throughout the whole volume of the TPU film. See also Example 4A, here below.

Exemplifying aliphatic polyester-based or polyether-based thermoplastic polyurethanes having varying sheet thickness, purchased from PPG (USA) or NovoGenio (Spain), were immersed with varying solutions consisting of cyclohexanone or acetone with varying organic photochromic molecule comprising a chromophore dissolved therein, such as Reversacol Pennine Green and Reversacol Humber Blue (Vivimed Labs Europe Ltd) and/or 1-[2,4-dimethyl-5-(4-methylphenyl)-3-thienyl]-2-[2-methyl-5-(4-methylphenyl)-3-thienyl]-3,3,4,4,5,5-hexafluorocyclopentene and 1,2-bis(2-methoxy-5-phenyl-3-thienyl)perfluorocyclopentene (Yamada Chemical Co. Ltd), and/or Reversacol Sea Green, and combinations thereof. As said, the dye concentration in the ketone solution was about 0.5% based on the weight of the solution, for each dye present in the solution. The Reversacol dyes are provided by the manufacturer as single-molecule neutral gray photochromic dyes in the form of fine crystalline powder.

Obviously, alternative dyes known in the art which are soluble to a similar extent as the currently applied dyes, are equally applicable in the film of the invention.

All dye solutions were clear and all dye dissolved in the ketone of the solutions, as exemplified.

In the examples, the immersed film was dried in a hot-air oven. Obviously, alternative known methods for drying an immersed film are equally applicable.

Example 1A

A photochromic soda-lime glass (AGC Nederland, Tiel, Netherlands) film laminate sample of the invention was prepared according to the following METHOD IA in two steps:

Method IA

Step 1: A photochromic TPU film of size A4 (210×297 mm) is provided by immersing an untreated 0.68 mm S123 TPU film (that is to say, a TPU film that was not treated before by imbibing with a ketone), purchased from PPG-Sierracin/Sylmar Corp. (Sylmar, USA), in a bath of about 200 ml to 900 ml, typically about 400-450 ml, of cyclohexanone containing the photochromic dyes 0.5% Reversacol Penine Green (P.G.) and 0.5% Reversacol Humber Blue (H.B.), by weight based on the total weight of the solution, the photochromic dyes supplied by Vivimed Labs Europe Ltd (Yorkshire, England). After about 40 seconds to 100 seconds, typically about 60 seconds, the films are removed from the bath and left to dry in a hot air circulating oven, set at a temperature of 60° C., for about 90 minutes. After the drying time, the weight of the imbibed and dried film is determined and compared to the original weight of the sheet of TPU film. The percentage of remaining cyclohexanone is determined. Samples were obtained that contained 3% residual weight content of cyclohexanone based on the weight difference of the film before and after imbibing it with cyclohexanone. STEP 2: Laminating the TPU/cyclohexanone films obtained in step 1. between two float glass plies (thickness of each ply was 4 mm) by autoclaving (autoclave: AkarMak, Eskişehir, Turkey) at a temperature of 110° C., at a pressure of 8 bar, during a period of 4 hours.

Initial colouring of the float glass laminate obtained using the two-step method I outlined here above was measured using a spectrophotometer, when the sample had not yet been exposed to light. After the initial spectrophotometer measurement, the decay half time was measured when the sample had been exposed to light. This was done using the following method, according to the steps:

1. An initial measurement is done in a spectrophotometer before the sample is exposed to light to get initial Lab values.
2. After measurement of step 1., the spectrophotometer is set up to be ready to measure the colour of the sample again as soon as the sample has been exposed to light;
3. The sample is exposed to light for 1 minute using a Suntest CPS (Atlas), or comparable suntest equipment, using a 1500 W air-cooled xenon lamp irradiating the sample at a wavelength of between 400-750 nm;
4. After 1 minute has passed in step 3, the sample is removed from the suntester and immediately placed in the spectrophotometer (t=0 sec); this measurement gives the activated Lab values of the sample;
5. The colour of the sample is measured at an interval of every 5 seconds till t=120 sec is reached, these measurements will determine the decay half time; and
6. Once t=120 sec the final measurement at t=240 sec is performed.

Results of these measurements are shown below in Table 1A. Control samples were used that are commonly used photochromic laminates in ophthalmic lenses that are commercially available. These controls acted as comparative materials for the experimental soda-lime glass laminates that were obtained using the production steps 1 and 2 of Method I that were described here above. Control 1 is a Vision Ease® laminate (Vision Ease®, Ramsey, USA) and control 2 is a Transitions® ophthalmic lens (Transitions Optical Inc., Florida, USA). Photochromic glass laminates comprising glass plies only, sandwiching a photochromic layer, are currently not available on the market.

TABLE 1A

| Sample | Initial L a b values | Activated L a b values | Decay half time (s) |
|---|---|---|---|
| 2 × 4 mm float glass with 0.68 mm S123 TPU 0.5% Reversacol P.G + 0.5% Reversacol H.B. (experimental sample) | 82.841 −1.73 1.812 | 36.661 −0.497 −2.672 | 15 |
| Vision Ease ® laminate (control 1) | 87.909 −0.99 −0.187 | 64.55 −2.386 −3.15 | 10 |
| Transitions ® ophthalmic lens 2 mm (control 2) | 99.897 −0.011 0.053 | 44.917 5.986 15.845 | 90 |

The initial L value of all samples was high, indicating that they all had a light colour, as defined by CIELAB. Based on their initial a values the experimental sample and the control samples 1 and 2 were more green than red. Based on their initial b values experimental sample and the Transitions® control sample (control 2) were more yellow than blue, while the Vision Ease® control sample (control 1) was more blue than yellow.

The activated L values were all lower than the initial L values. This indicates that in all samples tested a photochromic reaction took place. The experimental sample according to the invention had a lower L value than both control samples. The activated a values show that the experimental as well as the Transitions® control sample became more red, while the Vision Ease® control sample became more green. The activated b values show that the experimental sample as well as the Vision Ease® control sample became more blue, while the Transitions® control sample became more yellow.

The decay half time experimental sample was shorter than the decay half time of the Transitions® control sample, but slightly longer than the decay half time of the Vision Ease® control sample. The sample with the strongest photochromic reaction was the experimental sample, followed by the Transitions® control sample and finally the sample with the weakest photochromic reaction was the Vision Ease® control sample.

From this data it is concluded that the experimental sample transitions into a darker color than both control samples, but the decay half time is significantly improved in regards to the Transitions® control sample. These features of the experimental sample make said sample laminates candidates for use in commercial applications for which the Transitions® lenses (control 2) do not clear fast enough and/or for which the Vision Ease® laminates do not become dark enough.

The Vision Ease® control sample and the Transitions® control sample according to Example 1A as well as the experimental sample according to Example 1 described here above were subjected to a xenon light exposure test according to ISO 11341:2004 after which Lab values and decay half time were measured using the same method as in the Examples 1A and 2A described here above and below, to see if any photochromic activity had been lost. Both the Transitions® control sample and the Vision Ease® control sample were discoloured after only 100 hours of xenon exposure. In addition, the Transitions® control sample had lost 42% of its photochromic activity, while the Vision Ease® control sample was so badly discoloured due to severe decay or break down of the photochromic film and/or the polycarbonate material around it, that it was unusable after only 100 hours of xenon exposure.

The experimental sample on the other hand showed no discoloration and had lost none of its photochromic activity even after 500 hours of xenon exposure. Therefore, it is shown that the tested experimental sample is a suitable candidate for use in commercial applications for which the tested commercially available laminates do not have high enough resistance to loss of photochromic activity.

Example 2A

A photochromic soda-lime glass film laminate sample according to the invention was prepared according to METHOD IIA in two steps:
Method IIA
1. A photochromic TPU film of size A4 (210×297 mm) is created by immersing an untreated S123 TPU film (thickness: 0.68 mm), in a bath of about 200 ml to 900 ml, typically about 400-450 ml, of cyclohexanone containing 1% of Reversacol Sea Green, supplied by Vivimed Labs Europe Ltd (Yorkshire, England), based on the weight of the cyclohexanone. After about 40 seconds to 100 seconds, typically about 60 seconds, the films are removed from the bath and left to dry in a hot air circulating oven, set at a temperature of 60° C., for about 90 minutes. After the drying time, the weight of the imbibed and dried film is determined and compared to the original weight of the untreated TPU film. The percentage of remaining cyclohexanone is determined. Samples were obtained that contained 3% residual weight content of cyclohexanone based on the weight difference of the film before and after imbibing it with cyclohexanone.
2. Laminating the TPU/cyclohexanone films obtained in step 1. between two float glass plies (both having a thickness of 4 mm; soda-lime glass (AGC Nederland, Tiel, Netherlands)) by autoclaving at a temperature of 110° C., at a pressure of 8 bar, during a period of 4 hours.

Initial colouring of the soda-lime glass laminate of the invention obtained using the two-step method IIA outlined here above was measured using a spectrophotometer, when the sample had not yet been exposed to light. After the initial spectrophotometer measurement, the decay half time was measured when the sample had been exposed to light. This was done using the following method, according to the steps:
1. An initial measurement is done in a spectrophotometer before the sample is exposed to light to get initial Lab values.
2. After measurement of step 1., the spectrophotometer is set up to be ready to measure the color of the sample again as soon as the sample has been exposed to light;
3. The sample is exposed to light for 1 minute using a Heraeus Suntest CPS (Heraeus Holding GmbH, Hanau, Germany), or comparable suntest equipment, using a 1500 W air-cooled xenon lamp irradiating the sample at a wavelength of between 400-750 nm;
4. After 1 minute has passed in step 3, the sample is removed from the suntester and immediately placed in the spectrophotometer (t=0 sec); this measurement gives the activated Lab values of the sample;
5. The color of the sample is measured at an interval of every 5 seconds till t=120 sec is reached, these measurements will determine the decay half time; and
6. Once t=120 sec the final measurement at t=240 sec is performed.

Results of these measurements are shown below in Table 2A. Control samples were used that are commonly used photochromic laminates in ophthalmic lenses that are commercially available (See also the previous example 1A for details). These controls acted as comparative materials for the experimental float glass laminates that were obtained using the production steps 1 and 2 of Method IIA that were described here above. Control 1 is a Vision Ease® laminate and control 2 is a Transitions® ophthalmic lens.

TABLE 2A

| Sample | Initial L a b values | Activated L a b values | Decay half time (s) |
|---|---|---|---|
| 2 × 4 mm float glass with 0.68 mm S123 1% Reversacol Sea Green (experimental sample) | 92.16 −8.21 7.37 | 84.27 −20 −1.32 | 15 |
| Vision Ease ® laminate (control 1) | 87.909 −0.99 −0.187 | 64.55 −2.386 −3.15 | 10 |
| Transition ® ophthalmic lens 2 mm (control 2) | 99.897 −0.011 0.053 | 44.917 5.986 15.845 | 90 |

The initial L value of all samples was high, indicating that they all had a light colour, as defined by CIELAB. Based on their initial a values the experimental sample and the control samples 1 and 2 were more green than red. Based on their initial b values experimental sample and the Transitions® control sample (control 2) were more yellow than blue, while the Vision Ease® control sample (control 1) was more blue than yellow.

The activated L values were all lower than the initial L values. This indicates that in all samples tested a photochromic reaction took place. The experimental sample had a higher L value than both control samples. The activated a values show that the experimental as well as the Vision Ease® control sample became more green, while the Transitions® control sample became more red. The activated b values show that the experimental sample as well as the Vision Ease® control sample became more blue, while the Transitions® control sample became more yellow.

The decay half time the experimental sample was shorter than the decay half time of the Transitions® control sample, but slightly longer than the decay half time of the Vision Ease® control sample. The sample with the strongest photochromic reaction was the Transitions® control sample, followed by the Vision Ease® control sample and finally the sample with the weakest photochromic reaction was the experimental sample.

These measurements with the glass laminate of the invention show that the decay half time is significantly improved for the laminate of the invention when compared to the Transitions® control sample. These features of the experimental sample make said sample laminates candidates for use in commercial applications for which the Transitions® lenses (control 2) do not clear fast enough.

Example 3A

Laminate Consisting of Two Plies of Glass Sandwiching a Photochromic TPU Film, Immersed in Cyclohexanone, then Dried TPU films with a varying thickness and purchased from different suppliers were tested for their photochromic performance, after the TPU films were immersed in solvent comprising cyclohexanone and photochromic molecules, followed by complete drying of the TPU film. That is to say, after immersion of TPU film in a bath comprising cyclohexanone and photochromic dyes dissolved therein, the soaked TPU film was subsequently fully dried such that all cyclohexanone was discarded again from the film and out of the film.

Samples:
  1. An S123 TPU film (thickness: 0.68 mm, surface area was A4 size, 210 mm×297 mm) was sandwiched in between two layers of transparent material (thickness 4 mm, each)
  2. A NovoGlass SF1959 TPU film (thickness: 0.38 mm, surface area was A4 size, 210 mm×297 mm; NovioGenio) was sandwiched in between two layers of transparent material (thickness 4 mm, each)
  3. An S123 TPU film (thickness: 0.38 mm, surface area was A4 size, 210 mm×297 mm) was sandwiched in between two layers of transparent material (thickness 4 mm, each)

The S-123 thermoplastic polyurethane is an aliphatic PU; the SF1959 thermoplastic polyurethane is a poly-ether based PU.

For samples 1-3, the transparent material applied was float glass (soda-lime glass (AGC Nederland, Tiel, Netherlands)).

Said TPU films of samples 1-3 were impregnated with cyclohexanone comprising photochromic molecules dissolved therein by immersion of the films in a bath of the solvent, and then dried, before the TPU films were laminated in between the two further layers of glass. The TPU films of samples 1-3 were contacted for 1 minute with the solution of cyclohexanone and two dyes by dipping the TPU films in a solution of cyclohexanone and 0.5% w/w of Reversacol Humber Blue and 0.5% w/w Reversacol Pennine Green based on the total weight of the solution. The three films 1-3 are subsequently dried at 60° C. for 4 hours, such that all the cyclohexanone solvent has evaporated from the TPU films (0% cyclohexanone left in interlayer TPU films of Samples 1-3, when subsequently sandwiched in between the two layers of transparent material, i.e. float glass).

For the samples 1-3 sandwiched in between sheets of transparent glass, the values for L, a and b were determined, according to standard procedures commonly applied in the art (CIELABS, 1976). The L, a, b values were determined with the example self-supporting polymer films 1-3 of the invention, before and after exposure for 1 minute to for example a Suntester Oxford Blue source of ultraviolet radiation, such that each example film 1-3 is exposed to an amount of ultraviolet radiation equivalent to a dose of ultraviolet radiation received by the films as if exposed to the sun at a sunny day in central Europe. After the exposure to the light source, a first sweep of % transmission measurements between 400 nm and 750 nm was immediately recorded, and subsequently, the color (transmission between 400 nm and 750 nm) was recorded in 20 seconds intervals for 180 seconds, followed by a last measurement at t=240 seconds after the end of the exposure to the ultraviolet radiation of the light source. Measurements were established on an Xrite spectrophotometer with the settings:
  Light Source: D65
  Observer angle: 10 degrees
  Mode: Transmission (UV excluded)
  Measured values: L,a,b and spectral curve (Transmission (%) from 400-750 nm).
Measuring Initial Color
  Measure all three samples 1-3 on the spectrophotometer before exposure of samples to light.
Measuring "Decay-time" of Photochromic Coating
  Have the spectrophotometer ready to measure the colour once the exposed sample will come out of the Suntester.
  Expose the sample for 1 minute to light using a Heraeus Suntest CPS (or identical suntest equipment). UV dose should be equal to a sunny day during summer in central Europe.
  Take the sample out of the Suntester and place it as soon as possible in the spectrophotometer (t=0 sec)
  Measure the colour for each 20 seconds time interval. This has to be done till t=180 s (let the timer run during measuring the sample).

The glass-TPU-glass laminates sample 1-3 of TPU with a ply of transparent glass adhered to both major surfaces have been produced by laminating in an autoclave, at a temperature of 110° C., at a pressure of 8 bar pressure and with a dwell time of 4 hours.

Initial Performance:

| Sample | Initial L a b values | Activated L a b values | Decay half time (s) |
|---|---|---|---|
| 1 | 92.168 −1.786 1.198 | 36.661 −0.497 −2.672 | 20 |
| 2 | 91.874 −2.121 2.57 | 33.398 −0.107 −2.834 | 20 |
| 3 | 92.027 −1.418 1.48 | 39.695 −0.252 −3.705 | 20 |

Surprisingly, the glass laminate comprising the impregnated TPU film in sample 3 has a thickness which is half the thickness of the glass laminate comprising impregnated TPU film in sample 1 which is made of the same TPU material, while the photochromic activity is the same for these two samples 1 and 3.

Performance after 120 hours in Xenon weathering test (according to ISO 11341: 2004, version in force in 2017 and 2018):

| Sample | Initial L a b values | Activated L a b values | Decay Half time (s) | Loss of photochromatic activity (%) |
|---|---|---|---|---|
| 1 | 91.231 −1.87 2.109 | 51.544 −0.718 −2.057 | 20 | 25 |
| 2 | 91.896 −2.466 4.102 | 48.537 −0.926 −2.2 | 20 | 27 |
| 3 | 89.352 −1.008 1.486 | 47.666 −1.033 −2.486 | 20 | 15 |

When the loss of photochromic activity is compared between sample 1 (thickness of the TPU film is 0.68 mm) and sample 2 and 3 (thickness of the TPU film is 0.38 mm), these samples show comparable characteristics.

Comparing the results with these samples 1-3 with the results obtained with the tested samples which comprise a residual percentage of cyclohexanone in the TPU film after immersion of the TPU in the solvent and subsequently drying the films (see the results in the examples 1A and 2A, here above), it is shown that the presence of residual cyclohexanone in the TPU film improves stability (in favour of retaining photochromic activity). Indeed, the films of samples 1-3 of this Example 3A do not comprise a residual amount of cyclohexanone after immersion and subsequent drying, which is reflected in these stability test results, showing that samples 1-3 are less stable than TPU film comprising cyclohexanone.

Example 4A

Photochromic Molecules are Homogenously Distributed in TPU Film After Immersion of Said Film in a Solvent Comprising Cyclohexanone and the Photochromic Molecules A first aliphatic TPU film with a thickness of 0.38 mm (PPG Aerospace—Argotec) was sprayed with a solvent consisting of cyclohexanone with 0.5% w/w of Reversacol Humber Blue and 0.5% w/w Reversacol Pennine Green based on the total weight of the solution dissolved therein. Subsequently, the TPU film was dried: "TPU-SPRAY".

A second aliphatic TPU film with a thickness of 0.38 mm (PPG Aerospace—Argotec) was immersed in a solvent consisting of cyclohexanone with 0.5% w/w of Reversacol Humber Blue and 0.5% w/w Reversacol Pennine Green based on the total weight of the solution dissolved therein. Subsequently, the TPU film was dried: "TPU-IMBIBED".

The TPU-SPRAY and TPU-IMBIBED samples were subjected to exposure to UV light. It was observed that only the major surface of TPU-SPRAY onto which the photochromic dyes were sprayed, showed a colour change from colourless to dark purple. Further, it was observed that TPU-IMBIBED was presented as a homogenously dark purple coloured film after exposure to UV light, indicative for evenly distributed photochromic dyes throughout the whole film in three dimensions. Optical micrographs were obtained in reflection using a Motic STEREO SMZ-168T-LED microscope, equipped with a MOTICAM 580 camera and LED top light. Further, it was observed that both the colouring of the TPU-IMBIBED film upon exposure to light and the subsequent discolouring occurred evenly throughout the whole volume of the film, further showing that the photochromic molecules were homogenously and evenly distributed in the TPU film upon immersion of the film in cyclohexanone with the photochromic dyes dissolved therein.

Example 5A

Photochromic Glass Laminate

A photochromic glass laminate according to the invention was prepared, here also referred to as 'photochromic TPU foil' of the invention.

The photochromic TPU foil is prepared in following manner:

The photochromic dyes Reversacol Pennine Green (0.5% w/w) and Reversacol Humber Blue (0.5% w/w) were dissolved in cyclohexanone. Amounts of dissolved dye are based on the total weight of the solution of cyclohexanone comprising the dyes.

Then, the solution was heated gently to 60° C. and stirred to completely dissolve the photochromic dyes in the cyclohexanone A film of thermoplastic aliphatic polyurethane was provided (S-158 of PPG Aerospace; thickness of 0.67 mm). The film was dipped into the solution of photochromic dyes in cyclohexanone for a minimum of 1 minute, at room temperature.

The solvent was subsequently allowed to completely evaporate in a hot air circulating oven at 80° C. for a minimum of 15 minutes, therewith providing the photochromic TPU foil comprising 0% by weight cyclohexanone based on the weight of the polyurethane film.

The cyclohexanone solvent swells the S-158 TPU film and therewith allows impregnation of the film with the photochromic dyes. In this manner the photochromic dyes are present throughout the entire thickness of the S-158 film, resulting in enhanced photochromic effect and stability, compared to articles comprising a coating at the surface, said coating comprising the photochromic dyes. Furthermore, the cyclohexanone acts as a plasticizer, exerting its plasticizer effect on the S-158 TPU film, therewith making the film very soft and tacky. During impregnation of the TPU film, the film has a low E modulus and exhibits a plasticized effect (caused by the cyclohexanone). This way, the low modulus PU polymer film with a low Tg (glass transition temperature) is a suitable host for the photochromic dyes.

Subsequently, the provided photochromic TPU foil is placed in between two panes of soda lime glass. The thickness of both panes of glass was either 3 mm or 4 mm. The glass had a light transmission of higher than 80% above a wavelength of 350 nm, according to the test data provided by the manufacturer/supplier of the glass panes.

The layers of glass with the photochromic TPU foil sandwiched in between these panes are laminated together in an autoclave process, at a temperature of 110° C., for a period of 6 hours. The laminate was packaged in a vacuum sealed bag during the autoclave process and in the autoclave environment the maximum pressure was 12 bar.

The applied photochromic dyes comprising two photochromic groups covalently linked to one or both terminuses of the siloxane oligomer comprised by the dyes, have the advantage that these molecules have a stronger photochromic effect compared with current spirooxazine molecules comprising a single photochromic group. That is to say when the photochromic dyes now applied are irradiated, the light transmission change in the visual part of the wavelength spectrum, is stronger. The here applied photochromic molecules are p,T type photochromic dyes: the dyes are activated by light (p) and deactivated by temperature (T). The application of the Reversacol Pennine Green and Reversacol Humber Blue dyes gives a stronger colour change effect upon radiation with light, compared to current spirooxazine molecules comprising a single photochromic group.

A further S-158 PU film of the invention was prepared, now with Reversacol Sea Green photochromic dye (1% by weight based on the total weight of the solution consisting of dye and cyclohexanone), instead of Reversacol Pennine Green and Reversacol Humber Blue. The Reversacol Sea Green contains a single photochromic group (non-modified spirooxazine). This film was prepared according to the method here above outlined for the laminate of the invention. The further S-158 PU film with impregnated Reversacol Sea Green photochromic dye was subsequently laminated between two panes of glass as here above described for the preparation of the other laminates of the invention, providing the further laminate of the invention with a single photochromic dye.

CIELAB L, A, b values and T(½) were determined for the laminates of the invention. Films were activated by irradiation with a white light/UV light source. Reference values for L, A, b were determined in the inactivated state, before irradiation with the light source.

For the laminate of the invention wherein the PU film contains the two photochromic dyes, the L, A, b values before irradiation with light were 89.057, −0.558, −0.672, respectively, and 44.119, −0.087, −1.252 after irradiation with light, showing that this laminate of the invention turns from a clear laminate to a dark-grey to black colour. The L value indicates light-dark value according CIELAB. An L value of about 44 for this irradiated laminate of the invention corresponds to a 'LT vis' (light transmission of visible light) of around 15%.

For the further laminate of the invention comprising TPU with 1% w/w Reversacol Sea Green impregnated therein, the L, A, b values before irradiation with light were 92.158, −8.208, 7.368, respectively, and 84.265, −20, −1.32 after irradiation with light, showing that this alternative laminate of the invention turns from a clear to light green/blue laminate to a blue to green colour.

The values in seconds for T½ were 30 seconds for the laminate comprising PU with the two photochromic dyes, and 15 seconds for the laminate comprising PU with the single photochromic dye.

The invention claimed is:

1. A self-supporting polymer film comprising:
   (a) a thermoplastic polymer;
   (b) between 3% and 12% by weight of a ketone based on the total weight of the self-supporting polymer film; and
   (c) at least one organic photochromic molecule comprising a chromophore, wherein said organic photochromic molecule comprising a chromophore is soluble in said ketone of (b) at a concentration of at least 3% based on the weight of a solution of the ketone containing the dissolved organic photochromic molecule comprising a chromophore at a temperature of between 15° C. and 30° C., wherein the thermoplastic polymer of (a) is thermoplastic polymer that is previously immersed in the solution of the ketone containing the dissolved organic photochromic molecule comprising a chromophore of (c) and then dried such that remaining ketone after said immersion and subsequent drying is imbibed in said thermoplastic polymer.

2. The self-supporting polymer film according to claim 1, wherein the at least one organic photochromic molecule comprising a chromophore is evenly distributed in the self-supporting polymer film.

3. The self-supporting polymer film according to claim 1, wherein the thermoplastic polymer is an aliphatic thermoplastic polyurethane.

4. The self-supporting polymer film according to claim 3, wherein the aliphatic thermoplastic polyurethane is based on an aliphatic diisocyanate selected from 1,4-tetramethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanatomethyl cyclopentane, isophorone diisocyanate, 5-isocyanato-1-(isocyanatomethyl)-1,3,3-trimethylcyclohexane, bis-(4-isocyanatocyclohexyl)-methane, 2,4'-dicyclohexylmethane diisocyanate, 1,3-bis(isocyanatometyl)-cyclohexane, 1,4-bis(isocyanatometyl)-cyclohexane, bis-(4-isocyanato-3-methylcyclohexyl)-methane, α,α,α',α'-tetramethyl-1,3-xylylen diisocyanate, α,α,α',α'-tetramethyl-1,4-xylylen diisocyanate, 1-isocyanato-1-methyl-4(3)-isocyanatomethyl cyclohexane, 2,4-hexahydrotoluylene diisocyanate, 2,6-hexahydrotoluylene diisocyanate, 4,4'-methylene dicyclohexyl diisocyanate, hexamethylene diisocyanate, or mixtures thereof.

5. The self-supporting polymer film according to claim 1, wherein the ketone is selected from any one or more of a straight-chain ketone, a branched ketone, an unsubstituted cyclic ketone and a cyclic ketone substituted with at least one alkyl group, or a combination thereof.

6. The self-supporting polymer film according to claim 1, wherein the ketone is selected from any one of propan-2-one, butan-2-one, 3-methylbutan-2-one, pentan-2-one, pentan-3-one, cyclopentanone, 2-methylpentan-3-one, 3-methylpentan-2-one, 4-methylpentan-2-one, 4-methylpent-3-en-2-one, pentane-2,4-dione, hexan-2-one, 3,5,5-trimethyl-2-cyclohexene-1-one, 5-methylhexan-2-one, 1-cyclohexylpropan-1-one, 1-cyclohexylethanone, cyclohexanone, heptan-2-one, heptan-4-one, 2,6-dimethyl-4-heptanon, octan-3-one, octan-2-one, octan-4-one, or a mixture thereof.

7. The self-supporting polymer film according to claim 1, wherein the self-supporting polymer film comprises at least one organic photochromic molecule comprising a chromophore selected from one or more of a diarylethene, a spirooxazine and a naphthopyrans, or a combination thereof.

8. The self-supporting polymer film according to claim 1, wherein the self-supporting polymer film comprises at least one organic photochromic molecule comprising a chromophore selected from polydialkylsiloxane-substituted naphthopyrans, preferably a polydialkylsiloxane-substituted naphthopyrans capable of taking on a blue color or a green color when irradiated with ultraviolet radiation, and/or selected from 1-[2,4-dimethyl-5-(4-methylphenyl)-3-thienyl]-2-[2-methyl-5-(4-methylphenyl)-3-thienyl]-3,3,4,4,5,5-hexafluorocyclopentene and 1,2-bis(2-methoxy-5-phenyl-3-thienyl)perfluorocyclopentene.

9. The self-supporting polymer film according to claim 1, wherein the self-supporting polymer film has a thickness of between 0.05 mm and 6.50 mm.

10. An article comprising the self-supporting polymer film of claim 1.

11. A method for producing a self-supporting polymer film comprising between 3% and 12% by weight of a ketone based on the total weight of the self-supporting polymer film and further comprising at least one organic photochromic molecule comprising a chromophore, comprising the steps of:

a. providing an aliphatic thermoplastic polyurethane film wherein the polyurethane is based on an aliphatic diisocyanate selected from 1,4-tetramethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanatomethyl cyclopentane, isophorone diisocyanate, 5-isocyanato-1-(isocyanatomethyl)-1,3,3-trimethylcyclohexane, bis-(4-isocyanatocyclohexyl)-methane, 2,4'-dicyclohexyl-methane diisocyanate, 1,3-bis(isocyanatometyl)-cyclohexane, 1,4-bis(isocyanatometyl)-cyclohexane, bis-(4-isocyanato-3-methylcyclohexyl)-methane, α,α,α',α'-tetramethyl-1,3-xylylen diisocyanate, α,α, α',α'-tetramethyl-1,4-xylylen diisocyanate, 1-isocyanato-1-methyl-4(3)-isocyanatomethyl cyclohexane, 2,4-hexahydrotoluylene diisocyanate, 2,6-hexahydrotoluylene diisocyanate, 4,4'-methylene dicyclohexyl diisocyanate, hexamethylene diisocyanate, or mixtures thereof, providing a ketone selected from propan-2-one, butan-2-one, 3-methylbutan-2-one, pentan-2-one, pentan-3-one, cyclopentanone, 2-methylpentan-3-one, 3-methylpentan-2-one, 4-methylpentan-2-one, 4-methylpent-3-en-2-one, pentane-2,4-dione, hexan-2-one, 3,5,5-trimethyl-2-cyclohexene-1-one, 5-methylhexan-2-one, 1-cyclohexylpropan-1-one, 1-cyclohexylethanone, cyclohexanone, heptan-2-one, heptan-4-one, 2,6-dimethyl-4-heptanon, octan-3-one, octan-2-one, octan-4-one, or a mixture thereof, and providing at least one organic photochromic molecule comprising a chromophore selected from a diarylethene, a spirooxazine and a naphthopyran, or a combination thereof;

b. dissolving the at least one organic photochromic molecule comprising a chromophore of step a. in the ketone of step a. therewith providing a solution with a final concentration of the at least one organic photochromic molecule comprising a chromophore in the ketone of between 0.1% and 2.5% based on the weight of the solution;

c. immersing the aliphatic thermoplastic polyurethane film of step a. with the solution of step b., for a time period of at least 5 seconds; and d. drying the immersed aliphatic thermoplastic polyurethane film obtained with step c. for a time period of between 1 minute and 16 hours, at a temperature of between 45° C. and 75° C., such that the self-supporting polymer film is obtained.

12. The method according to claim 11, wherein in step c. the aliphatic thermoplastic polyurethane film is immersed with the solution at a temperature of between 8° C. and 60° C.

13. The method according to claim 11, wherein the at least one organic photochromic molecule comprising a chromophore of step a. is a chromophore selected from polydialkylsiloxane-substituted naphthopyrans, capable of taking on a blue color or a green color when irradiated with ultraviolet radiation, and/or selected from 1-[2,4-dimethyl-5-(4-methylphenyl)-3-thienyl]-2-[2-methyl-5-(4-methylphenyl)-3-thienyl]-3,3,4,4,5,5-hexafluorocyclopentene and 1,2-bis(2-methoxy-5-phenyl-3-thienyl)perfluorocyclopentene.

14. The method according to claim 11, wherein the ketone provided in step a. is selected from propan-2-one and cyclohexanone, and/or wherein the aliphatic thermoplastic polyurethane film of step a. is based on an aliphatic diisocyanate selected from 4,4'-methylene dicyclohexyl diisocyanate, hexamethylene diisocyanate and isophorone diisocyanate, or mixtures thereof, and/or wherein the aliphatic thermoplastic polyurethane film of step a. is based on a polyester or on a polyether.

15. The method according to claim 11, wherein the self-supporting polymer film comprises between 3% and 12% by weight of the ketone based on the total weight of the self-supporting polymer film.

16. A self-supporting polymer film obtainable by the method of claim 11.

* * * * *